(12) United States Patent
Matsuda

(10) Patent No.: US 6,346,956 B2
(45) Date of Patent: *Feb. 12, 2002

(54) THREE-DIMENSIONAL VIRTUAL REALITY SPACE DISPLAY PROCESSING APPARATUS, A THREE-DIMENSIONAL VIRTUAL REALITY SPACE DISPLAY PROCESSING METHOD, AND AN INFORMATION PROVIDING MEDIUM

(75) Inventor: Koichi Matsuda, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,152

(22) Filed: Sep. 29, 1997

(30) Foreign Application Priority Data

Sep. 30, 1996 (JP) .............................................. 8-278737

(51) Int. Cl.[7] .............................................. G06F 13/00
(52) U.S. Cl. ....................................... 345/848; 345/836
(58) Field of Search ................................ 345/334, 335, 345/339, 355, 348, 349, 357, 744, 764, 763, 762, 757, 836, 839, 848, 850

(56) References Cited

U.S. PATENT DOCUMENTS

| | | | |
|---|---|---|---|
| 5,191,644 A | 3/1993 | Takeda ........................ | 395/158 |
| 5,347,306 A | 9/1994 | Nitta ............................ | 348/15 |
| 5,388,990 A | 2/1995 | Beckman ..................... | 434/38 |
| 5,491,743 A | 2/1996 | Shiio et al. ................... | 379/202 |
| 5,563,988 A | 10/1996 | Maes et al. ................... | 395/121 |
| 5,577,187 A | 11/1996 | Mariani ........................ | 395/342 |
| 5,621,904 A | 4/1997 | Elliott et al. ................. | 395/342 |
| 5,659,691 A | 8/1997 | Durward et al. ............. | 395/329 |
| 5,680,558 A | * 10/1997 | Hatanaka et al. ............ | 395/334 |
| 5,682,469 A | * 10/1997 | Linnett et al. ............... | 395/173 |
| 5,682,506 A | 10/1997 | Corby, Jr. et al. ........... | 395/119 |
| 5,689,669 A | * 11/1997 | Lynch et al. ................. | 395/355 |
| 5,710,897 A | 1/1998 | Schneider ..................... | 395/334 |
| 5,732,232 A | 3/1998 | Brush, II et al. ............. | 395/339 |
| 5,736,982 A | * 4/1998 | Suzuki et al. ................. | 345/330 |
| 5,771,042 A | 6/1998 | Santos-Gomez .............. | 345/342 |
| 5,841,440 A | 11/1998 | Guha ............................ | 345/419 |

FOREIGN PATENT DOCUMENTS

JP          8016612 A     *  1/1996     ........... G06F/17/30

OTHER PUBLICATIONS

T. Trias et al., "Decision Networks for Integrating the Behaviors of Virtual Agents and Avatars," IEEE, Proceedings of Vrais Jan. 1996, pp. 156–162.

(List continued on next page.)

Primary Examiner—Ulka J. Chauhan
Assistant Examiner—Mano Padmanabhan
(74) Attorney, Agent, or Firm—Oblon, Spivak, McClelland, Maier & Neustadt, P.C.

(57) ABSTRACT

To allow the user who wants to use three-dimensional virtual reality spaces to easily select a desired three-dimensional virtual reality space. When the browser is started with data about a three-dimensional virtual reality space stored in a predetermined directory, this predetermined directory is searched. According to the search result, an entry room in which three-dimensional icons representing three-dimensional virtual reality spaces are arranged is generated and displayed. The three-dimensional icons arranged in the entry room are linked to the data of the corresponding three-dimensional virtual reality spaces. When user clicks on a desired three-dimensional icon, the corresponding three-dimensional virtual reality space is displayed.

41 Claims, 34 Drawing Sheets

OTHER PUBLICATIONS

P. Kent, "Using Microsoft Internet Explorer," Part II—Caught in the Web and Chapter 5—Advanced Navigation, Copyright 1995 by Que Corporation, Library of Congress Catalog No. 95–71462.

M. Benedikt, "Cyberspace: First Steps," The MIT Press, London, 1992, Chapter 10, "The Lessons of Lucasfilm Habitat," pp. 273–301.

PR Newswire: "Paragraph International announces Multimedia 3D world Creation Software for the Next Dimension in Web and Presentation Authoring" Dec., 1995.*

Gigante et al. ("Distributed, Multi–Person, Physically–Based Interaction in Virtual Worlds", Communicating with Virtual Worlds, Proceedings of Computer Graphics International, Jun. 21–25, 1993, pp. 41–49).*

Cyber Passage Browser Manual (Sony's Enhanced VRML browser: Beta Version 4b—Jun. 21, 1996.*

Computer Select, 1989–1990: Doc: 16096, Oct. 8, 1990 v90 n10 p3 (11).*

Chat comes to the Web: Karpinski, Interactive Age, 1995, n218, PG4.*

Speed Key to New Multimedia WEb Alliance, Newsbytes News Network, 1995.*

Packard Bell: New Packard Bell line–up blasts off to planet Oasis: M2 Presswire:Sep. 19, 1996.*

British Telecom plans to Network virtual worlds together to improve business communications: Computergram International Issue: 2909: May 9, 1996.*

"The New IEEE Standard Dictionary of Electrical and Electronic Terms": Fifth Edition, pp. 165, 498, 1101.*

* cited by examiner

PROTOCOL TYPE    FILE NAME http : // www. csl. sony. co. jp / index. html

HOST NAME

VIRTUAL WORLD MODEL

VIEWPOINT FROM AVATAR C

VIEWPOINT FROM AVATAR D

F I G. 13
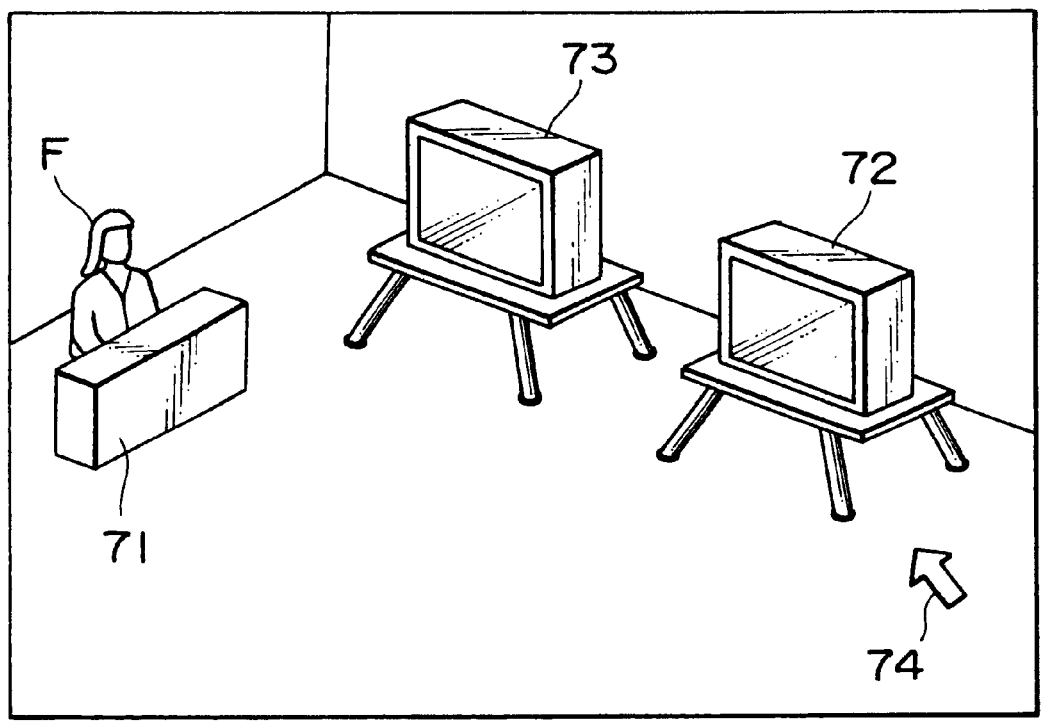
IMAGE VIEWED FROM CLIENT

IMAGE VIEWED FROM COUNTER

COMMUNICATION PROTOCOL FOR THE CASE IN WHICH SHARED SPACE SERVER IS CONSTRUCTED ON WWW

FIG. 22

| CASE | BASIC OBJECT DATA STORED IN: | URL OF UPDATE OBJECT DATA STORED IN: | UPDATE OBJECT DATA STORED IN: |
|---|---|---|---|
| 1 | VRML FILE OF SPECIFIC DIRECTORY IN STORAGE DEVICE OF INFORMATION SERVER | DEFAULT URL | INFORMATION SERVER |
| 2 | | MAPPING SERVER | SHARED SERVER IN JAPAN |
| 3 | | | SHARED SERVER IN US |
| 4 | VRML FILE OF SPECIFIC DIRECTORY IN STORAGE DEVICE OF CLIENT TERMINAL | MANUALLY SPECIFY URL | SPECIFIED SHARED SERVER |
| 5 | | MAPPING SERVER | SHARED SERVER IN JAPAN |
| 6 | | | SHARED SERVER IN US |
| 7 | VRML FILE OF SPECIFIC DIRECTORY OF CD-ROM OF CLIENT TERMINAL | MANUALLY SPECIFY URL | SPECIFIED SHARED SERVER |
| 8 | | MAPPING SERVER | SHARED SERVER IN JAPAN |
| 9 | | | SHARED SERVER IN US |

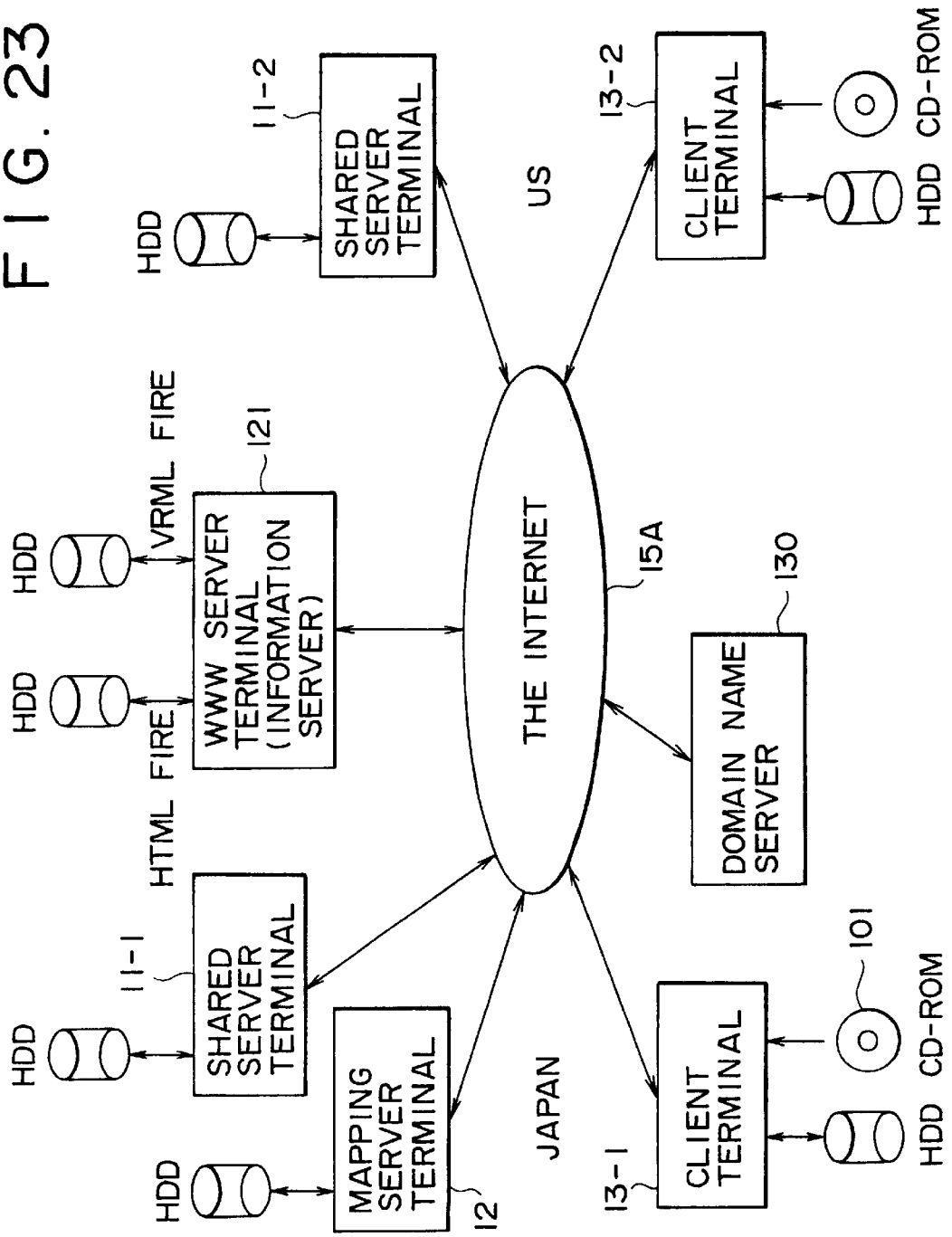

FIG. 26

| HARDWARE | MINIMUM OPERATING ENVIRONMENT | RECOMMENDED OPERATING ENVIRONMENT |
|---|---|---|
| | PC ON WHICH WINDOWS 95/NT OPERATE | ↓ |
| CPU | 486D×2, 66MHz | PENTIUM 75MHz OR HIGHER |
| MEMORY | 12MB | 32MB OR HIGHER |
| DISK FREE SPACE | 3MB (9MB AT INSTALLATION) OR HIGHER | ↓ |
| RESOLUTION | 640 × 480 PIXELS | 800 × 600 PIXELS OR HIGHER |
| DISPLAY COLORS | 256 COLORS | 65536 COLORS OR HIGHER |
| SOFTWARE | NETSCAPE NAVIGATOR FOR WINDOWS (VER 2.0 OR LATER) | ↓ |
| SOUND | | SOUND BOARD |

FIG. 35

| | CONTENT | DESCRIPTION LANGUAGE | PRESENTATION CAPABILITY | LINKABLE ANCHOR OBJECT | ANCHOR OBJECT ARRANGEMENT |
|---|---|---|---|---|---|
| RELATED ART | Home Page | HTML | TWO-DIMENSIONAL PLANE | TEXT AND BUTTON (TWO-DIMENSIONL ICON) ARRANGED ON PAGE | ANY LINE ON PAGE |
| PRESENT INVENTION | Entryroom | VRML | THREE-DIMENSIONAL SPACE | THREE-DIMENSIONAL ICON ARRANGE IN SPACE | ANY COORDINATES IN THREE-DIMENSIONAL SPACE |

THREE-DIMENSIONAL VIRTUAL REALITY SPACE DISPLAY PROCESSING APPARATUS, A THREE-DIMENSIONAL VIRTUAL REALITY SPACE DISPLAY PROCESSING METHOD, AND AN INFORMATION PROVIDING MEDIUM

BACKGROUND OF THE INVENTION

The present invention generally relates to a three-dimensional virtual reality space display processing apparatus, a three-dimensional virtual reality space display processing method, and an information providing medium and, more particularly, to a three-dimensional virtual reality space display processing apparatus, a three-dimensional virtual reality space display processing method, and an information providing medium that allow a user who wants to use three-dimensional virtual reality spaces to directly and easily select a desired three-dimensional virtual reality space through an integrated GUI (Graphical User Interface).

A cyberspace service named Habitat (trademark) is known in the so-called personal computer communications services such as NIFTY-Serve (trademark) of Japan and CompuServe (trademark) of US in which a plurality of users connect their personal computers via modems and public telephone network to the host computers installed at the centers of the services to access them in predetermined protocols. Development of Habitat started in 1985 by Lucas Film of the US, operated by Quantum Link, one of US commercial networks, for about three years. Then, Habitat started its service in NIFTY-Serve as Fujitsu Habitat (trademark) in February 1990 . In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation of "Cyberspace: First Steps," Michael Benedikt, ed., 1991, MIT Press Cambridge, Mass., ISBNO-262-02327-X, the translation being published Mar 20, 1994, by NTT Publishing, ISBN4-87188-265-9C0010, pp. 282–307.

In order to implement the above-mentioned cyberspace system by use of the infrastructure of the Internet through which information can be transferred all over the world, standardization of a three-dimensional graphics description language called VRML (Virtual Reality Modeling Language) is proceeding.

In WWW (World Wide Web) of the Internet, document data can be described in HTML (Hyper Text Markup Language) and the resultant HTML file can be stored in a WWW server. This HTML file can be transferred on demand by a client terminal and can be displayed by use of the HTML browser of that client terminal.

Like this HTML file, three-dimensional graphics data can be described in VRML and the resultant VRML file can be stored in a WWW server. This VRML file can be transferred on demand by a client terminal and can be displayed by use of the VRML browser of that client terminal.

The applicant hereof has developed CyberPassage (trademark) as application software that includes this VRML browser capable of decoding this VRML file to draw and display the decoded result as a three-dimensional space.

This CyberPassage is composed of the following three software programs:
(1) CyberPassage Browser
    This is a VRML browser which is based on VRML 1.0 and prefetches the capabilities (motion and sound) of VRML 2.0 to support E-VRML that provides moving picture capability. In addition, this provides the multi-user capability which can be connected to CyberPassage Bureau. For the script language, TCL/TK is used.
(2) CyberPassage Conductor
    This is a VRML authoring system which is based on E-VRML based on VRML 1.0. This tool can not only simply construct a three-dimensional world but also give a behavior, a sound, and an image to the three-dimensional world with ease.
(3) CyberPassage Bureau
    This is used for a server terminal system for enabling people to meet each other in a virtual reality space constructed on a network, connected from the CyberPassage Browser.

Using (mainly viewing) a three-dimensional virtual reality space by use of a VRML browser such as the above-mentioned CyberPassage Browser requires to specify a VRML file stored in a WWW server by URL (Uniform Resource Locator, an address for uniquely specifying Internet resources) or select a VRML file described with a desired three-dimensional virtual reality space from among a plurality of VRML files stored on the HDD (Hard Disc Drive) or CD-ROM disc of a client terminal and read the selected file.

For example, in the above-mentioned conventional CyberPassage Browser, the user operates the mouse to select "Open File" from the "File" drop-down menu in the menu bar as shown in FIG. 38. The user must visually find a directory (also called a folder) storing the desired VRML file from the directory tree displayed in the dialog box of "Open File" displayed by the selection. Then, the user must move the pointer to the VRML file in that directory and click the mouse. Thus, searching for the VRML file described with a desired three-dimensional virtual reality space requires complicated and cumbersome operations.

FIG. 38 shows a display screen in which "Open File" dialog box is displayed again for explanation after displaying a UFO world (a three-dimensional virtual reality space) by selecting a VRML file having file name Main.wrl stored in directory R:/SONY/WORLD/TOYWORLD/UFO/.

As seen from FIG. 38, seeing a file name only does not allow intuitive understanding of what kind of a virtual world that three-dimensional virtual reality space is.

SUMMARY OF THE INVENTION

It is therefore an object of the present invention to allow a user of a three-dimensional virtual reality space to directly and easily select any desired three-dimensional virtual reality space through an integrated three-dimensional GUI (Graphical User Interface).

In carrying out the invention and according to one aspect thereof, there are provided a three-dimensional virtual reality space display processing apparatus a three-dimensional virtual reality space display processing method and, and an information providing medium that store three-dimensional graphics data in a storage means on a file basis in which each three-dimensional virtual reality space is described, automatically generate three-dimensional graphics data described with an entry room having a three-dimensional array of three-dimensional icons corresponding to the three-dimensional graphics data stored in the storage means on a file basis, and display a three-dimensional virtual reality space corresponding to this automatically generated entry room.

This novel constitution allows a user of a three-dimensional virtual reality space to directly and easily select any desired three-dimensional virtual reality space through an integrated three-dimensional GUI (Graphical User Interface).

It should be noted that the information providing medium herein denotes not only package media such as a floppy disk and a CD-ROM in which computer programs are stored but also a transmission medium by which a computer program is downloaded via a network such as the Internet for example.

In the following description, an object "avatar" representing user's alter ego can move around inside a virtual reality space, enter in and walk off it. The avatar can change (or update) its states inside a virtual reality space. Therefore, such an object is hereafter referred to as an update object appropriately. On the other hand, an object representative of a building constituting a town in the virtual reality space is used commonly by a plurality of users and does not change in its basic state. Even if the building object changes, it changes autonomously, namely it changes independent of the operations made at client terminals. Such an object commonly used by a plurality of users is appropriately called a basic object hereafter.

BRIEF DESCRIPTION OF THE DRAWINGS

The above and other objects, features and advantages of the present invention will be apparent from the following detailed description of the preferred embodiments of the invention in conjugation with the accompanying drawings, in which:

FIG. 13 describes a view field seen from avatar C of FIG. 12;

FIG. 22 describes destinations in which basic objects and update objects are stored;

FIG. 23 describes an arrangement of basic objects and update objects;

FIG. 26 describes an environment in which the software of FIG. 25 operates;

FIG. 35 is a table showing a relationship between a conventional HTML home page and the VRML entry room according to the invention;

DETAILED DESCRIPTION OF PREFERRED EMBODIMENTS

Figure 1:
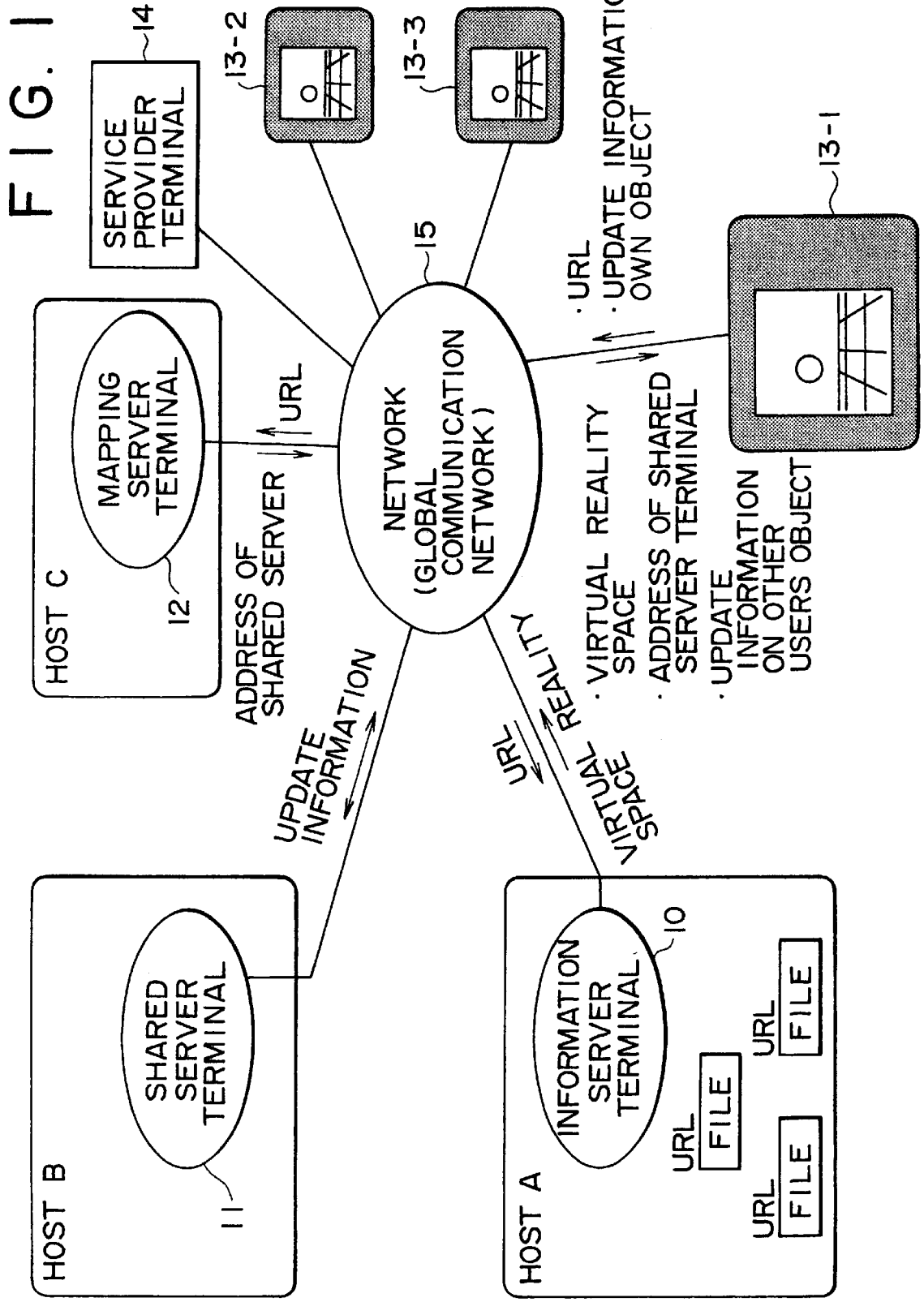
FIG. 1 is a block diagram illustrating a cyberspace system practiced as one preferred embodiment of the invention.

This invention will be described in further detail by way of example with reference to the accompanying drawings. The basic idea and concept of a virtual society is described by Hiroaki Kitano, Sony Computer Science Laboratories, as follows in his home page "Kitano Virtual Society (V1.0) (http://www.csl,sony.co.jp/person/kitano/VS/concept.j.html.1995)":

"In the beginning of the 21st century, a virtual society would emerge in a network spanning all the world. People in every part of the world will make a society in which millions or hundred millions of people live in a shared space created in the network. A society that will emerge beyond the current Internet, CATV, and the so-called information super highway is a virtual society that I conceive. In the virtual society, people can not only perform generally the same social activities as those in the real world—enjoy shopping, have a chat, play games, do work, and the like—but also perform things that are possible only in the virtual society (for example, moving from Tokyo to Paris in an instant). Such a "society" would be implemented only by state-of-the-art technologies such as cyberspace constructing technologies that support a broadband network, high-quality three-dimensional presentation capability and bidirectional communications of voice, music and moving picture signals, and a large-scale distributed system that allows a lot of people to share the constructed space."

For further details, look at the above mentioned home page.

The three-dimensional virtual reality space that implements the above-mentioned virtual society is a cyberspace system. The actual examples of the infrastructures for constructing this cyberspace system includes, at this point of time, the Internet, which is a world-wide computer network connected by a communications protocol called TCP/IP (Transmission Control Protocol/Internet Protocol) and the intranet implemented by applying the Internet technologies such as WWW (World Wide Web) to the in-house LAN (Local Area Network). Further, use of a broadband communication network based on FTTH (Fiber To The Home) in the future is proposed in which the main line system and the subscriber system are all constituted by fiber optics.

Meanwhile, for an information providing system available on the Internet, WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called an HTTP demon and an HTML file in which hyper text information is stored. The hyper text information is described in a description language called HTML (Hyper Text Makeup Language). In the description of a hyper text by HTML, a logical structure of a document is expressed in a format specification called a tag enclosed by "<" and ">". Description of linking to other information is made based in link information called an anchor. A method in which a location at which required information is stored by the anchor is URL (Uniform Resource Locator).

A protocol for transferring a file described in HTML on the TCP/IP network is HTTP. This protocol has a capability of transferring a request for information from a client to the WWW server and the requested hyper text information stored in the HTML file to the client.

Used by many as an environment for using WWW is client software such as Netscape Navigator™ called a WWW browser.

It should be noted that demon denotes a program for executing control and processing in the background when performing a job in the UNIX environment.

Recently, a language for describing three-dimensional graphics data, called VRML (Virtual Reality Modeling Language) and a VRML viewer for drawing a virtual reality space described in this VRML on a personal computer or a workstation have been developed. VRML allows to extend WWW, set hyper text links to objects drawn by three-dimensional graphics, and follow these links to sequentially access WWW server terminals. The specifications of VRML version 1.0 were made public in May 26, 1995. Then, in Nov. 9, 1995, a revised version in which errors and ambiguous expressions are corrected was made public. The specifications are available from URL=http://www.vrml.org/Specifications/VRML1.0/.

Storing three-dimensional information described in the above-mentioned VRML in a WWW server terminal allows the construction of a virtual space expressed in three-dimensional graphics on the Internet. Further, use of the VRML viewer by using personal computers and the like interconnected by the Internet can implement the display of a virtual space based on three-dimensional graphics and the walk-through capability.

In what follows, examples in which the Internet is used for a network will be described. It will be apparent to those skilled in the art that FTTH may be used instead of the Internet to implement the virtual space.

It should be noted that Cyberspace is a coinage by William Gibson, a US science fiction writer, and was used in his "Neuromancer" (1984) that made him famous. Strictly speaking, however, the word Cyberspace first appeared in his "Burning Chrome" (1982). In these novels, there are scenes in which the hero attaches a special electrode on his forehead to connect himself to a computer to directly reflect on his brain a virtual three-dimensional space obtained by visually reconfiguring data on a computer network spanning all over the world. This virtual three-dimensional space was called Cyberspace. Recently, the term has come to be used as denoting a system in which a virtual three-dimensional space is used by a plurality of users via a network.

Now, referring to FIG. 1, there is shown an example of a constitution of a cyberspace (a three-dimensional virtual reality space provided via a network) system according to the present invention. As shown, in this preferred embodiment, host computers (or simply hosts) A through C, a plurality (three in this case) of client terminals 13-1 through 13-3, and any number (one in this case) of service provider terminal 14 are interconnected via a world-wide network 15 (a global communication network sometimes referred to as an information transmission medium herein) like the Internet 15 by way of example.

The host A constitutes a system of so-called WWW (World Wide Web) for example. Namely, the host A has information (or a file) to be described later. And, each piece of information (or each file) is related with a URL (Uniform Resource Locator) for uniformly specify that information. Specifying a URL allows access to the information corresponding to it.

To be more specific, the host A stores three-dimensional image data for providing three-dimensional virtual reality spaces (hereinafter appropriately referred to simply as virtual reality spaces) such as virtual streets in Tokyo, New York, and other locations for example. It should be noted that these three-dimensional image data do not change in their basic state; that is, these data include static data consisting of only basic objects such as a building and a road to be shared by a plurality of users. If the basic state changes, it only reflects an autonomous change in the state of a merry-go-round or a neon. The static data are considered to be data that are not subject to update. The host A has an information server terminal 10 (a basic server terminal). The information server terminal 10 is adapted, when it receives a URL via the network 15, to provide the information corresponding to the received URL, namely a corresponding virtual reality space (in this case, a space consisting of only basic objects).

It should be noted that, in FIG. 1, there is only one host, namely the host A, which has an information server terminal for providing the virtual reality space (consisting of only basic objects) of a specific area. It is apparent that such a host may be installed in plural.

The host B has a shared server terminal 11. The shared server terminal 11 controls update objects that constitute a virtual reality space when put in it. The update objects are avatars for example representing users of the client terminals. Thus, the shared server terminal 11 allows a plurality of users to share the same virtual reality space. It should be noted, however, that the host B controls only the update objects located in a virtual reality space for only a specific area (for example, Tokyo) of the virtual reality spaces controlled by the host A. That is, the host B is dedicated to the virtual reality space of a specific area. Also, it should be noted that the network 15 is connected with, in addition to the host B, a host, not shown, having a shared server terminal for controlling update objects located in virtual reality spaces of other areas such as New York and London, stored in the host A.

The host C, like the host A, constitutes a WWW system for example and stores data including IP (Internet Protocol) addresses for addressing hosts (shared server terminals) that control update objects like the host B. Therefore, the shared server terminal addresses stored in the host C are uniformly related with URLs as with the case of the host A as mentioned above. In addition, the host C has a mapping server terminal 12 (a control server terminal). Receiving a URL via the network 15, the mapping server terminal 12 provides the IP address of the shared server terminal corresponding to the received URL via the network 15. It should be noted that FIG. 1 shows only one host, namely the host C, which has the mapping server terminal 12 for providing shared server terminal addresses. It will be apparent that the host C can be installed in plural.

The client terminal 13 (13-1, 13-2 or 13-3) receives a virtual reality space from the information server terminal 10 via the network 15 to share the received virtual reality space with other client terminals (including the service provider terminal 14), under the control of the shared server terminal 11. Further, the client terminal 13 is also adapted to receive specific services (information) using the virtual reality space from the service provider terminal 14.

The service provider terminal 14, like the client terminal 13, receives a virtual reality space to share the same with the client terminal 13 (if there is another service provider terminal, it also shares this space). Therefore, as far as the capability of this portion is concerned, the service provider terminal 14 is the same as the client terminal 13.

Further, the service provider terminal 14 is adapted to provide specific services to the client terminal 13. It should be noted that FIG. 1 shows only one service provider terminal 14. It will be apparent that the service provider terminal may be installed in plural.

Figure 2:
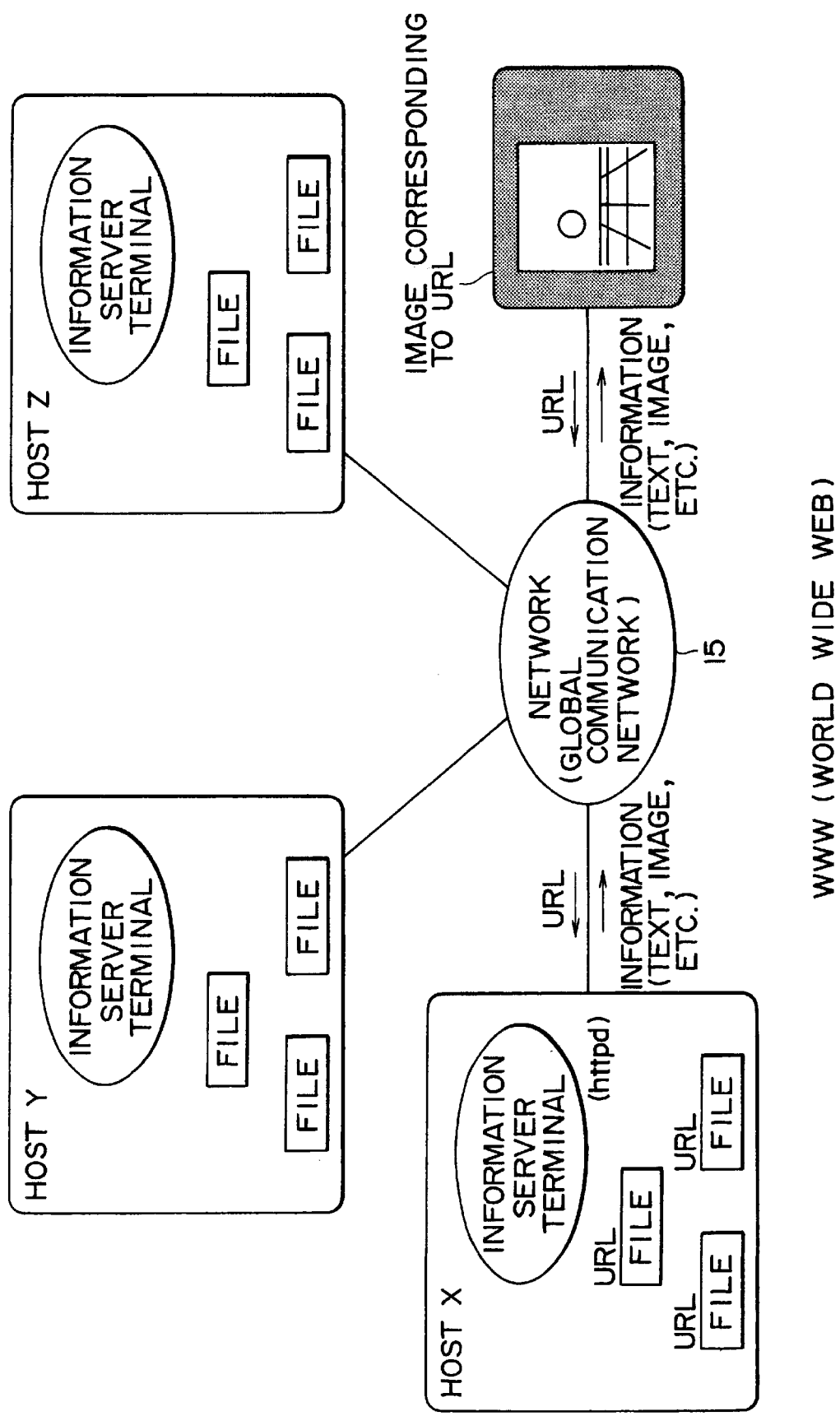
FIG. 2 describes WWW (World Wide Web)

The following briefly describes a WWW system constituted by the host A and the host C. Referring to FIG. 2, WWW is one of the systems for providing information from hosts X, Y, and Z to unspecified users (client terminals) via the network 15 (the Internet in the case of WWW). The information that can be provided in this system include not only texts but also graphics, images (including still images and moving pictures), voices, three-dimensional images, and hyper texts which combines all these information.

Figures 3, 4:
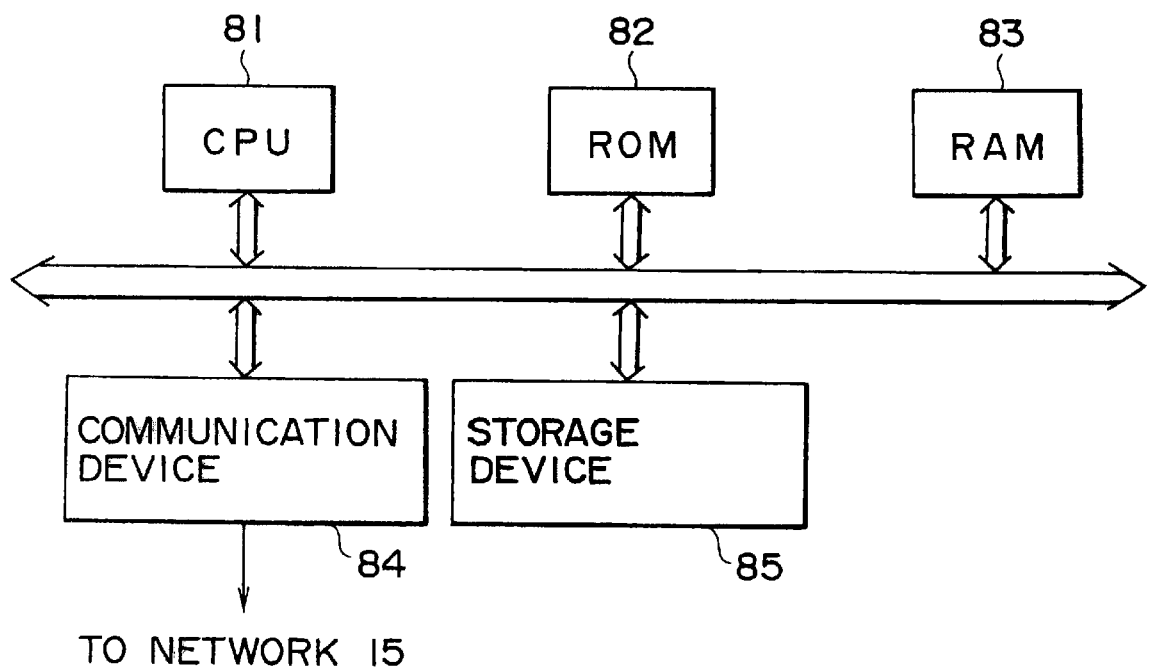
FIG. 3 is a diagram illustrating an example of a URL (Uniform Resource Locator)
FIG. 4 is a block diagram illustrating an example of the constitution of an information server terminal 10 of FIG. 1.

In WWW, a URL, or a form for uniformly represent these pieces of information is determined. Specifying a specific URL, each user can obtain the information corresponding to the specified URL. As shown in FIG. 3, each URL is composed of a protocol type for representing a service type (http in the preferred embodiment of FIG. 3, which is equivalent to a command for retrieving a file corresponding to a file name to be described later and send the retrieved file), a host name indicating a destination of the URL (in the embodiment of FIG. 3, www.csl.sony.co. jp), and a file name of data to be sent (in the embodiment of FIG. 3, index.html) for example.

Each user operates the client terminal to enter a URL for desired information. When the URL is entered, the client terminal references a host name, for example, contained in the URL. A link with a host (in the embodiment of FIG. 2, the host X for example connected to the Internet) addressed by the host name is established. Then, at the client terminal, the URL is sent to the linked host, namely the host X, via the Internet, requesting the host X for sending the information specified in the URL. In the host X, an HTTP demon (httpd) is operating on the information server terminal (the WWW server terminal). Receiving the URL, the information server terminal sends back the information specified in the URL to the client terminal via the Internet.

The client terminal receives the information from the information server terminal to display the received information on its monitor as required. Thus, the user can get the desired information.

Therefore, only storing in the host such data for describing elements (objects) for constituting a virtual reality space as shapes of basic objects (for example, a rectangular prism and a cone) and locations and attributes (color and texture for example) of these basic objects allows to provide the virtual reality space (consisting of only basic objects in this case) to unspecified users. Namely, as long as the Internet is used for the network 15 and WWW is used, virtual reality spaces can be provided to unspecified users world-wide with ease and at a low cost because the Internet itself already spans almost all over the world and the description of the elements constituting each virtual reality space to be stored in hosts does not require to make changes to information servers (WWW server terminals) constituting WWW. It should be noted that the service for providing the description of the elements constituting a virtual reality space is upward compatible with existing services provided by WWW.

Storing in a specific host (a mapping server terminal) the IP addresses of other hosts as information also allows to provide the host IP addresses to unspecified users worldwide with ease.

It should be noted that it is difficult for a plurality of users to share the same virtual reality space if only the description (the data of three-dimensional image for providing the virtual reality space of a specific area) of elements constituting the virtual reality space is stored in a host constituting WWW. Namely, in WWW, the information corresponding to a URL is only provided to a user and therefore no control for information transfer is performed. Hence, it is difficult to transfer between users the above-mentioned change information of update objects by using WWW without changing its design. Therefore, in the cyberspace system of FIG. 1, the host B having the shared server terminal 11 and the host C having the mapping server 12 are installed to allow a plurality of users to share the same virtual reality space, details of which will be described later.

Next, FIG. 4 shows an example of the constitution of the information server terminal 10 that operates on the host A of FIG. 1. As shown in FIG. 4, the information server terminal 10 has a CPU 81 which performs a variety of processing operations according to a program stored in a ROM 82. In the information server 10, the above-mentioned HTTP demon is operating in the background. A RAM 83 stores data and program necessary for the CPU 81 to perform the variety of processing operations. A communication device 84 is adapted to transfer specific data with the network 15. A storage device 85 composed of a hard disc, an optical disc, and magneto-optical disc stores the data of the three-dimensional images for providing a virtual reality space of a specific area such as Tokyo or New York for example along with URLs as mentioned above.

Figure 5:
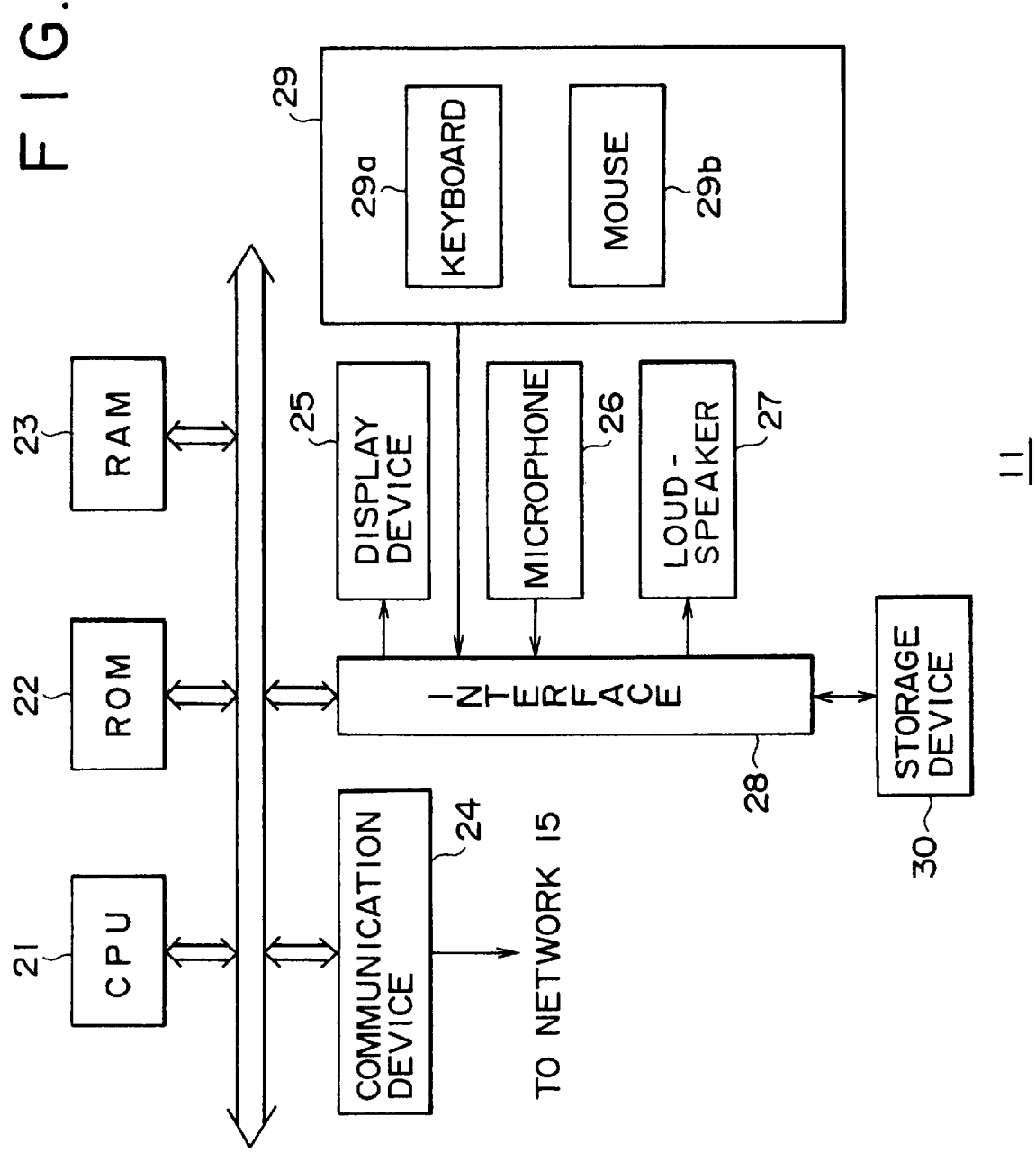
FIG. 5 is a block diagram illustrating an example of the constitution of a shared server terminal 11 of FIG. 1.

FIG. 5 shows an example of the constitution of the shared server terminal 11 operating on the host B of FIG. 1. As shown, the shared server terminal has a CPU 21 which executes a variety of processing operations according to a program stored in a ROM 22. A RAM 23 appropriately stores data and a program necessary for the CPU 21 to execute the variety of processing operations. A communication device 24 transfers specific data with the network 15.

A display device 25 has a CRT (Cathode Ray Tube) or an LCD (Liquid Crystal Display) for example and is connected to interface 28 to monitor images of the virtual reality space (composed of not only basic objects but also update objects) of an area controlled by the shared server terminal 11. The interface 28 is also connected with a microphone 26 and a loudspeaker 27 to supply a specific voice signal to the client terminal 13 and the service provider terminal 14 and monitor a voice signal coming from these terminals.

The shared server terminal 11 has an input device 29 on which a variety of input operations are performed via the interface 28. This input device has at least a keyboard 29a and a mouse 29b.

A storage device 30 composed of a hard disc, an optical disc, and a magneto-optical disc stores data of the virtual reality space of an area controlled by the shared server terminal 11. It should be noted that the data of the virtual reality space are the same as those stored in the storage device 85 of the information server terminal 10 (of FIG. 4). When these data are displayed on the display device 25, the virtual reality space of the area controlled by the shared server terminal 11 is displayed.

Figure 6:
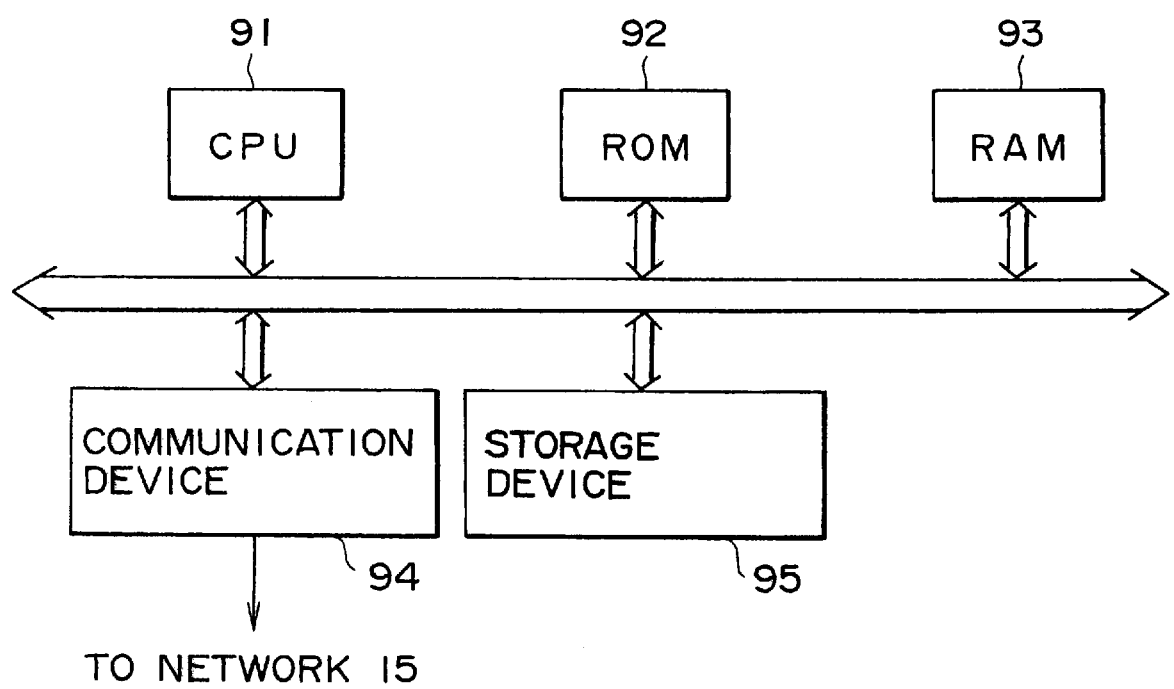
FIG. 6 is a block diagram illustrating an example of the constitution of a mapping server terminal 12 of FIG. 1.

FIG. 6 shows an example of the constitution of the mapping server terminal 12 operating on the host C of FIG. 1. Components CPU 91 through communication device 94 are generally the same in constitution as those of FIG. 4, so that the description of the components of FIG. 6 is omitted in general. A storage device 95 stores addresses, along with URLs, for identifying shared server terminals that control update objects (in the embodiment of FIG. 1, only the shared server terminal 11 is shown; actually, other shared server terminals, not shown, are connected to the network 15).

Figure 7:
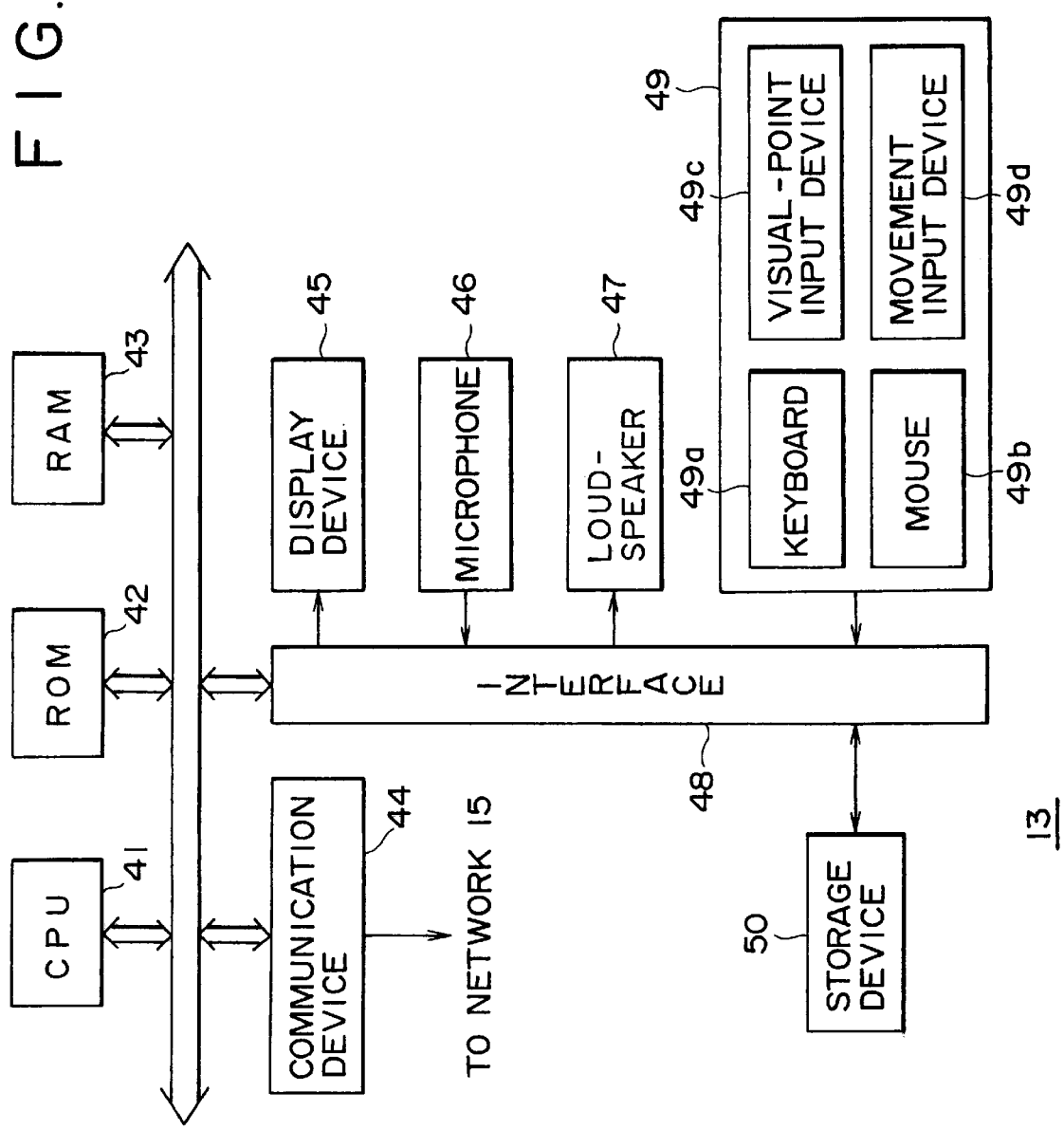
FIG. 7 is a block diagram illustrating an example of the constitution of a client terminal 13 of FIG. 1.

FIG. 7 shows an example of the constitution of the client terminal 13 (actually, client terminals 13-1 through 13-3). The client terminal 13 has a CPU 41 which executes a variety of processing operations according to a program stored in a ROM 42. A RAM 43 appropriately stores data and a program necessary for the CPU 41 to executes the variety of processing operations. A communication device 44 transfers data via the network 15.

A display device 45 has a CRT or an LCD to display three-dimensional images created by computer graphics or taken by an ordinary video camera. A microphone 46 is used to output a voice signal to the shared server terminal 11. A loudspeaker 47 outputs the voice signal coming from the shared server terminal 11. An input device 49 is operated to perform a variety of input operations.

A keyboard 49a of the input device 49 is operated when entering text (including an URL) composed of specific characters and symbols. A mouse 49b is operated when entering specific positional information. A viewpoint input device 49c and a movement input device 49d are operated when changing the state of the avatar as an update object of the client terminal 13. That is, the viewpoint input device 49c is used to enter the viewpoint of the avatar of the client terminal 13, thereby moving the viewpoint of the avatar vertically, horizontally or in the depth direction. The movement input device is used to move the avatar in the forward and backward direction or the right and left direction at a specific velocity. It is apparent that the operations done through the viewpoint and movement input devices may also be done through the above-mentioned keyboard 49a and the mouse 49b.

A storage device 50 composed of a hard disc, an optical disc, and magneto-optical disc stores avatars (update objects) representing users. Further, the storage device 50 stores a URL (hereinafter appropriately referred to as an address acquisition URL) for acquiring an IP address of a shared server terminal for managing update objects to be located in the virtual reality space of each area stored in the information server terminal 10 (if there is an information server terminal other than the information server terminal 10, that information server terminal is included). The address acquisition URL is stored as associated with a URL (hereinafter appropriately referred to as a virtual reality space URL) corresponding to the data of the virtual reality space of that area. This setup allows to obtain the address acquisition URL for acquiring the IP address of the shared server terminal for controlling the virtual reality space of that area when the virtual reality space URL for the data of the virtual reality space for that area has been entered.

Interface 48 constitutes the data interface with a display device 45, a microphone 46, a loudspeaker 47, an input device 49, and the storage device 50.

Figure 8:
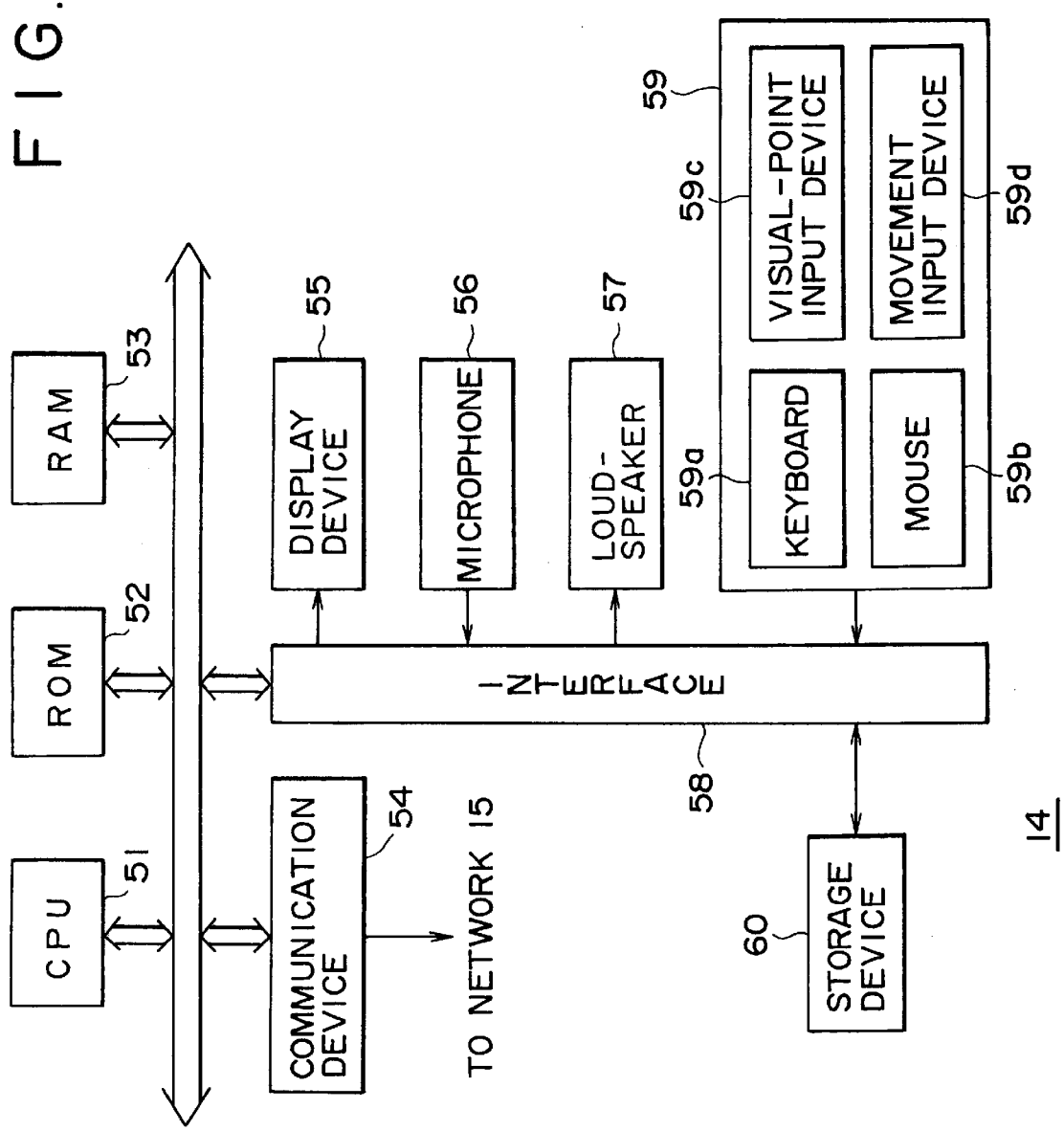
FIG. 8 is a block diagram illustrating an example of the constitution of a server provider terminal 14 of FIG. 1.

FIG. 8 shows an example of the constitution of the service provider terminal 14 of FIG. 1. The components including a CPU 51 through a storage device 60 are generally the same as the components including the CPU 41 through the storage device 50 and therefore the description of the CPU 51 through the storage device 60 is omitted.

Figure 9:
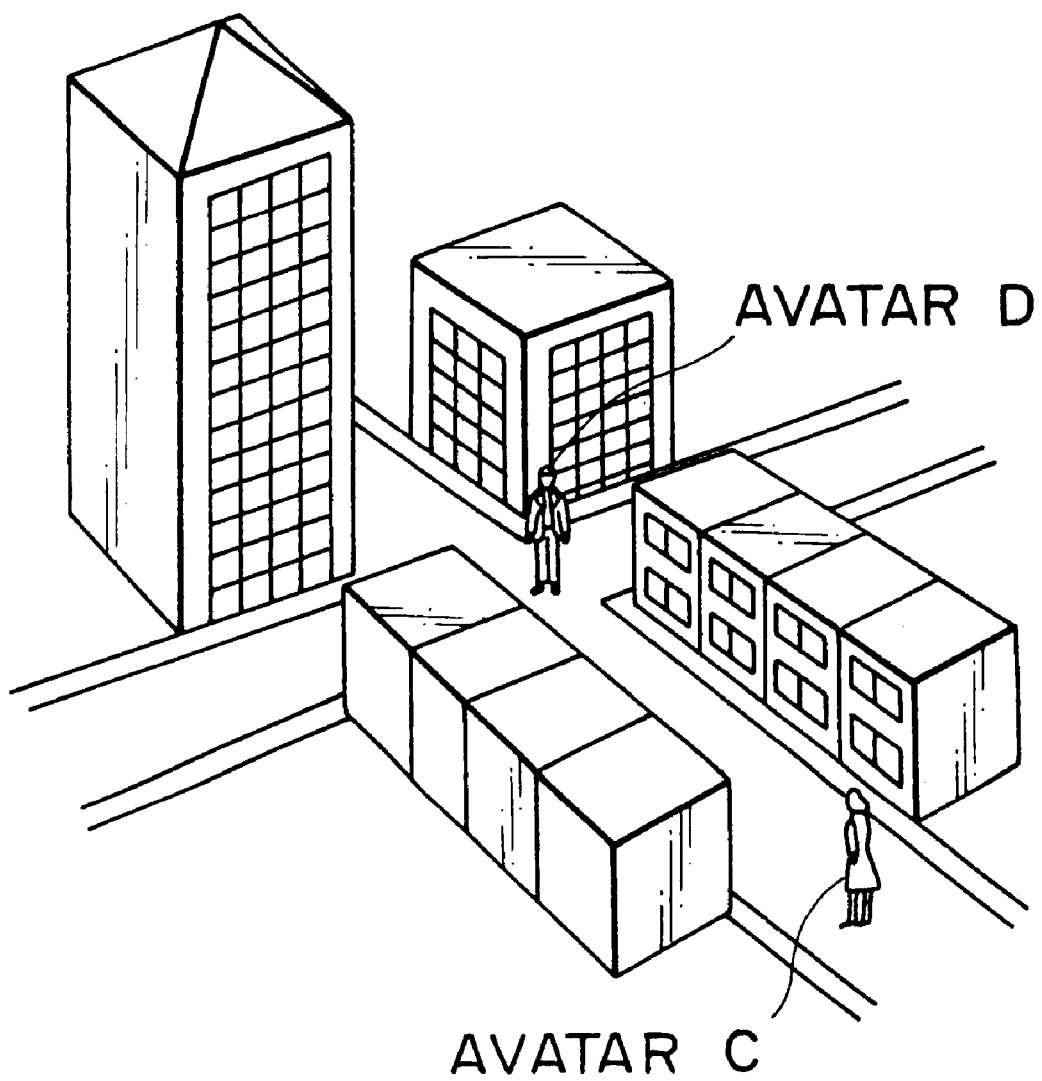
FIG. 9 describes a virtual reality space formed by the cyberspace system of FIG. 1.

FIG. 9 shows schematically a virtual reality space that is provided by the information server terminal 10 of FIG. 1 and can be shared by a plurality of users under the control of the shared server terminal 11. As shown in FIG. 9, this virtual reality space constitutes a town, in which avatar C (avatar of the client terminal 13-1 for example) and avatar D (avatar of the client terminal 13-2 for example) can move around.

Figure 10:
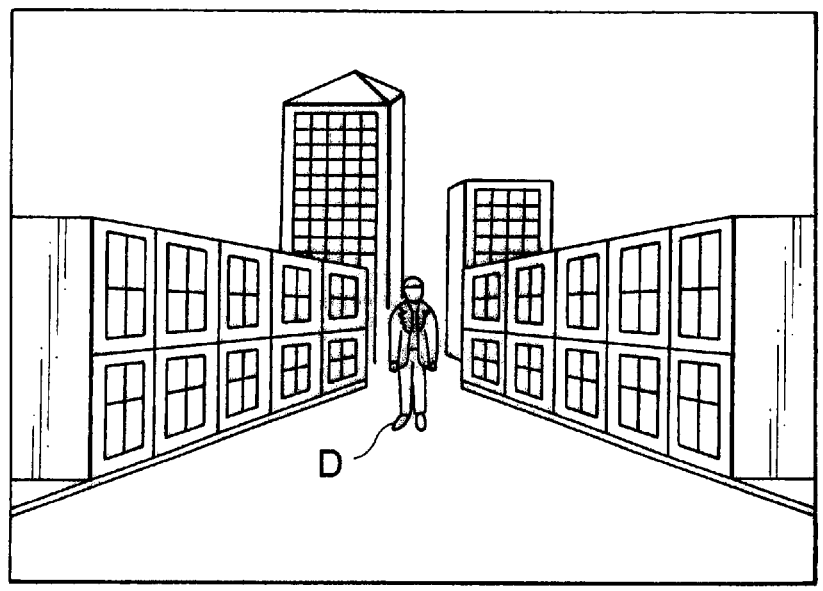
FIG. 10 describes a view field seen from avatar C of FIG. 9.

Avatar C sees an image as shown in FIG. 10 for example from the position and viewpoint in the virtual reality space. Namely, data associated with the basic objects constituting the virtual reality space are provided to the client terminal 13-1 from the information server terminal 10 to be stored in a RAM 43 (or a storage device 50). Then, from the RAM 43 (or the storage device 50), data are read out of a virtual reality space that can be seen when the same is seen from specific viewpoint and position and the read data are supplied to the display device 45. Then, when the viewpoint and position of avatar C are changed by operating a viewpoint input device 49c and a movement input device 49d, data corresponding the change are read from the RAM 43 (or the storage device 50) to be supplied to the display device 45, thereby changing the virtual reality space (the three-dimensional image) being displayed on the display device 45.

Further, data associated with another user's avatar (an update object) (avatar D of FIG. 10) that can be seen when the virtual reality space is seen from the current viewpoint and position are supplied to the client terminal 13-1 from the shared server terminal 11. Based on the supplied data, the display on the display device 45 is changed. Namely, in the state of FIG. 9, since avatar C is looking in the direction of avatar D, avatar D is displayed in the image (the virtual reality space) displayed on the display device 45 of the client terminal 13-1 as shown in FIG. 10.

Figure 11:
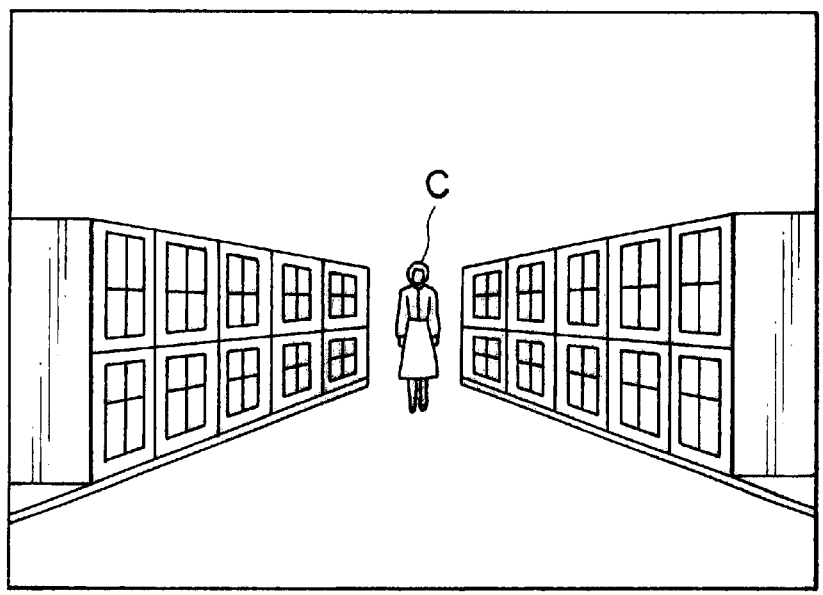
FIG. 11 describes a view field seen from avatar D of FIG. 9.

Likewise, an image as shown in FIG. 11 is displayed on the display device 45 of the client terminal 13-2 to which avatar D corresponds. This displayed image is also changed by moving the viewpoint and position of avatar D. It should be noted that, in FIG. 9, avatar D is looking in the direction of avatar C, so that avatar C is displayed in the image (the virtual reality space) on the display device 45 of the client terminal 13-2 as shown in FIG. 11.

The service provider terminal 14 controls a part of the sharable virtual reality space provided by the information server terminal 10 and the shared server terminal 11. In other words, the service provider purchases a part of the virtual reality space from administrators (information providers who provide information of the virtual reality space) of the information server terminal 10 and the shared terminal 11. This purchase is performed in the real space. Namely, upon request by a specific service provider for the purchase of the virtual reality space, the administrators of the information server terminal 10 and the shared server terminal 11 allocate a part of the requested virtual reality space to that specific service provider.

For example, assume that the owner (service provider) of the service provider terminal 14 lease a room in a specific building in the virtual reality space and use the room as a shop for electric appliances. The service provider provides information about commodities, for example televisions, to be sold in the shop. Based on the information, the server terminal administrator creates three-dimensional images of the televisions by computer graphics and place the created images at specific positions in the shop. Thus, the images to be placed in the virtual reality space have been completed.

Similar operations are performed by other service providers to form the virtual reality space as a big town for example.

Figure 12:
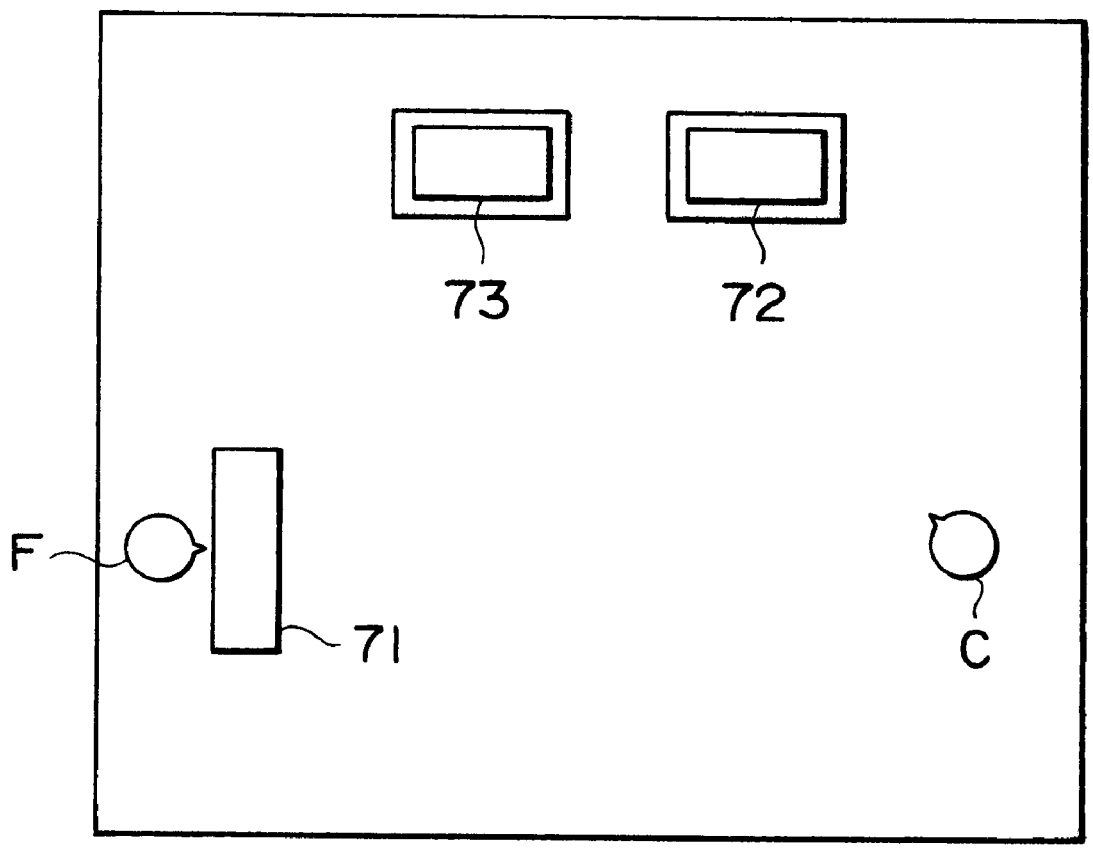
FIG. 12 describes an allocated space of a part of the cyberspace of FIG. 1.

FIG. 12 is a top view of a virtual reality space (a room in a building in this example) to be occupied by the service provider owning the service provider terminal 14. In this embodiment, one room of the building is allocated to this service provider in which two televisions 72 and 73 are arranged with a service counter 71 placed at a position shown. The service provider of the service provider terminal 14 places his own avatar F behind the service counter 71. It will be apparent that the service provider can move avatar F to any desired position by operating a movement input device 59d of the service provider terminal 14.

Figure 14:
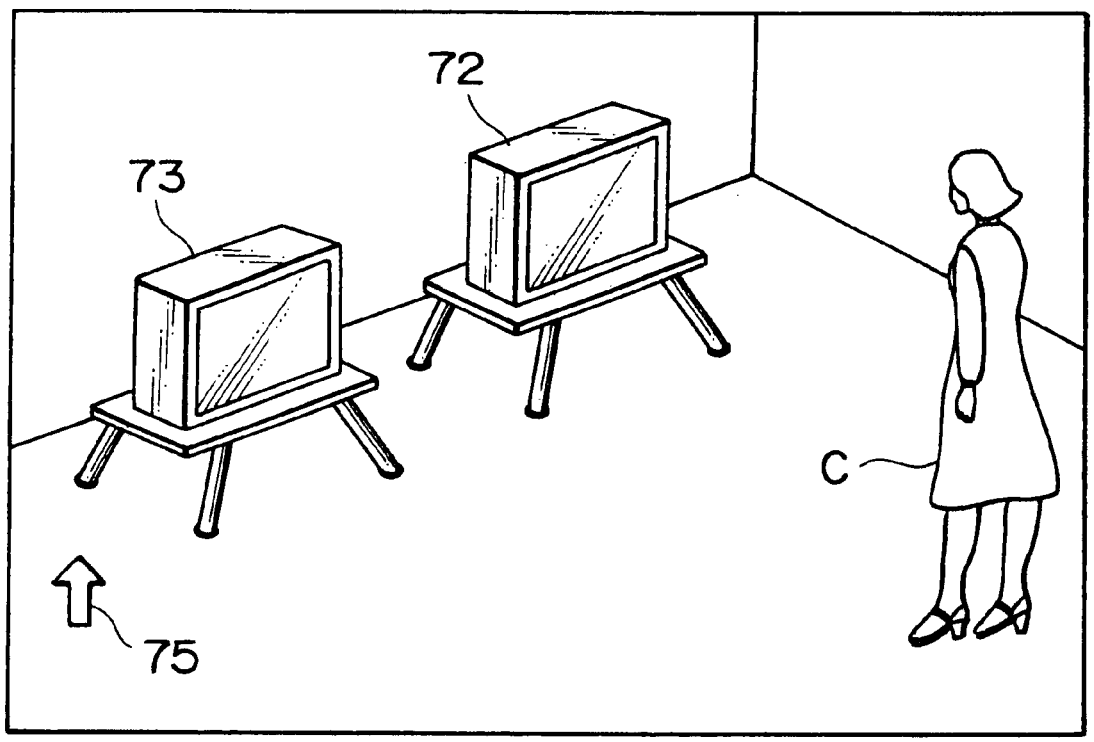
FIG. 14 describes a view field seen from avatar F of FIG. 12.

Now, assume that avatar C of the client terminal 13-1 has come in this electric appliances shop as shown in FIG. 12. At this moment, an image as shown in FIG. 13 for example is displayed on the display device 45 of the client terminal 13-1, in correspondence to the position and viewpoint of avatar C. If avatar F is located behind the service counter 71, an image as shown in FIG. 14 is displayed on a display device 55 of the service provider terminal 14. As shown in FIGS. 13 and 14, the image viewed from avatar C shows avatar F, while the image viewed from avatar F shows avatar C.

As shown in FIG. 13, the image viewed from avatar C shows a cursor 74 to be used when a specific image is specified from the client terminal 13-1. Likewise, as shown in FIG. 14, a cursor 75 is shown for the service provider terminal 14 to specify a specific image.

Moving avatar C around the television 72 or 73 by operating the movement input device 49d of the client terminal 13-1 displays on the display device 45 the image corresponding to avatar C's moved position and viewpoint. This allows the user to take a close look at the televisions as if they were exhibited in a shop of the real world.

Also, when the user moves the cursor 74 by operating a mouse 49b and then click on avatar F, a conversation request signal is transmitted to the service provider terminal 14 corresponding to avatar F. Receiving the conversation request signal, the service provider terminal 14 can output, via a microphone 56, a voice signal to a loudspeaker 47 of the client terminal 13-1 corresponding to avatar C. Likewise, entering a specific voice signal from a microphone 46 of the client terminal 13-1 can transmit user's voice signal to a speaker 57 of the service provider terminal 14. Thus, the user and service provider can make conversation in a usual manner.

It is apparent that the conversation can be requested from avatar F (the service provider terminal 14) to avatar C (the client terminal 13-1).

When the cursor 74 is moved on the client terminal 13-1 and the image of the television 72 for example is clicked, the information (the provided information) describing the television 72 is provided in more detail. This can be implemented by linking the data of the virtual reality space provided by the information server terminal 10 with the description information about the television. It is apparent that the image for displaying the description information may be either three-dimensional or two-dimensional.

The specification of desired images can be performed also from the service provider terminal 14. This capability allows the service provider to offer the description information to the user in a more active manner.

If the service provider specifies avatar C with the cursor 75 by operating the mouse 59b, the image corresponding to the position and viewpoint of avatar C, namely, the same image as displayed on the display device 45 of the client terminal 13-1 can be displayed on the display device 55 of the service provider terminal 14. This allows the service provider to know where the user (namely avatar C) is looking at and therefore promptly offer information needed by the user.

The user gets explanations about the products, or gets the provided information or description information. If the user wants to buy the television 72 for example, he can buy the same actually. In this case, the user requests the service provider terminal 14 for the purchase via avatar F. At the same time, the user transmits his credit card number for example to the service provider terminal 14 (avatar F) via avatar C. Then, the user asks the service provider terminal for drawing an amount equivalent to the price of the television purchased. The service provider of the service provider terminal 14 performs processing for the drawing based on the credit card number and make preparations for the delivery of the purchased product.

The images provided in the above-mentioned virtual reality space are basically precision images created by computer graphics. Therefore, looking at these images from every angle allows the user to make observation of products almost equivalent to the observation in the real world, thereby providing surer confirmation of products.

Thus, the virtual reality space contains a lot of shops, movie houses and theaters for example. Because products can be actually purchased in the shops, spaces installed at favorable locations create actual economic values. Therefore, such favorable spaces themselves can be actually (namely, in the real world) purchased or leased. This provides complete distinction from the so-called television shopping system ordinarily practiced.

The following describes the operations of the client terminal 13 (or the service provider terminal 14), the information server terminal 10, the mapping server terminal 12, and the shared server terminal 11 with reference to the flowcharts of FIGS. 15 through 18.

Figure 15:
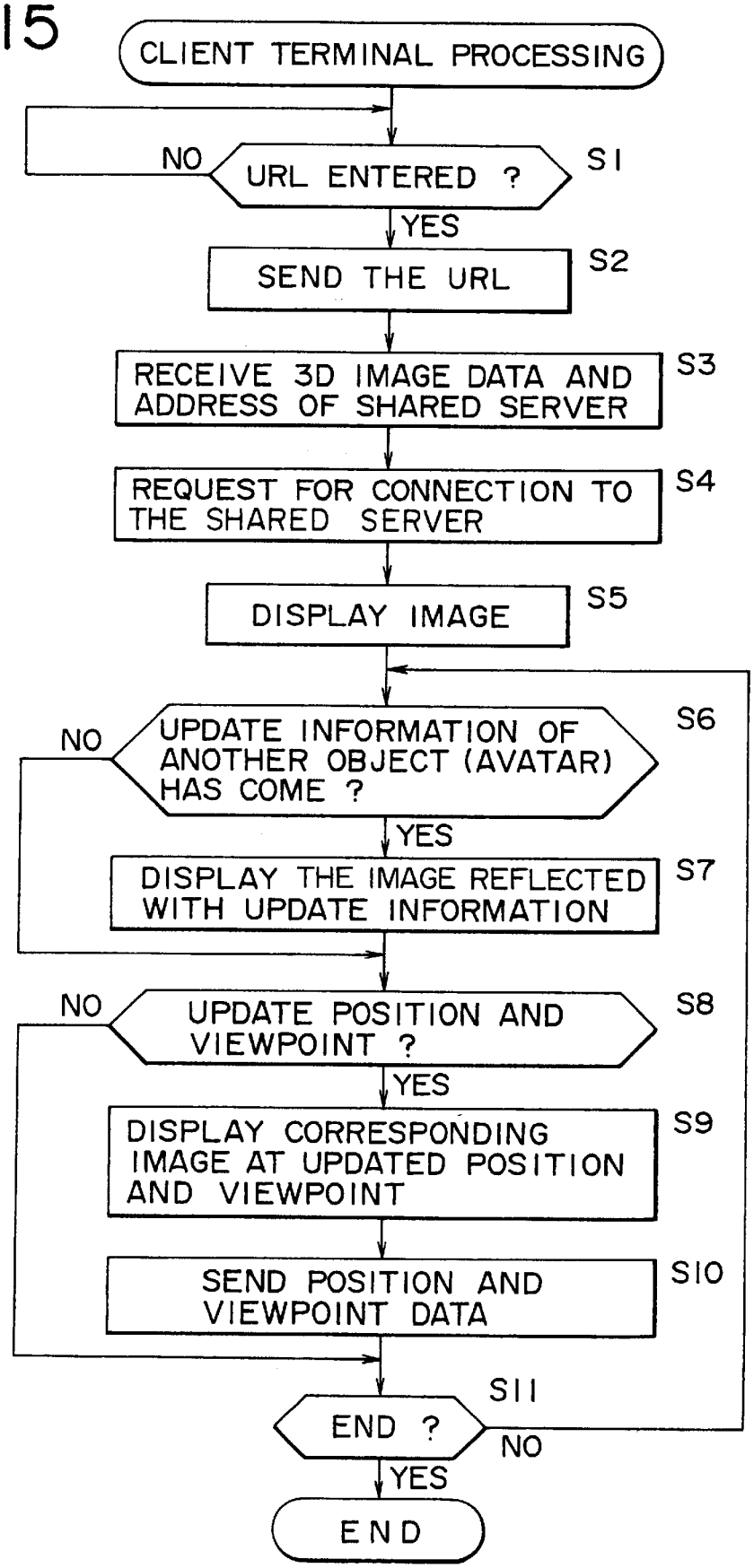
FIG. 15 is a flowchart describing operations of the client terminal 13 (the service provider terminal 14) of FIG. 1.

Now, referring to FIG. 15, there is shown an example of processing by the client terminal 13 (or the service provider terminal 14). In step S1, the CPU 41 checks whether a virtual reality space URL has been entered or not. If no virtual reality space URL has been found, the processing remains in step S1. If a virtual reality space URL has been found in step S1, namely, if a virtual reality space URL corresponding to a desired virtual reality space entered by the user by operating the keyboard 49a has been received by the CPU 41 via interface 48, the process goes to step S2. In step S2, a WWW system is constituted as described with reference to FIG. 2 and the virtual reality space URL is transmitted from the communication device 44 via the network 15 to the information server terminal of a specific host (in this case, the information server terminal 10 of the host A for example) that has the information server terminal, thereby establishing a link.

Further, in step S2, an address acquisition URL related to the virtual reality space URL is read from the storage device 50 to be transmitted from the communication device 44 via the network 15 to the mapping server terminal of a specific host (in this case, mapping server terminal 12 of the host C for example) that constitutes the WWW system, thereby establishing a link.

Then, the process goes to step S3. In step S3, data (three-dimensional image data) of the virtual reality space or the IP address of the shared server terminal 12 corresponding to the virtual reality space URL received in step S2 or the address acquisition URL is received by the communication device 44.

Namely, in step S2, the virtual reality space URL is transmitted to the information server terminal 10. When this virtual reality space URL is received by the information server terminal 10, the data of the corresponding virtual reality space are transmitted to the client terminal 13 via the network 15 in step S22 of FIG. 16 to be described. Thus, in step S3, the data of the virtual reality space transmitted from the information server terminal 10 are received. It should be noted that the received virtual reality space data are transferred to the RAM 43 to be stored there (or first stored in the storage device 50 to be transferred to the RAM 43).

Also, in step S2, the address acquisition URL is transmitted to the mapping server terminal 12. When the address acquisition URL is received by the mapping server terminal 12, the IP address of the shared server terminal corresponding to the URL is transmitted to the client terminal 13 via the network 15 in step S32 of FIG. 17 to be described. Thus, in step S3, the IP address of the shared server terminal 12 transmitted from the mapping server 12 is received.

As described above, the address acquisition URL related to the entered virtual reality space URL corresponds to the IP address of the shared server terminal that controls the update object placed in the virtual reality space corresponding to that virtual reality space URL. Therefore, for example, if the entered virtual reality space URL corresponds to a virtual reality space of Tokyo and the shared server terminal 11 owned by the host B controls the update objects placed in the Tokyo virtual reality space, the IP address of the shared server terminal 11 is received in step S3. Consequently, the user can automatically get the location (the IP address) of the shared server terminal that controls the virtual reality space of a desired area even if the user does not know which shared server terminal controls the update objects in a virtual reality space in which area.

It should be noted that, in steps S2 and S3, the processing of transmitting the virtual reality space URL and the address acquisition URL and receiving the virtual reality space data and the IP address is actually performed by transmitting the virtual reality space URL, receiving the data of the corresponding virtual reality space, transmitting the address acquisition URL, and then receiving the corresponding IP address in this order by way of example.

When the virtual reality space data and the shared server terminal IP address are received in step S3, the process goes to step S4. In step S4, a connection request is transmitted from the communication device 44 via the network 15 to the shared server terminal (in this case, the shared server terminal 11 for example) corresponding to the IP address (the shared server terminal IP address) received in step S3. This establishes a link between the client terminal 13 and the shared server terminal 11. Further, in step S4, after the establishment of the link, the avatar (namely, the update object) representing oneself stored in the storage device 50 is transmitted from the communication device 44 to the shared server terminal 11.

When the shared server terminal 11 receives the user's avatar, the same is then transmitted to the client terminals of other users existing in the same virtual reality space (in this case, that of Tokyo as mentioned above). Then, on the client terminals of other users, the transmitted avatar is placed in the virtual reality space, thus implementing the sharing of the same virtual reality space among a plurality of users.

Figure 36:
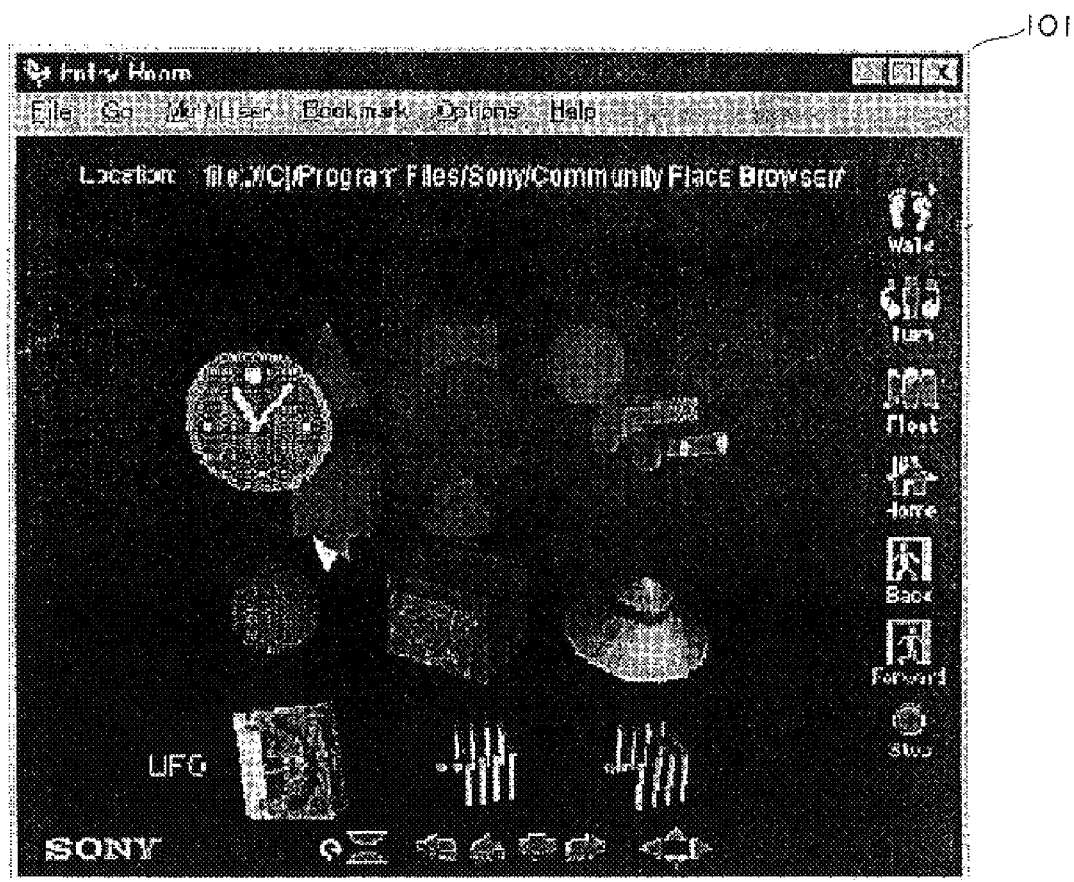
FIG. 36 is a photograph illustrating another display example of the entry room.
Figure 37:
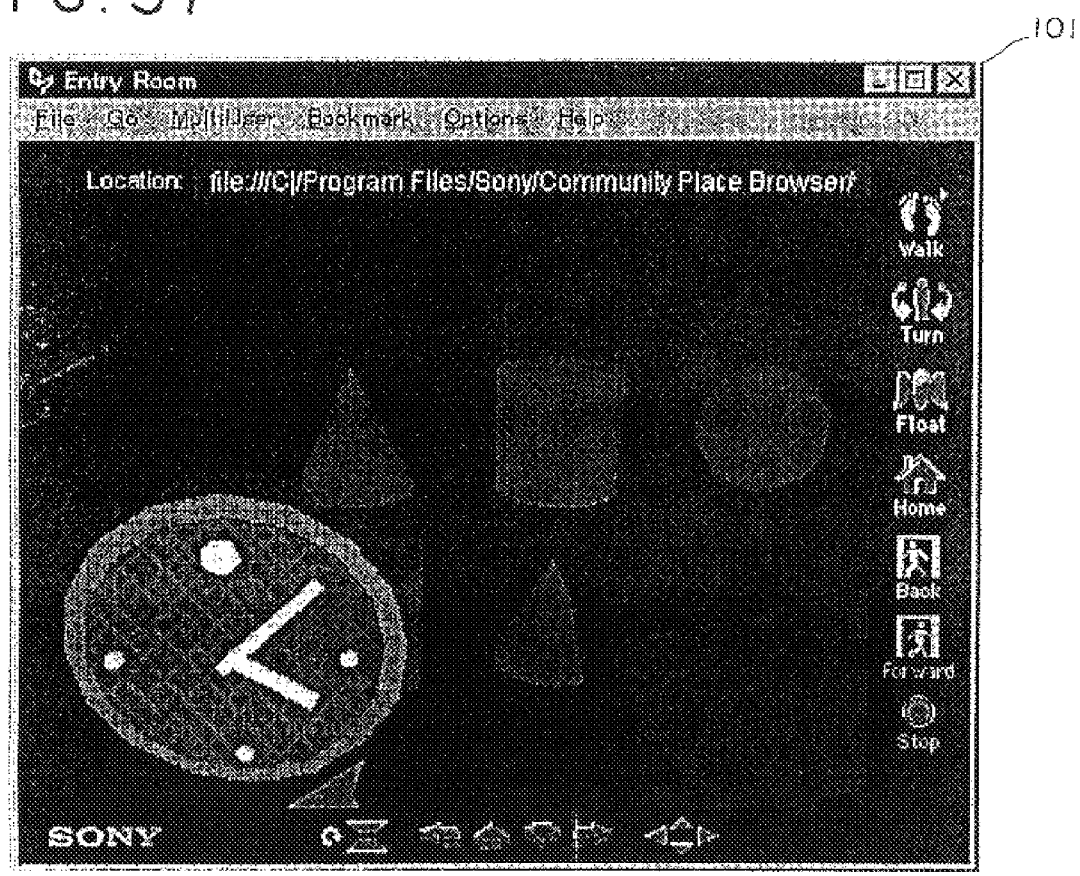
FIG. 37 is a photograph illustrating still another display example of the entry room.
Figure 38:
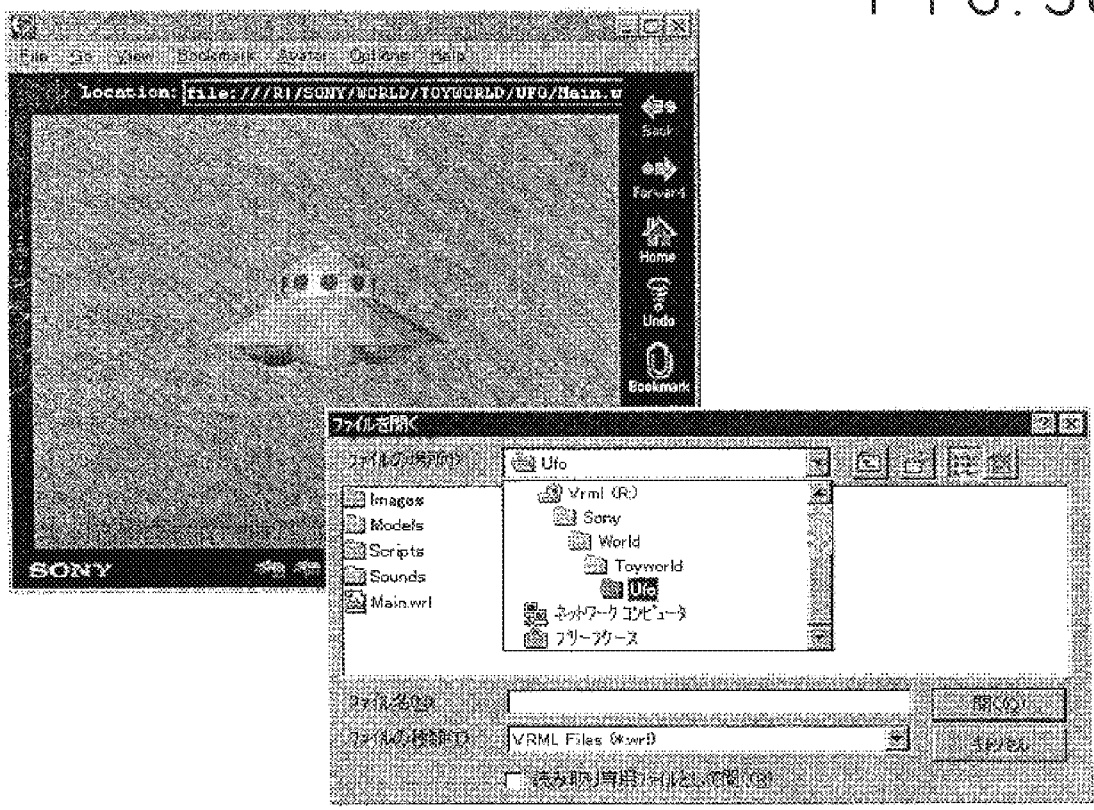
FIG. 38 is a photograph describing "Open File" operation by a conventional VRML browser.

It should be noted that, rather than providing the user's avatar from the client terminal 11 to the shared server terminal 11, a predetermined avatar may also be allocated from the shared server terminal 11 to each user who accessed the same. Also, in the client terminal 13, the avatar of the user himself who uses this terminal can be placed and displayed in the virtual reality space as shown in FIGS. 36 and 37; in the real world, however, the user cannot see himself, so that it is desirable for the user's avatar not be displayed on that user's client terminal in order to make the virtual reality space as real as possible.

When the processing of step S4 has been completed, the process goes to step S5. In step S5, the data of the virtual reality space that can be seen when the same is seen from specific viewpoint and position are read from the RAM 43 by the CPU 41 to be supplied to the display device 45. Thus, the specific virtual reality space is shown on the display device 45.

Then, in step S6, the communication device 44 determines whether update information of another user's avatar has been sent from the shared server terminal 11.

As described above, the user can update the position or viewpoint of his own avatar by operating the viewpoint input device 49c or the movement input device 49d. If the update of the position or viewpoint of the avatar is instructed by using this capability, the CPU 41 receives the instruction via the interface 48. According to the instruction, the CPU 41 performs processing for outputting positional data or viewpoint data corresponding to the updated position or viewpoint as update information to the shared server terminal 11. In other words, the CPU 41 controls the communication device 44 to transmit the update information to the shared server terminal 11.

Figure 18:
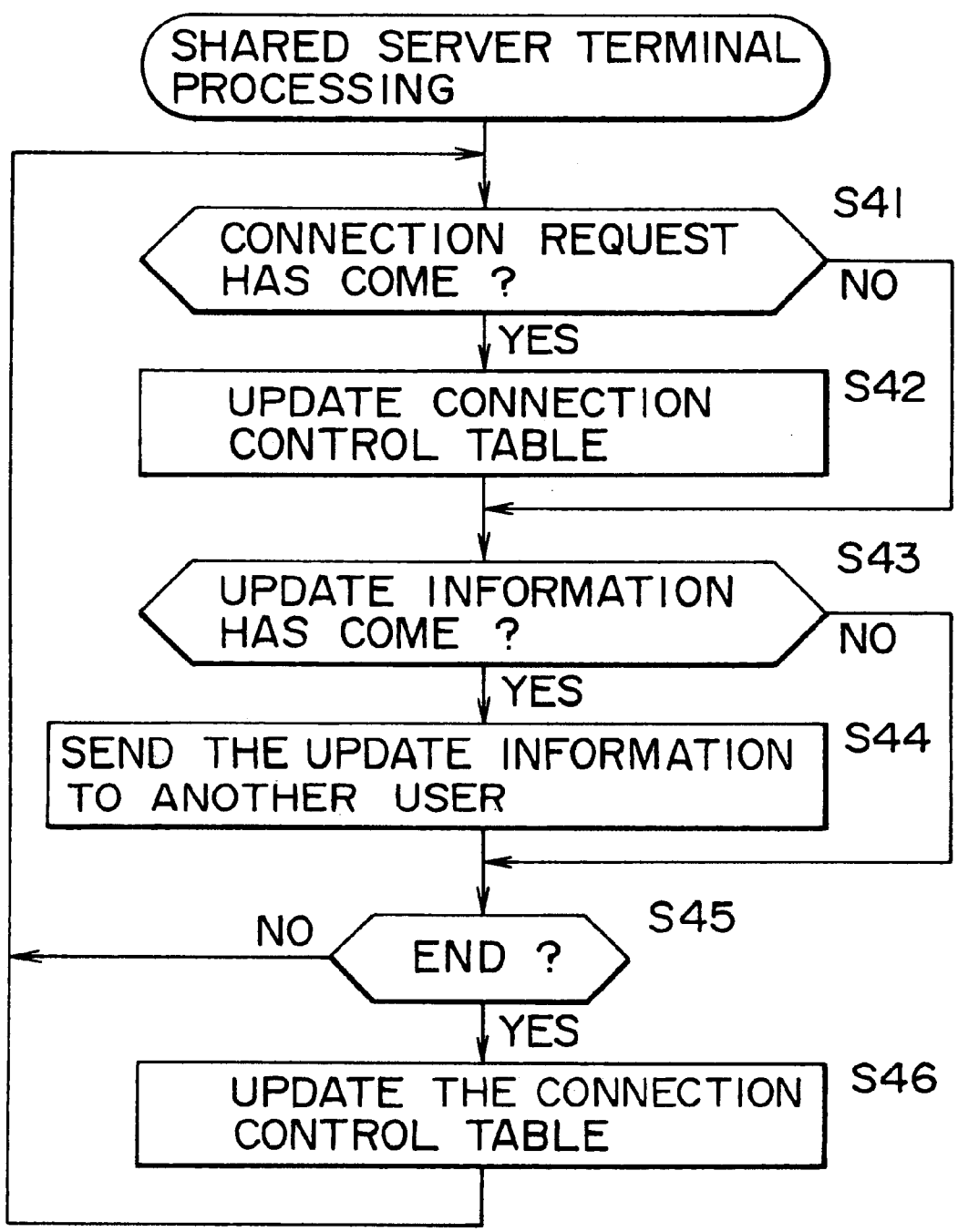
FIG. 18 is a flowchart describing operations of the shared server terminal 11 of FIG. 1.

Receiving the update information from the client terminal, the shared server terminal 11 outputs the update information to other client terminals in step S44 of FIG. 18 to be described. It should be noted the shared server terminal 11 is adapted to transmit the avatar received from the client terminal that requested for access to client terminals of other users, this avatar being transmitted also as update information.

When the update information has come as mentioned above, it is determined in step S6 that update information of the avatar of another user has come from the shared server terminal 11. In this case, this update information is received by the communication device 44 to be outputted to the CPU 41. The CPU 41 updates the display on the display device 45 according to the update information in step S7. That is, if the CPU 41 receives the positional data or viewpoint data from another client terminal as update information, the CPU 41 moves or changes (for example, the orientation of the avatar) the avatar of that user according to the received positional data or viewpoint data. In addition, if the CPU 41 receives the avatar from another client terminal, the CPU 41 places the received avatar in the currently displayed virtual reality space at a specific position. It should be noted that, when the shared server terminal 11 transmits an avatar as update information, the shared server terminal also transmits the positional data and viewpoint data of the avatar along with the update information. The avatar is displayed on the display device 45 according to these positional data and viewpoint data.

When the above-mentioned processing has come to an end, the process goes to step S8.

Meanwhile, if, in step S6, no update information of the avatar of another user has come from the shared server terminal 11, the process goes to step S8, skipping step S7. In step S8, the CPU 41 determines whether the position or viewpoint of the avatar of the user of the client terminal 13 has been updated or not by operating the viewpoint input device 49c or the movement input device 49d.

In step S8, if the CPU 41 determines that the avatar position or viewpoint has been updated, namely, if the viewpoint input device 49c or the movement input device 49d has been operated by the user, the process goes to step S9. In step S9, the CPU 41 reads data of the virtual reality space corresponding to the position and viewpoint of the avatar of the user based on the entered positional data and viewpoint data, makes calculations for correction as required, and generates the image data corresponding to the correct position and viewpoint. Then, the CPU 41 outputs the generated image data to the display device 45. Thus, the image (virtual reality space) corresponding to the viewpoint and position entered from the viewpoint input device 49c and the movement input device 49d is displayed on the display device 45.

Further, in step S10, the CPU 41 controls the communication device 44 to transmit the viewpoint data or the positional data entered from the viewpoint input device 49c or the movement input device 49d to the shared server terminal 11, upon which process goes to step S11.

Here, as described above, the update information coming from the client terminal 13 is received by the shared server terminal 11 to be outputted to other client terminals. Thus, the avatar of the user of the client terminal 13 is displayed on the other client terminals.

On the other hand, in step S8, if CPU 41 determines that the avatar's position or viewpoint has not been updated, the process goes to step S11 by skipping steps S9 and S10. In step S11, the CPU 41 determines whether the end of the update data input operation has been instructed by operating a predetermined key on the keyboard; if the end has not been instructed, the process goes back to step S6 to repeat the processing.

Figure 16:
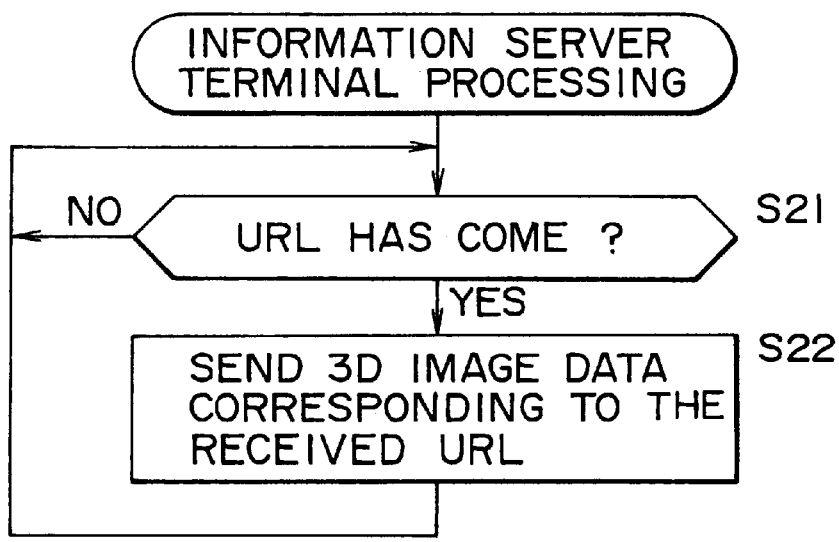
FIG. 16 is a flowchart describing operations of the information server terminal 10 of FIG. 1.

Referring to the flowchart of FIG. 16, there is shown an example of the processing by the information server terminal 10. First, the communication device 84 determines in step S21, whether a virtual reality space URL has come from the client terminal 13 via the network 15. If, in step S21, the communication device 84 determines that no virtual reality space URL has come, the process goes back to step S21. If the virtual reality space URL has come, the same is received by the communication device 84, upon which the process goes to step S22. In step S22, the data of the virtual reality space related to the virtual reality space URL received by the communication device 84 are read by the CPU 81 to be transmitted via the network 15 to the client terminal 13 that transmitted the virtual reality space URL. Then, the process goes back to step S21 to repeat the above-mentioned processing.

Figure 17:
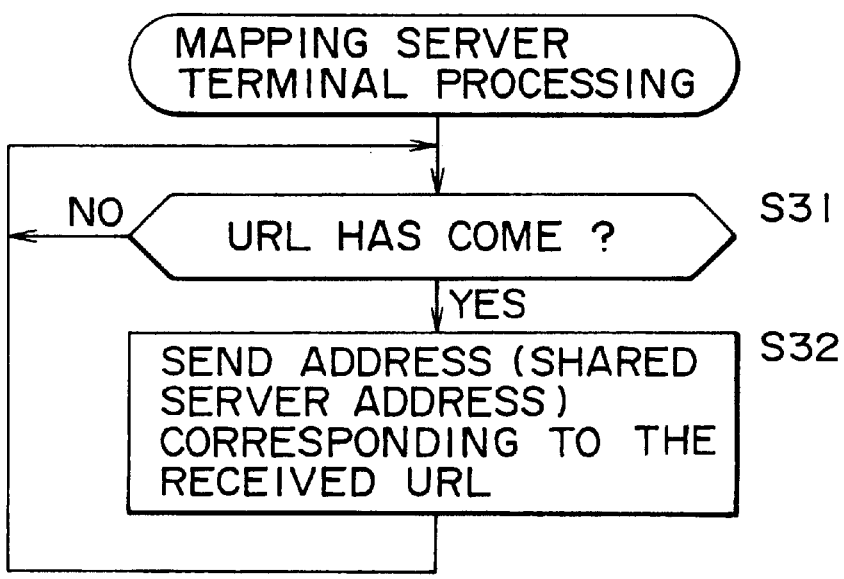
FIG. 17 is a flowchart describing operations of the mapping server terminal 12 of FIG. 1.

FIG. 17 shows an example of the processing by the mapping server terminal 12. In the mapping server terminal 12, the communication device 94 determines in step S31, whether an address acquisition URL has come from the client terminal 13 via the network 15. If no address acquisition URL has come, the process goes back to step S31. If the address acquisition URL has come, the same is received by the communication device 94, upon which the process goes to step 32. In step S32, the IP address (the IP address of the shared server terminal) related to the address acquisition URL received by the communication device 94 is read from the storage device 95 by the CPU 91 to be transmitted via the network 15 to the client terminal 13 that transmitted the address acquisition URL. Then, the process goes back to step S31 to repeat the above-mentioned processing.

FIG. 18 shows an example of the processing by the shared server terminal 11. In the shared server terminal 11, the communication device 24 determines, in step S41, whether a connection request has come from the client terminal 13 via the network 15. If no connection request has come, the process goes to step S43 by skipping step S42. If the connection request has come, that is, if the client terminal 13 has the connection request to the shared server terminal 11 in step S4 of FIG. 15, the communication link with the client terminal 13 is established by the communication device 24, upon which the process goes to step S42.

In step S42, a connection control table stored in the RAM 23 is updated by the CPU 21. Namely, it is necessary for the shared server terminal 11 to recognize the client terminal 13 with which the shared server terminal 11 is linked, in order to transmit update information coming from the client terminal 13 to other client terminals. To do so, when the communication link with client terminals has been established, the shared server terminal 11 registers the information for identifying the linked client terminals in the connection control table. That is, the connection control table provides a list of the client terminals currently linked to the shared server terminal 11. The information for identifying the client terminals include the source IP address transmitted from each client terminal as the header of TCP/IP packet and a nickname of the avatar set by the user of each client terminal.

Then, the process goes to step S43, in which the communication device 24 determines whether the update information has come from the client terminal 13. If, in step S43, no update information has been found, the process goes to step S45 by skipping step S44. If the update information has been found, namely, if the client terminal 13 has transmitted, in step S10 of FIG. 15, positional data and viewpoint data as the update information to the shared server terminal 11 (or, in step S4 of FIG. 15, the client terminal 13 has transmitted the avatar as the update information to the shared server terminal 11 after transmission of the connection request), the update information is received by the communication device 24, upon which the process goes to step S44. In step S44, the CPU 21 references the connection control table stored in the RAM 23 to transmit the update information received by the communication device 24 to other client terminals than the client terminal which transmitted that update information. At this moment, the source IP address of each client terminal controlled by the connection control table is used.

It should be noted that the above-mentioned update information is received by the client terminal 13 in step S6 of FIG. 15 as described above.

Then, the process goes to step S45, in which the CPU 21 determines whether the end of processing has been instructed by the client terminal 13. If the end of processing has not been instructed, the process goes back to S41 by skipping step S46. If the end of processing has been instructed, the process goes to step S46. In step S46, the link with the client terminal 13 from which the instruction has come is disconnected by the communication device 24. Further, from the connection control table, the information associated with the client terminal 13 is deleted by the CPU 21, upon which the process goes back to step S41.

Thus, the control of the update objects is performed by the shared server terminal 11 and the control (or provision) of the basic objects is performed by the information server terminal 10 constituting the WWW of the Internet used world-wide, thereby easily providing virtual reality spaces that can be shared by unspecified users world-wide. It should be noted that the specifications of the existing WWW system need not be modified to achieve the above-mentioned objective.

Provision of the virtual reality space data by use of the WWW system need not create any new web browser because the transfer of these data can be made using related art web browsers such as the Netscape Navigator (trademark) offered by Netscape Communications, Inc. for example.

Moreover, because the IP address of the shared server terminal 11 is provided by the mapping server terminal 12, the user can share a virtual reality space with other users without knowing the address of the shared server terminal.

Figure 19:
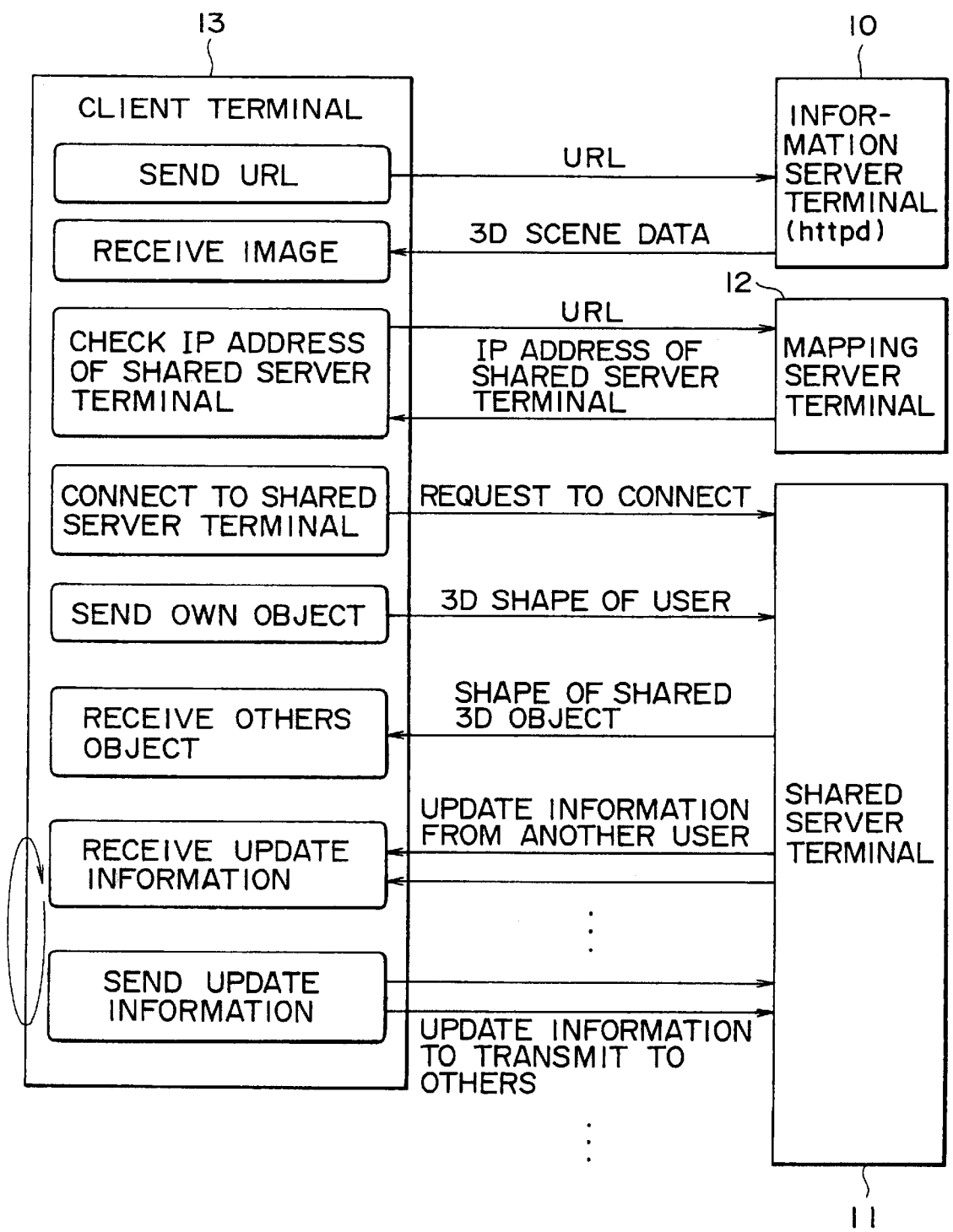
FIG. 19 describes a communication protocol for the communication between the client terminal 13, the information server terminal 10, the shared server terminal 11, and the mapping server terminal 12 of FIG. 1.

In what follows, a procedure of communications between the client terminal 13, the information server terminal 10, the shared server terminal 11, and the mapping server terminal 12 will be described with reference to FIG. 19. When the user desires to get a virtual reality space, the user enters the URL (the virtual reality space URL) corresponding to the virtual reality space of the desired area. Then, the entered URL is transmitted from the client terminal 13 to the information server terminal 10 (httpd). Receiving the URL from the client terminal 13, the information server terminal 10 transmits the data (three-dimensional scene data representing only basic objects) of the virtual reality space associated with the URL to the client terminal 13. The client terminal 13 receives and display these data.

It should be noted that, at this stage of processing, no link is established between the client terminal 13 and the shared server terminal 11, so that the client terminal 13 does not receive update information; therefore, a virtual reality space composed of only basic objects, namely a virtual reality space shown only a still street for example, is shown (that is, no update objects such as avatars of other users are displayed).

Further, the address acquisition URL related to the virtual reality space URL is transmitted from the client terminal 13 to the mapping server terminal 12. The mapping server terminal 12 receives the address acquisition URL to transmit the IP address (the IP address of a shared server terminal controlling update objects located in the virtual reality space of the area related to the virtual reality space URL ,for example, the shared server terminal 11) related to the received address acquisition URL to the client terminal 13.

Here, it is possible that the IP address related to the address acquisition URL transmitted by the client terminal 13 is not registered in the mapping server terminal 12. Namely, a shared server terminal for controlling the update objects located in the virtual reality space of the area related to the virtual reality space URL may not be installed or operating for example. In such a case, the IP address of the shared server terminal cannot be obtained, so that a virtual reality space composed of only basic objects, a virtual reality space showing only a still street for example, is displayed. Therefore, in this case, sharing of a virtual reality space with other users is not established. Such a virtual reality space can be provided only by storing the virtual reality space data (namely, basic objects) in an information server terminal (a WWW server terminal) by the existing WWW system. This denotes that the cyberspace system according to the present invention is upward compatible with the existing WWW system.

Receiving the IP address (the IP address of the shared server terminal 11) from the mapping server terminal 12, the client terminal 13 transmits a connection request to a shared server terminal corresponding to the IP address, namely the shared server terminal 11 in this case. Then, when a communication link is established between the client terminal 13 and the shared server terminal 11, the client terminal 13 transmits the avatar (the three-dimensional representation of the user) representing itself to the shared server terminal 11. Receiving the avatar from the client terminal 13, the shared server terminal 11 transmits the received avatar to the other client terminals linked to the shared server terminal 11. At the same time, the shared server terminal 11 transmits the update objects (shapes of shared three-dimensional objects), the other users' avatars, located in the virtual reality space of the area controlled by the shared server terminal 11, to the client terminal 13.

In the other client terminals, the avatar of the user of the client terminal 13 is placed in the virtual reality space to appear on the monitor screens of the other client terminals. In the client terminal 13, the avatars of the other client terminals are placed in the virtual reality space to appear on its monitor screen. As a result, all the users of the client terminals linked to the shared server terminal 11 share the same virtual reality space.

Then, when the shared server terminal 11 receives the update information from other client terminals, transmits the received update information to the client terminal 13. Receiving the update information, the client terminal 13 changes the display (for example, the position of the avatar of another user is changed). When the state of the avatar of the user of the client terminal 13 is changed by that user, the update information reflecting that change is transmitted from the client terminal 13 to the shared server terminal 11. Receiving this update information, the shared server terminal 11 transmits the same to the client terminals other than the client terminal 13. Thus, on these other client terminals, the state of the avatar of the user of the client terminal 13 is changed accordingly (namely, the state of the avatar is changed as the same has been changed by the user of the client terminal 13 on the same).

Subsequently, the processing in which the client terminal 13 transmits the update information about the avatar of its own and receives the update information from the shared server terminal 11 to change the display based on the received update information continues until the connection with the shared server terminal 11 is disconnected.

Thus, the sharing of the same virtual reality space is established by transferring the update information via the shared server terminal 11 among the users. Therefore, if the shared server terminal 11 and the client terminal 13 are located remotely, there occurs a delay in the communication between these terminals, deteriorating the response in the communication. To be more specific, if the shared server terminal 11 is located in US for example and users in Japan are accessing the same, update information of user A in Japan is transmitted to user B in Japan via US, thereby taking time until a change made by user A is reflected in user B.

To overcome such a problem, rather than installing only one shared server terminal in the world, a plurality of shared server terminals are installed all over the world. And the IP addresses of the plurality of shared server terminals are registered in the mapping server terminal 12 to make the same provide the IP address of the shared server terminal in the geographical proximity to the client terminal 13.

Figure 20:
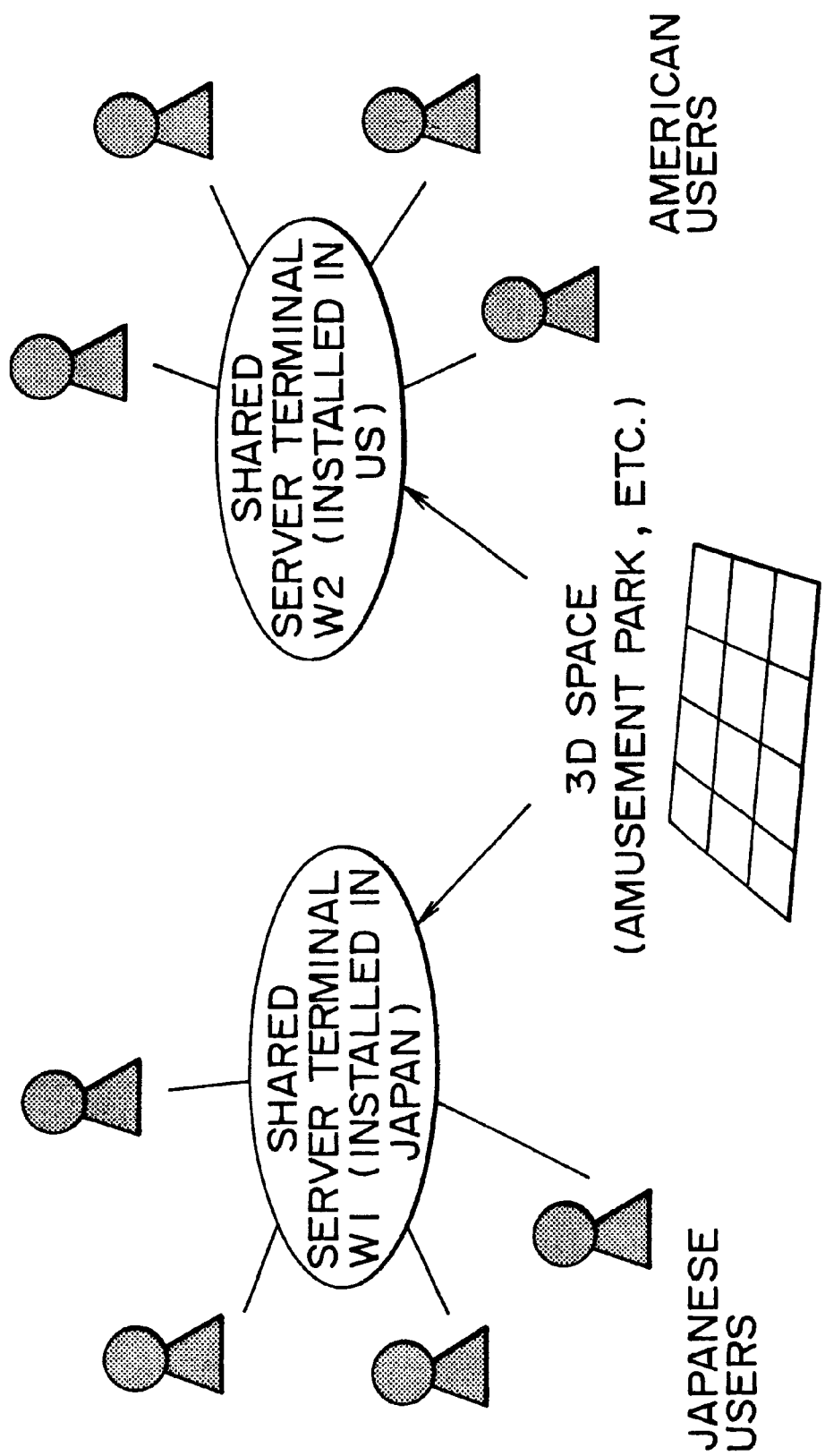
FIG. 20 describes the case in which a plurality of shared server terminals exist for controlling update objects arranged in the same virtual reality space.

To be more specific, as shown in FIG. 20, a shared server terminals W1 and W2 for controlling the update objects placed in a virtual reality space (a three-dimensional space) such as an amusement park are installed in Japan and US respectively by way of example. When the users in Japan and US have received the data of the amusement park's virtual reality space, each user transmits an address acquisition URL related to a virtual reality space URL corresponding to the amusement park's virtual reality space to the mapping server terminal 12 (the same address acquisition URL is transmitted from all users). At this moment, the users in Japan transmit the IP address of the shared server terminal W1 installed in Japan to the mapping server terminal 12, while the users in US transmit the IP address of the shared server terminal W2 installed in US to the mapping server terminal 12.

Here, the mapping server terminal 12 identifies the installation locations of the client terminals that transmitted the address acquisition URLs to the mapping server terminal in the following procedure.

In the communication in TCP/IP protocol, a source IP address and a destination IP address are described in the header of a TCP/IP packet.

Meanwhile, an IP address is made up of 32 bits and normally expressed in a decimal notation delimited by dot in units of eight bits. For example, an IP is expressed in 43.0.35.117. This IP address provides an address which uniquely identifies a source or destination terminal connected to the Internet. Because an IP address expressed in four octets (32 bits) is difficult to remember, a domain name is used. The domain name system (DNS) is provided to control the relationship between the domain names assigned to the terminals all over the world and their IP addresses. The DNS answers a domain name for a corresponding IP address and vice versa. The DNS functions based on the cooperation of the domain name servers installed all over the world. A domain name is expressed in "hanaya@ipd.sony.co.jp" for example, which denotes a user name, @, a host name, an organization name, an organization attribute, and country name (in the case of US, the country name is omitted) in this order. If the country name of the first layer is "jp", that terminal is located in Japan. If there is no country name, that terminal is located in US.

Using a domain name server 130 as shown FIG. 23, the mapping server terminal 12 identifies the installation location of the client terminal that transmitted the address acquisition URL to the mapping server terminal.

To be more specific, the mapping server terminal asks the domain name server 130 controlling the table listing the relationship between the source IP addresses of the requesting client terminal and the domain names assigned with the IP addresses for the corresponding domain name. Then, the mapping server terminal identifies the country in which a specific client terminal is installed based on the first layer of the domain name of the client terminal obtained from the domain name server 130.

In this case, since the client terminal used by each user and its shared server terminal are located in geographical proximity to each other, the above-mentioned problem of a delay, or the deterioration of response time is solved.

In this case, the virtual reality space provided to the users in Japan and US is the same amusement park's virtual reality space as mentioned above. However, since the shared server terminals that control the sharing are located in both countries, the sharing by the users in Japan is made independently of the sharing by the users in US. Namely, the same virtual reality space is shared among the users in Japan and shared among the users in US. Therefore, in this case, the same virtual reality space is provided from the information server terminal 10, but separate shared spaces are constructed among the users in both countries, thereby enabling the users to make a chat in their respective languages.

However, it is possible for the users of both countries to share the same virtual reality space by making connection between the shared server terminals W1 and W2 to transfer update information between them.

The deterioration of response also occurs when the excess number of users access the shared server terminal 11. This problem can be overcome by installing a plurality of shared server terminals for controlling the update objects placed in the virtual reality space in the same area in units of specific areas, for example, countries or prefectures and making the mapping server terminal 12 provide the addresses of those shared server terminals which are accessed less frequently.

To be more specific, a plurality of shared server terminals W3, W4, W5, and so on are installed and the mapping server terminal 12 is made provide the IP address of the specific shared server terminal W3 for example for specific URLs.

Further, in this case, communication is performed between the mapping server terminal 12 and the shared server terminal W3 for example to make the shared server terminal W3 transmit the number of client terminals accessing the shared server terminal W3 to the mapping server terminal 12. Then, when the number of client terminals accessing the shared server terminal W3 has exceeded a predetermined level (100 terminals for example, which do not deteriorate the response of the shared server terminal W3) and if the mapping server terminal 12 has received another URL, the mapping server terminal 12 provides the IP address of another shared server terminal W4 for example (it is desired that the W4 be located in the proximity to the shared server terminal W3).

It should be noted that, in this case, the shared server terminal W4 may be put in the active state in advance; however, it is also possible to start the shared server W4 when the number of client terminals accessing the shared server W3 has exceeded a predetermined value.

Then, communication is performed between the mapping server terminal 12 and the shared server terminal W4. When the number of client terminals accessing the shared server terminal W4 has exceeded a predetermined value, and the mapping server terminal 12 has received another URL, the mapping server terminal 12 provides the IP address of the shared server terminal W5 (however, if the number of client terminals accessing the shared server terminal W3 has dropped below the predetermined level, the mapping server terminal 12 provides the IP address of the W3).

This setup protects each of the shared server terminals W3, W4, W5 and so on from application of excess load, thereby preventing the deterioration of response.

It should be noted that the above-mentioned capability can be implemented by controlling by the mapping server terminal 12 the IP addresses of shared server terminals to be outputted for specific URLs, so that the client terminal 13 and the software operating on the same need not be modified.

The present embodiment has been described by taking the user's avatar for example as the update object to be controlled by the shared server terminal 11; it is also possible to make the shared server terminal control any other update objects than avatars. It should be noted, however, that the client terminal 13 can also control update objects in some cases. For example, an update object such as a clock may be controlled by the client terminal 13 based on the built-in clock of the same, updating the clock.

Further, in the present embodiment, the hosts A through C, the client terminals 13-1 through 13-3, and the service provider terminal 14 are interconnected via the network 15, which is the Internet; however, in terms of using the existing WWW system, the host A having the information server terminal 10 or the host C having the mapping server terminal 12 may only be connected with the client terminal 13 via the Internet. Further, if the user recognizes the address of the shared server terminal 11 for example, the host A having the information server terminal 10 and the client terminal 13 may only be interconnected via the Internet.

In addition, in the present embodiment, the information server terminal 10 and the mapping server terminal 12 operate on different hosts; however, if the WWW system is used, these server terminals may be installed on the same host. It should be noted that, if the WWW system is not used, the information server terminal 10, the shared server terminal 11, and the mapping server terminal 12 may all be installed on the same host.

Still further, in the present embodiment, the data of the virtual reality spaces for each specific area are stored in the host A (namely, the information server terminal 10); however, these data may also be handled in units of a department store or an amusement park for example.

Figure 21:
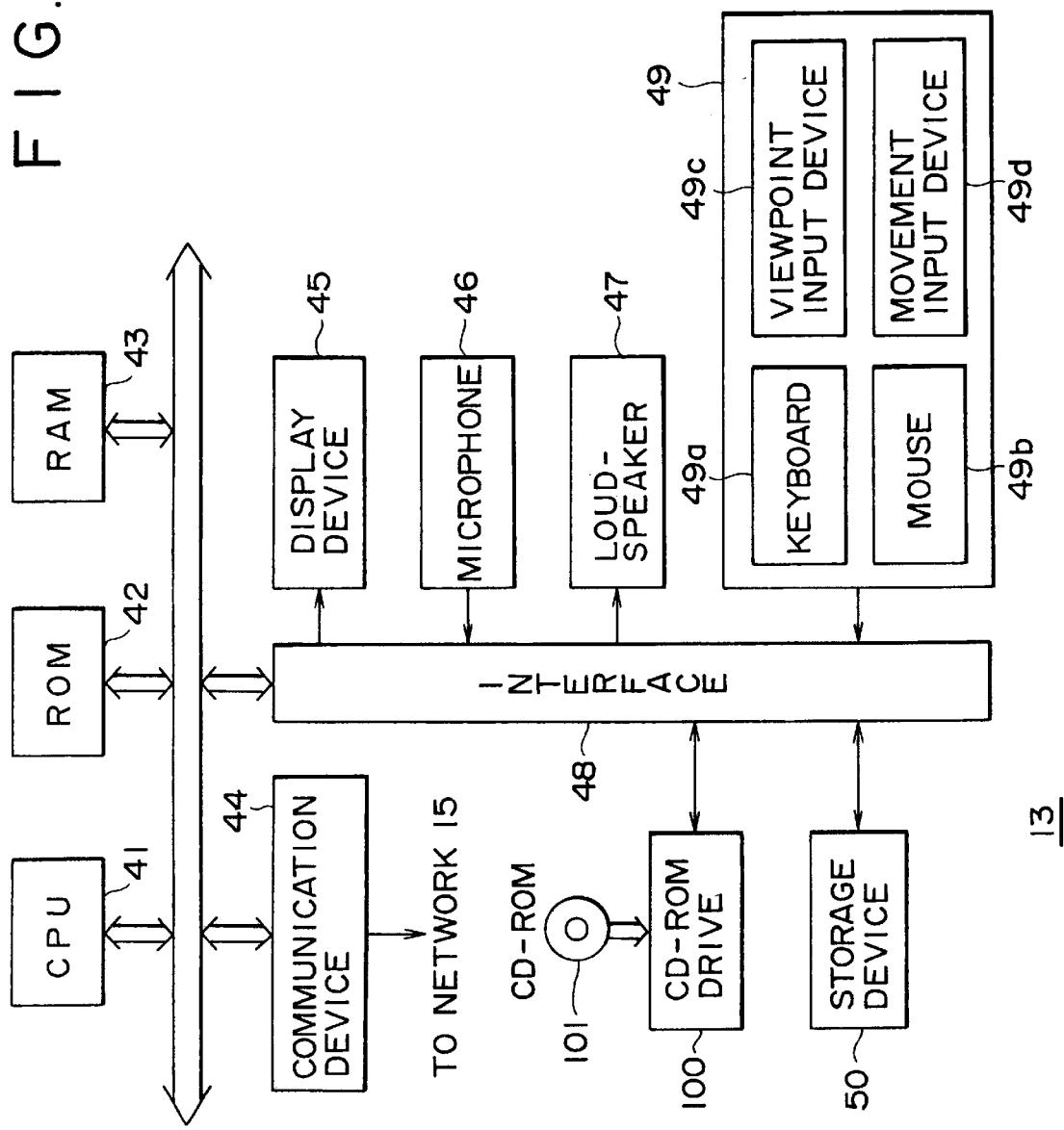
FIG. 21 is a block diagram illustrating another example of the constitution of the client terminal 13 of FIG. 1.

In the above-mentioned preferred embodiments of the invention, the basic objects are supplied to each client terminal 13 via the network 15; however, it is also possible to store the basic objects in an information recording medium such as a CD-ROM and distribute the same to each user in advance. In this case, each client terminal 13 is constituted as shown in FIG. 21. To be more specific, in the embodiment of FIG. 21, a CD-ROM drive 100 is connected to the interface 48 to drive a CD-ROM 101 in which a virtual reality composed of basic objects is stored. The other part of the constitution is the same as that of FIG. 7.

Thus, provision of the data of basic objects from the CD-ROM 101 eliminates the time for transferring the data via the network 15, increasing processing speed.

Alternatively, the data of basic objects supplied from the information server terminal 10 may be stored in the storage device 50 only for the first time to be subsequently read for use.

Namely, the basic object data can be stored in the storage device 85 of the information server terminal 10 (for the cases 1 through 3), the storage device 50 of the client terminal 13 (for the cases 4 through 6) or the CD-ROM 101 of the client terminal 13 (for the cases 7 through 9).

On the other hand, the update object data can be stored in the storage device 85 of the information server terminal 10 (for the case 1) or the storage device 30 of the shared server terminal 11 (for the cases 2 through 9). In the case in which the update object data are stored in the shared server terminal 11, that shared server terminal may be the shared server terminal 11-1 in Japan (for the case 2, 5 or 8) or the shared server terminal 11-2 in US (for the case 3, 6 or 9) as shown in FIG. 23 for example. In this instance, the URL of the update object data is stored on the mapping server terminal 12.

If the update object data are stored on the information server terminal 10, the URL of the update object data is the default URL controlled by the information server terminal 10 (in the case of 1). Or if the shared server terminal 11 is specified by the user manually, the URL of update object data is the specified URL (in the case of 4 or 7).

Referring to FIG. 23, the data in each of the above-mentioned cases in FIG. 22 flows as follows. In the case 1, the basic object data are read from a VRML file (to be described later in detail) stored in an HDD (Hard Disk Drive), storage device of a WWW server terminal 121 operating as the information server terminal 10 to be supplied to the client terminal 13-1 for example via the Internet 15A operating as the network 15. The storage device of the WWW server terminal 121 also stores update object data. To be more specific, when the basic object data are read in the WWW server terminal 121, the URL of the corresponding update object data is stored as the default URL in the storage device of the WWW server terminal 121 in advance. From this default URL, the update object data are read to be supplied to the client terminal 13-1.

In the case 2, the basic object data are supplied from the WWW server terminal 121 to the client terminal 13-1 in Japan via the Internet 15A. On the other hand, the update object data are supplied from the shared server terminal 11-1 in Japan specified by the mapping server terminal 12 to the client terminal 13-1 via the Internet 15A.

In the case 3, the basic object data are supplied from the WWW server terminal 121 to the client terminal 13-2 in US via the Internet 15A. The update object data are supplied from the shared server terminal 11-2 in US specified by the mapping server terminal 12 via the Internet 15A.

In the case 4, the basic object data are stored in advance in the storage device 50 of the client terminal 13-1 in Japan for example. The update object data are supplied from the shared server terminal 11-2 in US for example specified by the client terminal 13-1.

In the case 5, the basic object data are stored in advance in the storage device 50 of the client terminal 13-1. The update object data are supplied from the shared server terminal 11-1 in Japan specified by the mapping server terminal 12 via the Internet 15A.

In the case 6, the basic object data are stored in advance in the storage device 50 of the client terminal 13-2 in US. The update object data are supplied from the shared server terminal 11-2 in US specified by the mapping server terminal 12 to the client terminal 13-2 via the Internet 15A.

In the case 7, the basic object data stored in the CD-ROM 101 are supplied to the client terminal 13-1 in Japan for example via the CD-ROM drive 100. The update object data are supplied from the shared server terminal (for example, the shared server terminal 11-1 or 11-2) specified by the client terminal 13-1.

In the case 8, the basic object data are supplied from the CD-ROM 101 to the client terminal 13-1. The update object data are supplied from the shared server terminal 11-1 in Japan specified by the mapping server terminal 12 in Japan.

In the case 9, the basic object data are supplied from the CD-ROM 101 to the client terminal 13-2 in US. The update object data are supplied from the shared server terminal 11-2 in US specified by the mapping server terminal 12 via the Internet 15A.

In what follows, the software for transferring the above-mentioned virtual reality space data to display the same on the display device. In the WWW system, document data are transferred in a file described in HTML (Hyper Text Markup Language). Therefore, text data are registered as an HTML file.

Figure 24:
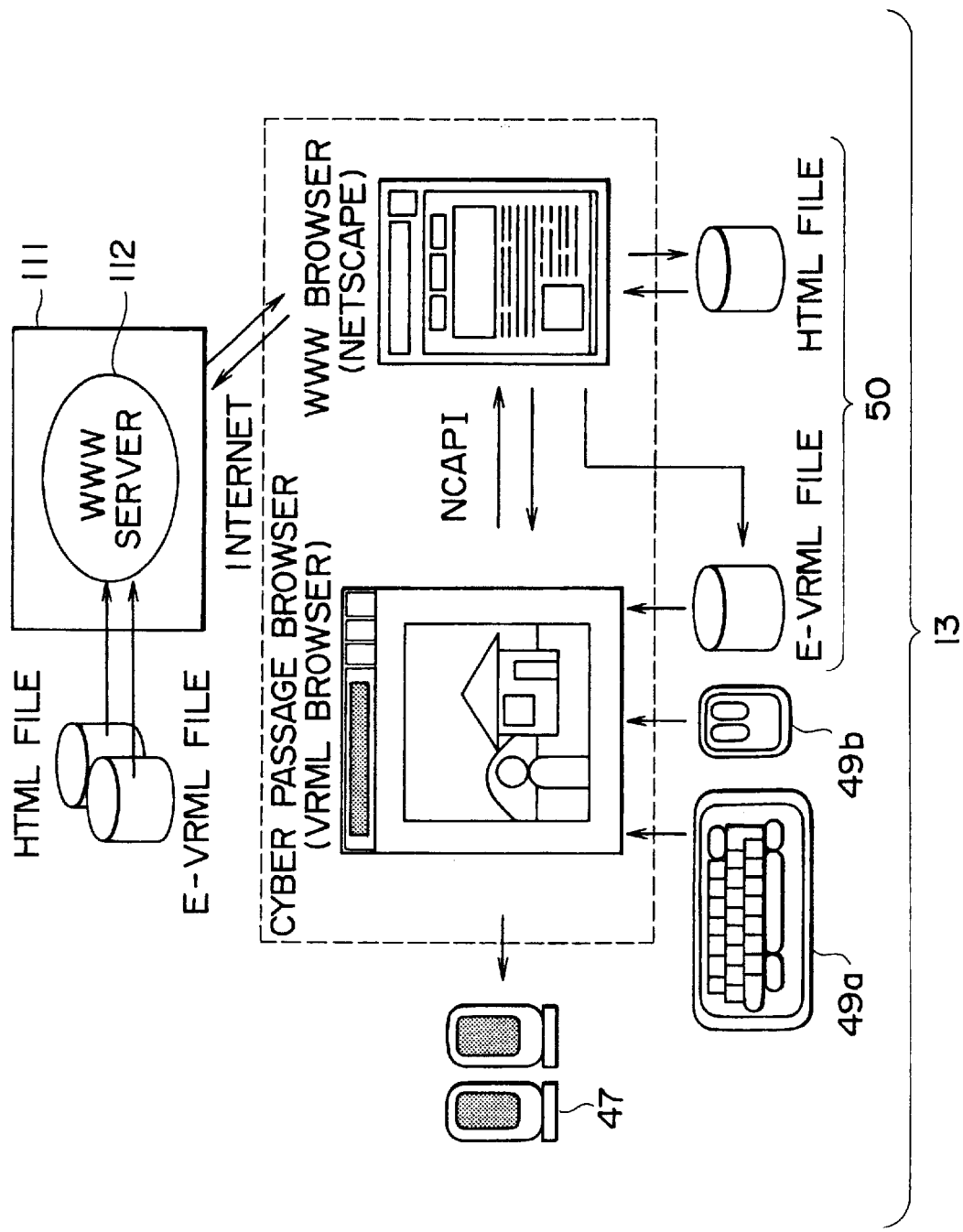
FIG. 24 describes software for implementing the cyberspace system of FIG. 1.

On the other hand, in the WWW system, three-dimensional graphics data are transferred for use by describing the same in VRML (Virtual Reality Modeling Language) or E-VRML (Enhanced Virtual Reality Modeling Language). Therefore, as shown in FIG. 24 for example, a WWW server terminal 112 of remote host 111 constituting the above-mentioned information server terminal 10, the shared server terminal 11 or the mapping server terminal 12 stores in its storage device both HTML and E-VRML files.

In an HTML file, linking between different files is performed by URL. In a VRML or E-VRML file, such attributes as WWW Anchor and WWW Inline can be specified for objects. WWW Anchor is an attribute for linking a hyper text to an object, a file of link destination being specified by URL. WWW Inline is an attribute for describing an external view of a building for example in parts of external wall, roof, window, and door for example. An URL can be related to each of the parts. Thus, also in VRML or E-VRML files, link can be established with other files by means of WWW Anchor or WWW Inline.

For application software (a WWW browser) for notifying a WWW server terminal of a URL entered in a client terminal in the WWW system to interpret and display an HTML file coming from the WWW server terminal, Netscape Navigator (register trade name) (hereafter referred to simply as Netscape) of Netscape Communications, Inc. is known. For example, the client terminal 13 also uses Netscape to user the capability for transferring data with the WWW server terminal.

It should be noted, however, that this WWW browser can interpret an HTML file and display the same; but this WWW browser cannot interpret and display a VRML or E-VRML file although it can receive these files. Therefore, a VRML browser is required which can interpret a VRML file and an E-VRML file and draw and display them as a three-dimensional space.

Details of VRML are disclosed in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0.

The applicant hereof developed Community Place (trademark) as application software that includes this VRML browser.

Community Place is composed of the following three software programs:

(1) Community Place Browser

This is a VRML browser which is based on VRML 1.0 and prefetches the capabilities (motion and sound) of VRML 2.0 to support E-VRML that provides moving picture capability. In addition, this provides the multi-user capability which can be connected to Community Place Bureau. For the script language, TCL/TK is used.

(2) Community Place Conductor

This is a VRML authoring system which is based on E-VRML based on VRML 1.0. This tool can not only simply construct a three-dimensional world but also give a behavior, a sound, and an image to the three-dimensional world with ease.

(3) Community Place Bureau

This is used for a server terminal system for enabling people to meet each other in a virtual reality space constructed on a network, connected from the Community Place Browser.

Figure 25:
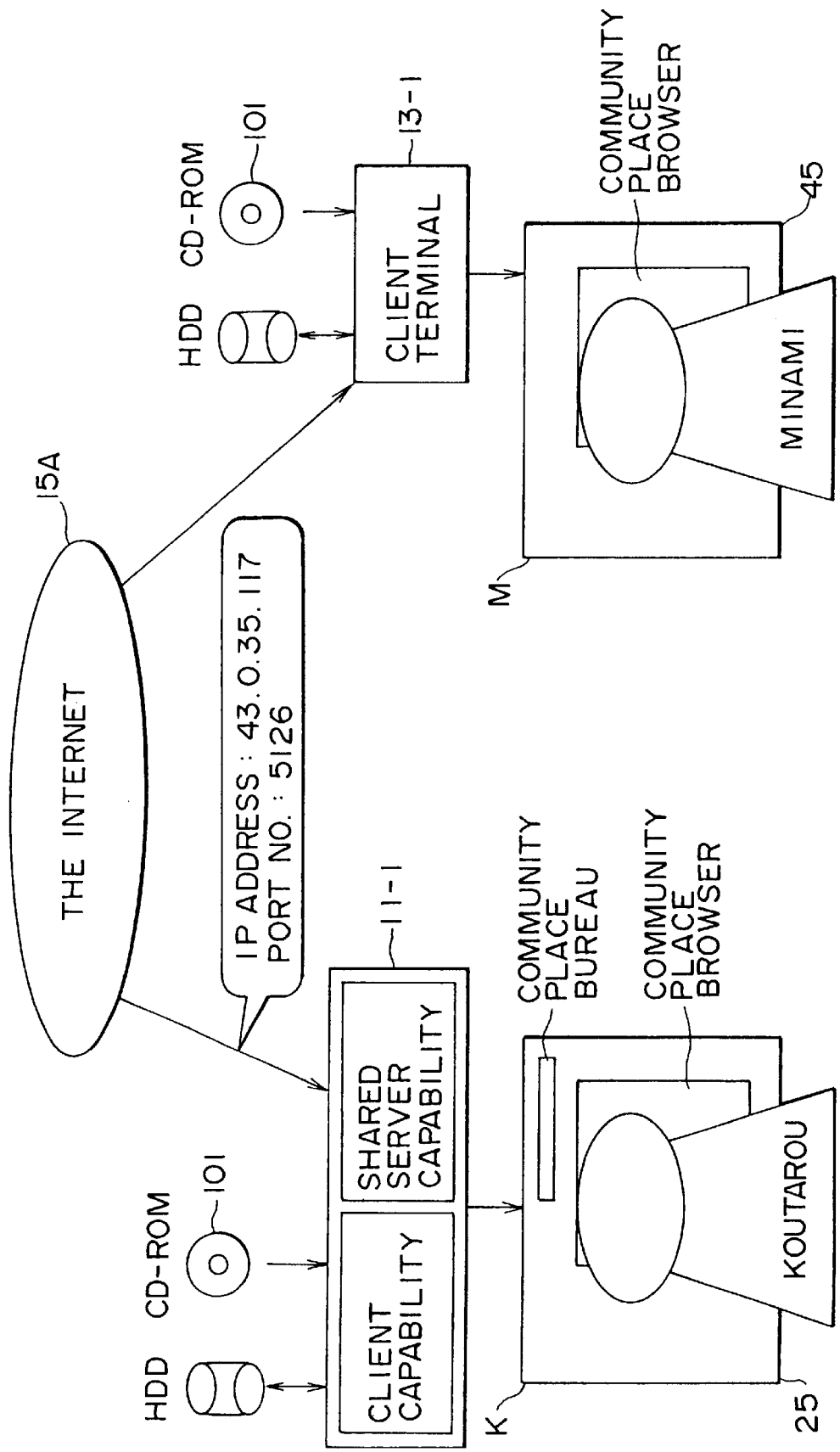
FIG. 25 describes software operating on the client terminal 13–1 of FIG. 1 and the shared server terminal 11-1 of FIG. 1.

In the client terminals 13-1 and 13-2 shown in FIG. 23, Community Place Bureau Browser is installed in advance and executed. In the shared server terminals 11-1 and 11-2, Community Place Bureau is installed in advance and executed. FIG. 25 shows an example in which Community Place Bureau Browser is installed from the CD-ROM 101 and executed on the client terminal 13-1 and, in order to implement the shared server terminal capability and the client terminal capability on a single terminal, Community Place Bureau and Community Place Bureau Browser are installed from the CD-ROM 101 in advance and executed.

As shown in FIG. 24, Community Place Bureau Browser transfers a variety of data with Netscape as a WWW browser based on NCAPI (Netscape Client Application Programming Interface) (trademark).

Receiving an HTML file and a VRML file or E-VRML file from the WWW server terminal 112 via the Internet, Netscape stores the received files in the storage device 50. Netscape processes only the HTML file. The VRML or E-VRML file is processed by Community Place Bureau Browser.

E-VRML is an enhancement of VRML 1.0 by providing behavior and multimedia (sound and moving picture) and was proposed to the VRML Community, September 1995, as the first achievement of the applicant hereof. Then, the basic model (event model) for describing motions as used in E-VRML was inherited to the Moving Worlds proposal, one the VRML 2.0 proposals.

In what follows, Community Place Bureau Browser will be outlined. After installing this browser, selecting "Manual" from "Community Place Folder" of "Program" of the start menu of Windows 95 (trademark) (or in Windows NT (trademark), the Program Manager) displays the instruction manual of the browser.

It should be noted that Community Place Browser, Community Place Conductor, Community Place Bureau, and the files necessary for operating these software programs are recorded in a recording medium such as the CD-ROM 101 to be distributed as a sample.

Operating Environment of the Browser

The operating environment of the browser is as shown in FIG. 26. The minimum operating environment must be at least satisfied. However, Netscape Navigator need not be used if the browser is used as a standalone VRML browser. In particular, on using in the multi-user, the recommended operating environment is desirable.

Installing the Browser

The browser can be usually installed in the same way as Netscape is installed. To be more specific, vscplb3a.exe placed in the \Sony (trademark) directory of the above-mentioned CD-ROM 101 is used as follows for installation.

(1) Double-click vscplb3a.exe. The installation package is decompressed into the directory indicated by "Unzip To Directory" column. The destination directory may be changed as required.

(2) Click "Unzip" button. And the installation package is decompressed.

(3) "12 files unzipped successfully" appears. Click "OK" button.

(4) When "Welcome" windows appeared, click "NEXT" button.

(5) Carefully read "Software License Agreement." If agreed, press "Yes" button; if not, press "No" button.

(6) Check the directory of installation. Default is "Program Files Sony\Community Place."

(7) If use of the above-mentioned directory is not wanted, press "Browse" button and select another directory. Then, press "Next" button.

(8) To read "readme" file here, click "Yes" button.

(9) When the installation has been completed, click "OK" button.

Starting the Browser

Before starting the browser, setting of Netscape Navigator must be performed. If the browser is used standalone, this setting need not be performed; just select "Community Place Folder . . . Community Place" of "Program" of the start menu and start. The following setting may be automatically performed at installation.

(1) From "Options" menu of Netscape Navigator, execute "General Preference" and open "Preference" window. From the upper tab, select "Helper Applications."

(2) Check "File type" column for "x-world/x-vrml". If it is found, go to (4) below.

(3) Click "Create New Type" button. Enter "x-world" in "Mime Type" column and "x-vrml" in "Mime SubType" column. Click "OK" button. Enter "wrl" in "Extensions" column.

(4) Click "Launch the Application:" button. Enter the path name of Community Place Browser in the text column below this button. Default is "\Program Files\Sony\Community Place\bin\vscp.exe".

(5) Click "OK" button.

Thus, the setting of Netscape Navigator has been completed. Start the browser as follows:

(1) In "File..Open File" menu of Netscape, read "readme.htm" of the sample CD-ROM 101.

(2) Clicking the link to the sample world, and Community Place is automatically started, loading the sample world from the CD-ROM 101.

Uninstalling the Browser

Execute "Uninstall" from "Community Place Folder" of "Program" of the start menu (or in Windows NT, the Program Manager), the browser will be uninstalled automatically.

Operating the Browser

The browser may be operated intuitively with the mouse 49b, the keyboard 49a, and the buttons on screen.

Moving around in the three-dimensional space:

In the three-dimensional space provided by VRML, such movements done in real world as forward, backward, rotate right and rotate left for example can be done. The browser implements such movements through the following interface:

By Keyboard

Each of the arrow keys, not shown, on the keyboard 49a generates the following corresponding movement:

→ rotate right;
← rotate left;
↑ move forward; and
↓ move backward.

By Mouse operate the mouse all with its left button.

(1) Keep the left button of the mouse 49b pressed in the window of Community Place and move the mouse to the right for rotate right;to the left for rotate left;up for forward; and down for backward. The velocity of movement depends on the displacement of the mouse.

(2) With the Ctrl (Control) key, not shown, on the keyboard 49a kept pressed, click an object on screen to get to the front of the clicked object.

The following precautions are needed:

If a collision with an object occurs, a collision sound is generated and the frame of screen blinks in red. If this happens, any forward movement is blocked. Moving directions must be changed.

If the user is lost or cannot see anything in the space, click "Home" button on the right of screen, and the user can return to the home position.

Jumping Eye

While navigating through a three-dimensional space, the user may be lost at occasions. If this happens, the user can jump up to have an overhead view around.

(1) Click "Jump" button on the right of screen, and the user enters the jumping eye mode and jump to a position from which the user look down the world.

(2) Click "Jump" button again, and the user goes down to the original position.

(3) Alternatively, click any place in the world, and the user gets down to the clicked position.

Selecting an Object

When the mouse cursor is moved around on the screen, the shape of the cursor is transformed into a grabber (hand) on an object. In this state, click the left button of the mouse, and the action of the grabbed object can be called.

Loading a VRML File

A VRML file can be loaded as follows:

In Netscape, click the link to the VRML file;

From "File . . Open File" menu of Community Place Bureau, select the file having extension "wrl" on disc.

In "File . . Open URL" menu of Community Place Bureau, enter the URL.

Click the object in the virtual space for which "URL" is displayed on the mouse cursor.

Operating Toolbar Buttons

Figure 30:
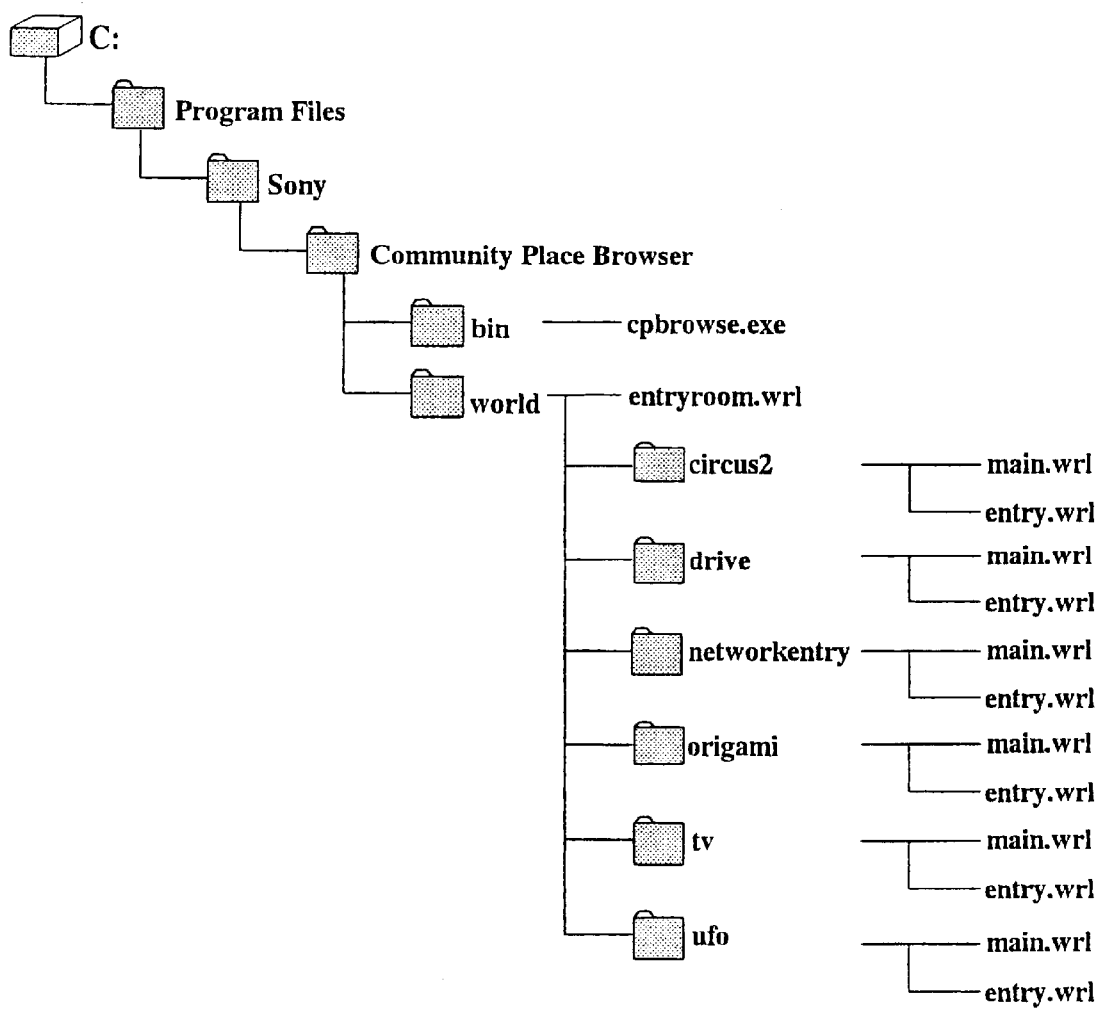
FIG. 30 is a diagram illustrating an example of a constitution of a directory.

Buttons in the toolbar shown in FIG. 30 for example may be used to execute frequently used functions.

"Back" Go back to the world read last.

"Forward" Go to the world after going back to the previous world.

"Home" Move to the home position.

"Undo" Return a moved object to the original position (to be described later).

"Bookmark" Attach a book to the current world or position.

"Scouter" Enter in the scouter mode (to be described later).

"Jump" Enter in the jump eye mode.

Scouter Mode

Each object placed in a virtual world may have a character string as information by using the E-VRML capability.

(1) Click "Scouter" button on the right of screen, and the user enters the scouter mode.

(2) When the mouse cursor moves onto an object having an information label, the information label is displayed.

(3) Click "Scouter" button again, and the user exits the scouter mode.

Moving an Object Around

With "Alt" (Alternate) key, not shown, on the keyboard 49a pressed, press the left button of the mouse 49b on a desired object, and the user can move that object to a desired position with the mouse. This is like moving a coffee cup for example on s desk with the hand in the real world. In the virtual reality, however, objects that can be moved are those having movable attributes. It should be noted that a moved object may be restored to the position before movement only once by using "Undo" button.

Connecting to a multi-user server terminal:

This browser provides a multi-user capability. The multi-user capability allows the sharing of a same VRML virtual space among a plurality of users. Currently, the applicant hereof is operating Community Place Bureau in the Internet on an experimental basis. By loading a world called chatroom the server terminal can be connected to share a same VRML virtual space with other users, walking together, turning off a room light, having a chat, and doing other activities.

This capability is started as follows:

(1) Make sure that the user's personal computer is linked to the Internet.

(2) Load the Chatroom of the sample world into Cyber-Passage Browser. This is done by loading "\Sony\readme.htm" from the sample CD-ROM 101 clicking "Chat Room".

(3) Appearance of "Connected to VS Server" in the message window indicates successful connection.

Thus, the connection to the server has been completed. Interaction with other users is of the following two types:

Telling Others of an Action

This is implemented by clicking any of "Hello", "Smile", "Wao!", "Wooo!!", "Umm . . . ", "Sad", "Bye" and so on in the "Action" window. The actions include rotating the user himself (avatar) right or left 36 degrees, 180 degrees or 360 degrees.

Talking With Others

This capability is implemented by opening the "Chat" window in "View . . Chat" menu and entering a message from the keyboard 49a into the bottom input column.

Multi-user Worlds

The following three multi-user worlds are provided by the sample CD-ROM 101. It should be noted that chat can be made throughout these three worlds commonly.

(1) Chat Room

This is a room in which chat is made mainly. Some objects in this room are shared among multiple users. There are objects which are made gradually transparent every time the left button of the mouse is pressed, used to turn off room lights, and hop when clicked, by way of example. Also, there are hidden holes and the like.

(2) Play With a Ball!!

When a ball in the air is clicked, the ball flies toward the user who clicked the ball. This ball is shared by all users sharing that space to play catch.

(3) Share your Drawing

A whiteboard is placed in the virtual space. When it is clicked by the left button, the shared whiteboard is displayed. Dragging with the left button draws a shape on the whiteboard, the result being shared by the users sharing the space.

Use of Community Place Bureau allows the users using Community Place Browser to enter together a world described in VRML 1.0. To provide a three-dimensional virtual reality space for enabling this capability, a file described in VRML 1.0 must be prepared. Then, the Bureau (Community Place Bureau being hereinafter appropriately referred to simply as the Bureau) is operated on an appropriate personal computer. Further, a line telling the personal computer on which Bureau is operating is added to the VRML 1.0 file. The resultant VRML file is read into Community Place Browser (hereinafter appropriately referred to simply as the Browser), the Browser is connected to the Bureau.

If this connection is successful, the users in the virtual world can see each other and talk each other. Further, writing an appropriate script into the file allows each user to express emotions through a use of action panel ("Action" part in a multi-user window 202 of FIG. 29 to be described).

Community Place Browser provides interface for action description through use of TCL. This interface allows each user to provide behaviors to objects in the virtual world and, if desired, make the resultant objects synchronize between the Browsers. This allows a plurality of users to play a three-dimensional game if means for it are prepared.

To enjoy a multi-user virtual world, three steps are required, preparation of a VRML file, start of the Bureau, and connection of the Browser.

Preparing a VRML File

First, a desired VRML. 1.0 file must be prepared. This file is created by oneself or a so-called freeware is used for this file. This file presents a multi-user virtual world.

Starting the Bureau

The operating environment of Community Place Bureau is as follows:

CPU . . . 486SX or higher

OS . . . Window 95

Memory . . . 12 MB or higher

Figure 27:
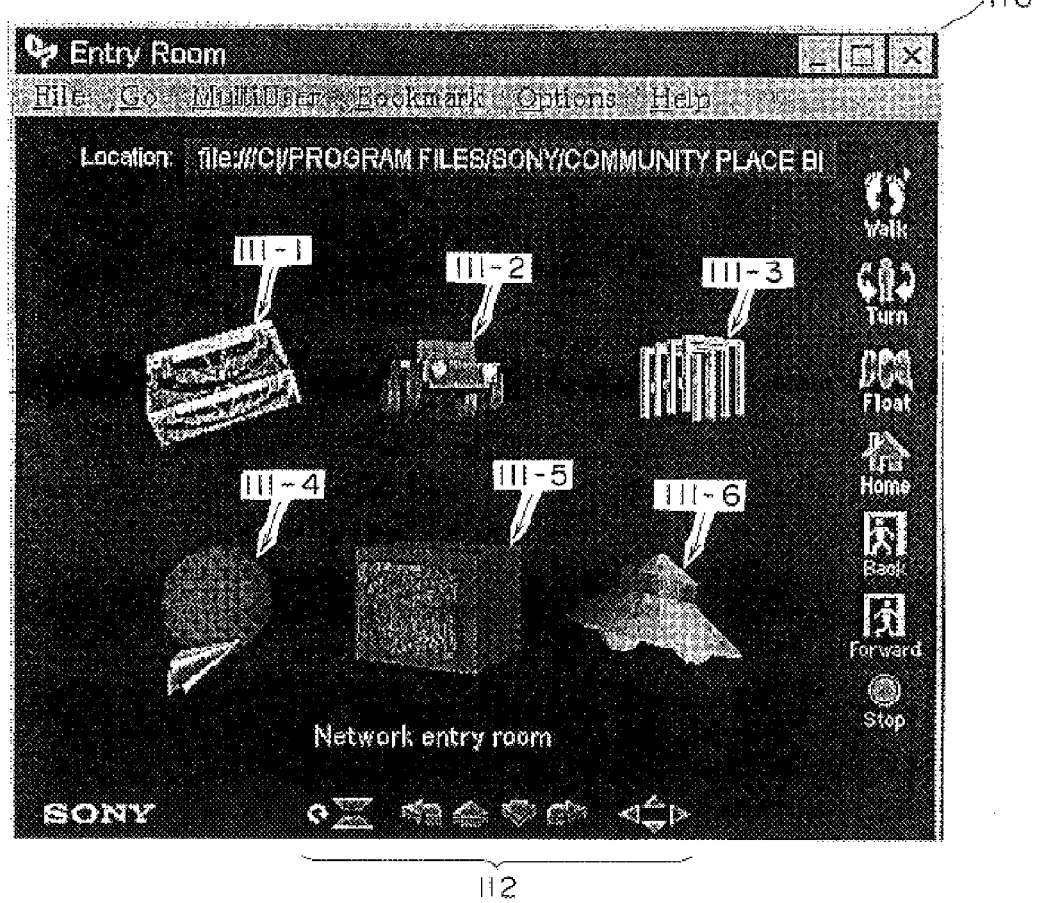
FIG. 27 is a photograph illustrating a display example of an entry room.

This Bureau can be started only by executing the downloaded file. When the CyberPassage Bureau is executed, only a menu bar indicating menus is displayed as shown in FIG. 27. Just after starting, the Bureau is in stopped state. Selecting "status" by pulling down "View" menu displays the status window that indicates the current the Bureau state. At the same time, a port number waiting for connection is also shown.

Immediately after starting, the Bureau is set such that it waits for connection at TCP port No. 5126. To change this port number, pull down "options" menu and select "port". When entry of a new port number is prompted, enter a port number 5000 or higher. If the user does not know which port number to enter, default value (5126) can be used.

To start the Bureau from the stopped state, pull down "run" menu and select "start". The server terminal comes to be connected at the specified port. At this moment, the state shown in "status" window becomes "running".

Thus, after completion of the bureau preparations, when the Browser comes to connect to the Bureau, it tells the position of the Browser to another Browser or transfers information such as conversation and behavior.

The "status" window of the Bureau is updated every time connection is made by the user, so that using this window allows the user to make sure of the users existing in that virtual world.

Connection of the Browser

Connection of the Browser requires the following two steps. First, instruct the Browser to which Bureau it is to be connected. This is done by writing an "info" node to the VRML file. Second, copy the user's avatar file to an appropriate direction so that you can be seen from other users.

Adding to a VRML File

When writing a line specifying the Bureau to be connected to the VRML file, a name of the personal computer on which the Bureau is operating and the port number must be specified in the following format:DEF VsServer Into {string"server name:port number"}

The server terminal name is a machine name as used in the Internet on which the Bureau is operating (for example, fred.research.sony.com) or its IP address (for example, 123.231.12.1). The port number is one set in the Bureau.

Consequently, the above-mentioned format becomes as follows for example:

DEF VsServer Info {string"fred.research.sony.com:5126"}

In the example of FIG. 25, the IP address of the shared server terminal 11-1 is 43.0.35.117, so that the above-mentioned format becomes as follows:

DEF VsServer Info {string"43.0.35.117:5126"}

This is added below the line shown below of the prepared VRML file:

VRML V1.0 ascii

Copying an Avatar File

When Community Place Browser gets connected to Community Place Bureau, the former notifies the latter of its avatar. When a specific avatar meets another, the Bureau notifies the other Browsers of the meeting information to make the specific avatar be displayed on the other Browsers. For this reason, it is required to copy the VRML file of the specific avatar to an appropriate place in advance.

The following further describes the operation of the browser (Community Place Browser).

In the following description, the description format of VRML 2.0 (The Virtual Reality Modeling Language Specification Version 2.0) publicized on Aug. 4, 1996 is presupposed. Also, in the following description, it is supposed that the browser correspond to VRML 2.0 and be capable of decoding a file described in this VRML 2.0 and displaying its three-dimensional virtual reality space.

The details of the VRML 2.0 specifications are publicized at:

URL=http://www.vrml.org/Specifications/VRML2.0/

Further, the details of the Japanese version of the VRML 2.0 specifications are publicized at:

URL=http://www.webcity.co.jp/info/andoh/VRML/vrml2.0/spec-jp/index.html

Community Place Browser is started simply by double-clicking the icon of the executable file cpbrows.exe displayed in the start menu or explorer of Windows 95 as described in the above-mentioned "Starting the browser."

When the executable file cpbrowse.exe of the browser is selected and started, a main window 110 is first displayed as shown in FIG. 27 for example. In the main window 110, a three-dimensional virtual reality space image called an entry room is displayed in which a plurality of three-dimensional icons 111-1 through 111-6 are displayed three-dimensionally for example.

If Community Place Browser stored in a recording medium such as the CD-ROM 101 is installed in the storage device 50 of the client terminal 13 by use of a dedicated installer for example, the executable file cpbrowse.exe for functioning the browser is installed in the default setting shown in FIG. 30 into the C drive (the storage device 50) of a local hard disk at a directory (or a folder):

C:/Program Files/Sony/Community Place Browser/bin.

At the installation of Community Place Browser through the dedicated installer, a world content including a VRML file stored in a recording medium such as the CD-ROM 101 is installed by the dedicated installer into a world directory at the same layer as a bin directory for example. For example, as shown in FIG. 30, a circus2 directory including a VRML file with a three-dimensional virtual reality space (namely a virtual world) described in VRML 2.0, a drive directory, a networkentry directory, an origami directory, a tv directory, and a ufo directory are installed in the world directory.

The world content folders such as the circus2 directory and the drive directory shown in FIG. 30 is composed of a VRML file main.wrl (a file having extension "wrl") describing the virtual world, a texture file (for example, a file having extension "jpg") describing the texture of an object to be referenced when decoding that VRML file, a script file (for example, a file having extension "class") describing the script for specifying a behavior of an object to be referenced when decoding that VRML file, and a VRML file entry.wrl with shapes and textures of the three-dimensional icons 111-1 through 111-6 to be displayed in the entry room and URLs and file names as link information described in VRML 2.0. In FIG. 30, only the VRML file main.wrl describing the virtual world and the VRML file entry.wrl of the three-dimensional icons 111-1 through 111-6 are shown for convenience of explanation.

When the browser is first started after installation of the executable file cpbrowse.exe for functioning the browser into the above-mentioned bin directory, the VRML file entryroom.wrl described with the entry room shown in FIG. 27 is automatically generated by the browser capability. Then, the VRML file entryroom.wrl with a three-dimensional virtual reality space called the entry room three-dimensionally arranged with the plurality of three-dimensional icons 111-1 through 111-6 is automatically stored in the world directory by the browser capability. Thus, the VRML file entryroom.wrl automatically generated by the browser is stored in the world directory on the same layer as the bin directory.

This entry room functions as the entrance into the virtual world. Its VRML file entryroom.wrl is stored in the local disk (the storage device 50) and automatically updated when a world content folder is newly installed or uninstalled. This update processing will be described later in detail.

Subsequently, Community Place Browser automatically reads, at its starting, the VRML file entryroom.wrl generated by itself to display the file in the main window 110 of the browser.

Consequently, the three-dimensional virtual reality space image called an entry room in which the plurality of three-dimensional icons 111-1 through 111-6 are arranged three-dimensionally is displayed in the main window 110 as shown in FIG. 27.

The VRML file entryroom.wrl of the entry room is automatically generated by Community Place Browser when the following conditions are satisfied:

1. The world directory (folder) exists on the same layer as the directory (default is C:/Program Files/Sony/Community Place Browser/bin) in which the executable file cpbrowse-.exe of Community Place Browser is installed.

2. The VRML file main.wrl describing the virtual world is stored in the world directory.

3. The VRML file entry.wrl with the shapes and textures of the three-dimensional icons 111-1 through 111-6 and URLs and file names as link information described in VRML 2.0 is stored in the above-mentioned world directory.

If the above-mentioned three conditions are satisfied, the VRML file entryroom.wrl including the information associated with the three-dimensional icons 111-1 through 111-6 described by each VRML file entry.wrl and the information associated with the user viewpoint position in the initial state for displaying the entry room is automatically generated.

The VRML file entry.wrl describes the shape of each three-dimensional icons 111-1 through 111-6 in a size of 2.0×2.0×2.0 in dimensional unit specified in VRML 2.0, and the texture of each icon that indicates its surface pattern, and URLS and file names as link information to the actual virtual world indicated by each icon.

For example, the VRML file entryroom.wrl automatically generated at starting of Community Place Browser has the following contents.

It should be noted that the line numbers attached to the left end of the VRML file are for the explanation only and hence need not be required actually.

An example of entryroom.wrl immediately after starting:

```
 1  #VRML V2.0 utf8
 2  #
 3  NOTICE
 4  #
 5  # This file is automatically generated by Community Place.
 6  # DO NOT edit this file.
 7  #
 8  WorldInfo {title "Entry Room"}
 9  NavigationInfo { headlight TRUE }
10  Transform {
11      translation 0.000000 0.000000 0
12      children [
13          Inline { url "circus1/entry.wrl" }
14      ]
15  }
16  Transform {
17      translation 3.300000 0.000000 0
18      children [
19          Inline { url "drive/entry.wrl" }
20      ]
21  }
22  Transform {
23      translation 6.600000 0.000000 0
24      children [
25          Inline { url "networkentry/entry.wrl" }
26      ]
27  }
28  Transform {
29      translation 0.000000 -3.300000 0
30      children [
31          Inline { url "origami/entry.wrl" }
32      ]
33  }
34  Transform {
35      translation 3.300000 -3.300000 0
36      children [
37          Inline { url "tv/entry.wrl" }
38      ]
39  }
40  Transform {
41      translation 6.600000 -3.300000 0
42      children [
43          Inline { url "ufo/entry.wrl" }
44      ]
45  }
46  Viewpoint {
47      position 3.300000 -1.650000 10.612769
48      fieldOfView 0.785398
49  }
```

First, in VRML 2.0, the file is composed of a node and a field, which are basically described in the following format: Node {Field(s)}

"Fields" may be omitted but "Node" and opening and closing braces "{", "}" cannot be omitted.

The field passes a variable to the node to specify a node parameter. If the field is omitted, a default value is used. The field is divided into a single-value field (SF) having only a single value and a multiple-value field (MF) having a plurality of values. The single-value field starts with "SF" and the multiple-value field starts with "MF."

In the above-mentioned VRML file, line 1 indicates that this file is described based on the VRML 2.0 specifications.

Line 5 is a comment line, indicating that this file has been automatically generated at starting of Community Place Browser.

"WorldInfo" node on line 8 describes world information. World title is described in its "title" field.

"NavigationInfo" node on line 9 sets various parameters associated with the movement and so on in the world. If its "headlight" field is set to "TRUE," the headlight is turned on to provide a bright lighting effect.

The "translation" field in "Transform" node described on line 11 indicates the amount of translation of a three-dimensional object. When "translation" field is written as follows, translation amounts of x axis, y axis, and z axis are specified:

translation x y z

On the browser, x axis indicates left and right directions (the right direction is positive), y axis indicates up and down directions (up direction is positive), and z axis indicates depth direction (forward direction is positive).

For example, if the "translation" field is written as follows:

translation 2 0 0 it indicates that the three-dimensional object is translated by two units to the right in the world.

The "children" field on line 12 indicates a child note.

The "Inline" field on line 13 indicates incorporation of another VRML file. A VRML file described in "url" field of that "Inline" node is called. For example, Inline {url "circus2/entry.wrl"} reads the VRML file entry.wrl from the circus2 directory and displays the read file.

The "Viewpoint" node on line 46 specifies user viewpoint position or slight line position relative to the world. Specifying an actual three-dimensional coordinates in the "position" field provides the first viewpoint when the world is displayed. However, default of sight line direction is the negative direction (depth of the screen) along z axis.

It should be noted that changing of a viewpoint position is specified in "orientation" field of the "Viewpoint" node. The "orientation" field is a field of SFRotation type and specifies a rotational axis and a rotational angle.

The "Field Of View" field on line 48 specifies a view field angle in radian with the viewpoint specified in the "position" field as the origin. A small view field angle specified is equivalent to a telephoto lens of and a large view field angle specified is equivalent to a wide-angle lens. The default value of view field angle is 0.785398 equivalent to 45 degrees.

When the entry room VRML file entryroom.wrl automatically generated immediately after the starting is read by Community Place Browser, the entry room as shown in FIG. 27 is displayed. A three-dimensional relationship between the three-dimensional icons 111-1 through 111-6 arranged in that display window and the default viewpoint position (Viewpoint) is as shown in FIG. 32.

Figure 32:
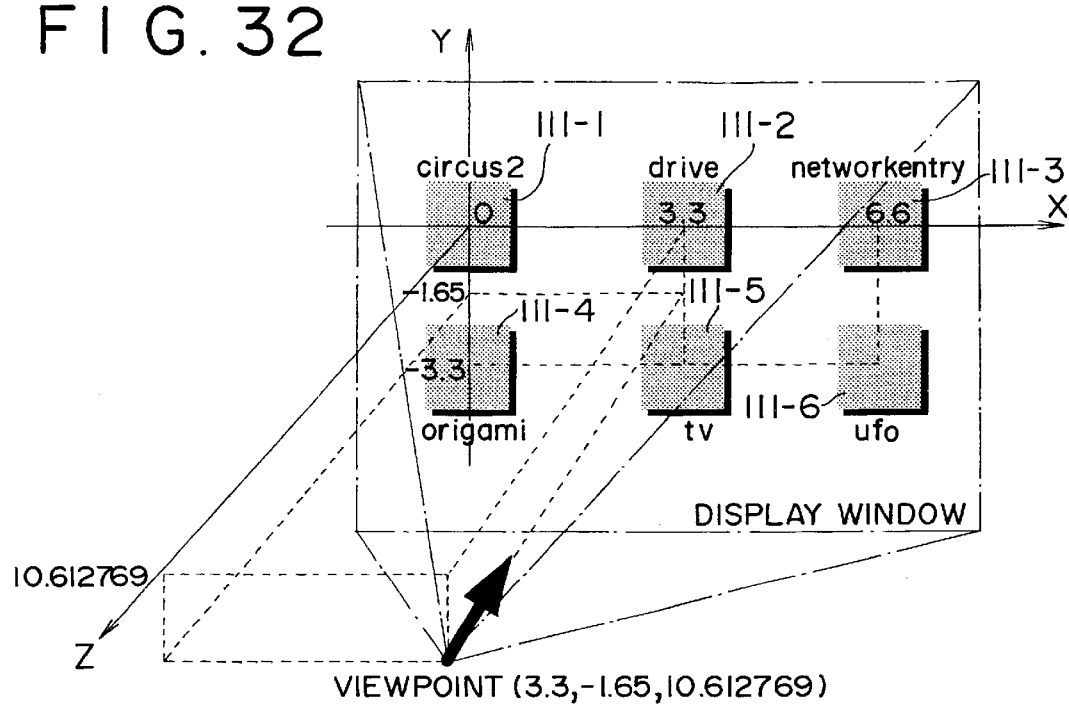
FIG. 32 is a diagram illustrating a three-dimensional positional relationship between three-dimensional icons arranged in the entry room shown in FIG. 27 and a viewpoint.

As shown in FIG. 32, the three-dimensional coordinate values of the three-dimensional icons 111-1 through 111-6 and the viewpoint position are as follows:

coordinate values (x, y, z) of the three-dimensional icon 111-1=0.0, 0.0, 0,0);

coordinate values (x, y, z) of the three-dimensional icon 111-2=(3.3, 0.0, 0.0);

coordinate values (x, y, z) of the three-dimensional icon 111-3=(6.6, 0.0, 0.0);

coordinate values (x, y, z) of the three-dimensional icon 111-4=(0.0, −3.3, 0.0), coordinate values (x, y, z) of the three-dimensional icon 111-5=(3.3, −3.3, 0.0);

coordinate values (x, y, z) of the three-dimensional icon 111-6=(6.6, −3.3, 0.0); and coordinate values (x, y, z) of viewpoint position=(3.3, −1.65, 10.612869).

These coordinate values are based on the description of the entry room VRML file entryroom.wrl automatically generated immediately after the starting.

Then, if a world content folder is newly installed or uninstalled, the entry room VRML file entryroom.wrl is automatically updated when the browser is started next time.

Namely, every time the browser is started, the browser searches the world directory for directories to determine whether the directory (world content folder) including the newly added VRML file entry.wrl exists or the directory including the deleted VRML file entry.wrl exists. If the directory including the added or deleted VRML file entry.wrl is found, the browser rewrites and updates the entry room VRML file entryroom.wrl accordingly.

Figure 31:
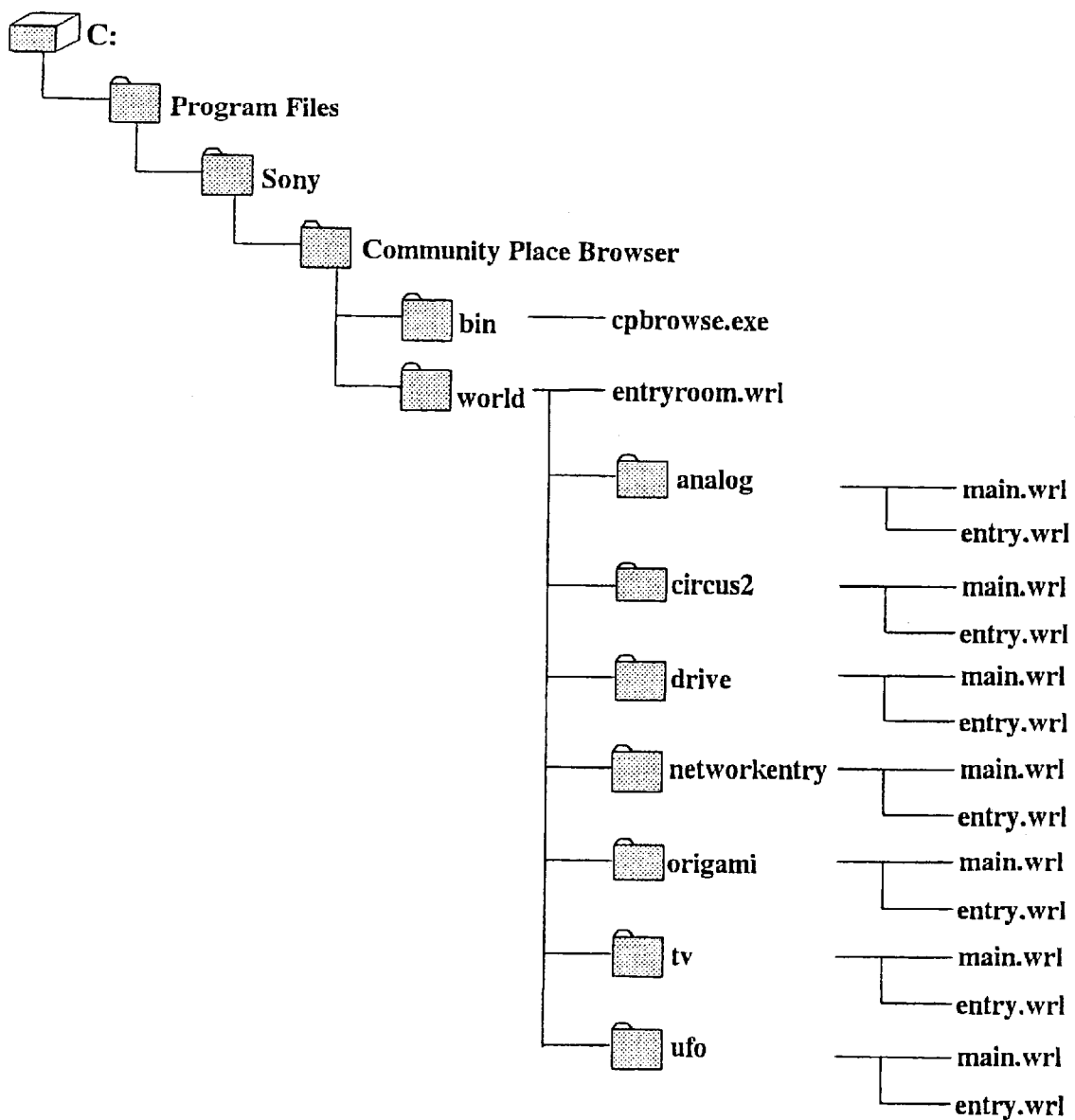
FIG. 31 is a diagram illustrating an example of the constitution of the directory newly added with a world content.

It is assumed here that a WWW server on the Internet is accessed by use of Netscape for example, a directory (world content folder) including the VRML file entry.wrl of an analog world stored in that WWW server is downloaded, and the downloaded file is installed in the hard disk (the storage device 50) of the client terminal at the directory C:/Program Files/Sony/Community Place Browser/world as shown in FIG. 31.

Alternatively, it is assumed that a directory (world content folder) including the VRML file entry.wrl of an analog world stored on a recording medium such as the CD-ROM 101 is installed in the world directory on the same layer as the bin directory by use of the dedicated installer.

When the browser is started in the above-mentioned state, the browser searches the world directory for directories to determine whether the directory (world content folder) including the VRML file entry.wrl of the newly added analog world exists. Accordingly, the browser rewrites the VRML file entryroom.wrl of the entry room.

For example, the VRML file entryroom.wrl automatically updated at starting of the browser along with the addition of this analog world has the following contents.

It should be noted that the line numbers attached to the left end of the VRML file are for the explanation only and hence need not be required actually.

An example of updated entryroom.wrl:

```
1   #VRML V2.0 utf8
2   #
3   # NOTICE
4   #
5   # This file is automatically generated by Community Place.
6   # DO NOT edit this file.
7   #
8   WorldInfo {title "Entry Room"}
9   NavigationInfo { headlight TRUE }
10  Transform {
11      translation 0.000000 0.000000 0
12      children [
13      Inline { url "analog/entry.wrl" }
14      ]
15  }
16  Transform {
17      translation 3.300000. 0.000000 0
18      children [
19      Inline { url "circus2/entry.wrl" }
20      ]
21  }
22  Transform {
23      translation 6.600000 0.000000 0
24      children [
25      Inline { url "drive/entry.wrl" }
26      ]
27  }
28  Transform {
29      translation 0.000000 −3.300000 0
30      children [
31      Inline { url "networkentry/entry.wrl" }
32      ]
33  }
34  Transform {
35      translation 3.300000 −3.300000 0
36      children [
37      Inline { url "origami/entry.wrl" }
38      ]
39  }
40  Transform {
41      translation 6.600000 −3.300000 0
42      children [
```

```
43      Inline { url "tv/entry.wrl" }
44      ]
45   }
46   Transform {
47      translation 0.000000 −6.600000 0
48      children [
49      Inline { url "ufo/entry.wrl" }
50      ]
51   }
52   Viewpoint {
53      position 3.300000 −1.650000 10.612769
54      fieldOfView 0.785398
55   }
```

Figure 28:
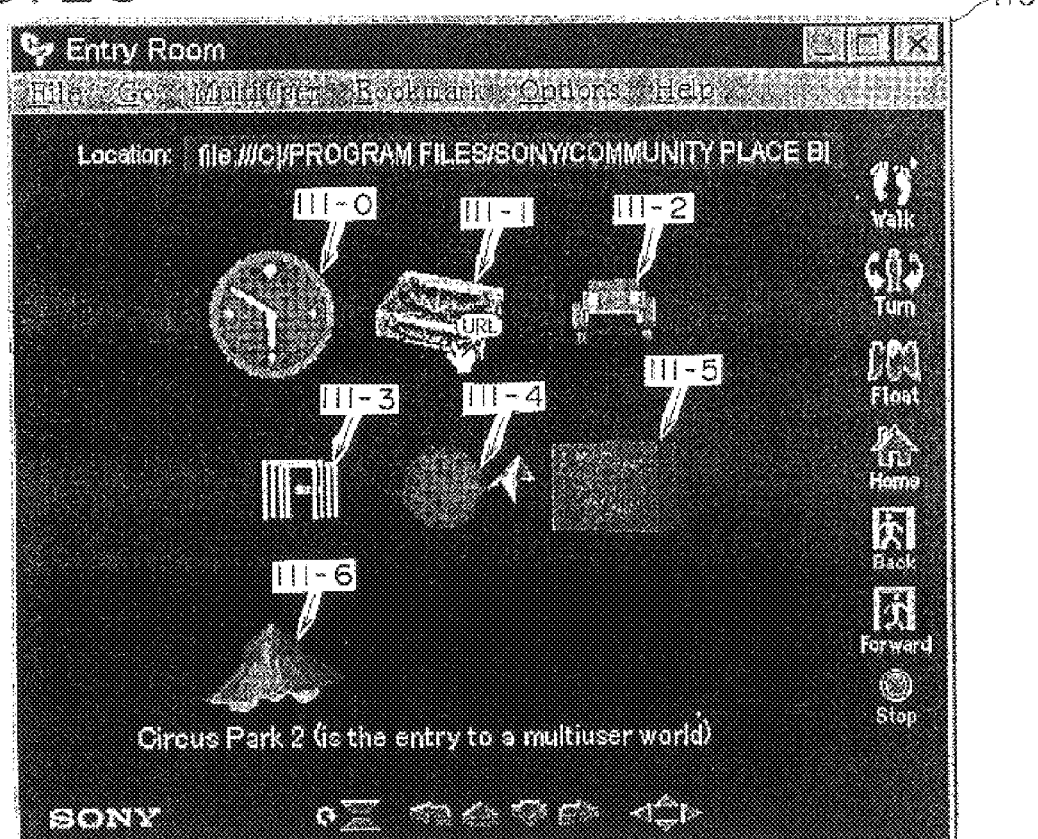
FIG. 28 is a photograph illustrating a display example of the entry room newly added with a world content.

When the entry room VRML file entryroom.wrl automatically updated by the browser along with the addition of the above-mentioned analog world is read by Community Place Browser, an entry room as shown in FIG. 28 is displayed. A three-dimensional relationship between the three-dimensional icons 111-0 through 111-6 arranged in that display window and the default viewpoint position (Viewpoint) is as shown in FIG. 33.

Figure 33:
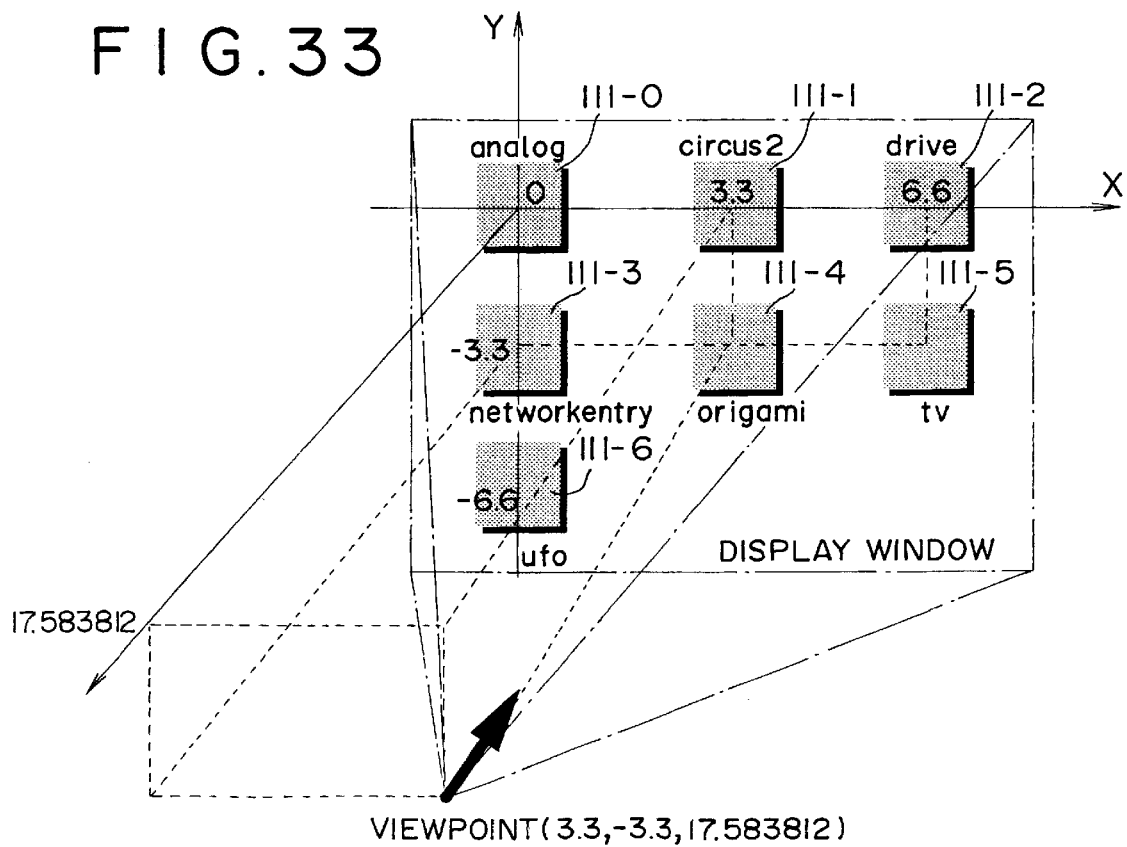
FIG. 33 is a diagram illustrating a three-dimensional positional relationship between three-dimensional icons arranged in the entry room newly added with a world content shown in FIG. 28 and a viewpoint.

As shown in FIG. 33, the three-dimensional coordinate values of the three-dimensional icons 111-0 through 111-6 and the viewpoint position are as follows:

coordinate values (x, y, z) of the three-dimensional icon 111-0=0.0, 0.0, 0,0);
coordinate values (x, y, z) of the three-dimensional icon 111-1=(3.3, 0.0, 0.0);
coordinate values (x, y, z) of the three-dimensional icon 111-2=(6.6, 0.0, 0.0);
coordinate values (x, y, z) of the three-dimensional icon 111-3=(0.0, −3.3, 0.0),
coordinate values (x, y, z) of the three-dimensional icon 111-4=(3.3, −3.3, 0.0);
coordinate values (x, y, z) of the three-dimensional icon 111-5=(6.6, −3.3, 0.0);
coordinate values (x, y, z) of the three-dimensional icon 111-6=(0.0,−6.6, 0.0); and
coordinate values (x, y, z) of viewpoint position=(3.3,−3.3, 17.583812).

These coordinate values are based on the description of the entry room VRML file entryroom.wrl automatically updated after addition of the above-mentioned analog world and starting of the browser.

As seen from the above-mentioned VRML file entryroom.wrl, along with the addition of the analog world, the description corresponding to a VRML file analog/entry.wrl describing a three-dimensional icon 111-0 of the analog world on lines 10 through 15 is automatically added and the coordinate values and the existing three-dimensional icons 111-1 through 111-6 and viewpoint position are also rewritten.

Namely, the three-dimensional icon 111-0 of the newly added analog world is arranged at top left as seen from the viewpoint position and the existing three-dimensional icons 111-1 through 111-6 are sequentially moved in the right direction (the positive direction along X axis) or down (the negative direction along Y axis) by 3.3 units for relocation.

Further, because the number of array levels has been increased by one due to the three-dimensional icon 111-0, the viewpoint position is also moved down by 1.65 unit in the rear direction by 6.971043 units to be automatically corrected.

On the other hand, if the directory including the VRML file entry.wrl of the analog world is deleted, the directory in the world directly are searched when the browser is started after the deletion to determine whether the analog world has been deleted. According to the result, the VRML file entryroom.wrl of the entry room is rewritten, upon which the entry room shown in FIG. 27 in which the three-dimensional icons 111-1 through 111-6 are arranged in the positional relationship shown in FIG. 32 is displayed again.

It has been described above that, if the directory (world content folder) including the VRML file entry.wrl of the newly added analog world is found as a result of searching the directories in the world directory at the starting of the browser, the browser rewrites the VRML file entryroom.wrl of the entry room accordingly. This is implemented by always rewriting the VRML file entryroom.wrl of the entry room at the starting of the browser regardless of addition or deletion of the world content folder. However, as a result, this is equivalent to rewriting of the VRML file entryroom.wrl of the entry room only when the world content folder has been added or deleted.

It should be noted that, if the world content folder does not include the VRML file entry.wrl, the three-dimensional icon representing that world is not displayed in the entry room.

As shown in FIGS. 27 and 28, the three-dimensional icons 111-0 through 111-6 have shapes of corresponding worlds that are shrunk or have surface textures resembling the corresponding worlds. These shapes are described by VRML 2.0 beforehand. Therefore, the user can intuitively understand the outlines of the worlds by looking at these three-dimensional icons 111-0 through 111-6 representing the worlds.

By operating the mouse 49b and the keyboard 49a as described in the above-mentioned "Operating the browser" or by operating navigation buttons 112 displayed at the bottom of the main window 110 of the browser by the mouse 49b, the user can freely navigate in the entry room, which is a three-dimensional virtual reality space arranged with the three-dimensional icons 111-0 through 111-6. For example, by changing the viewpoint position or the sight line direction, the three-dimensional icons 111-0 through 111-6 arranged three-dimensionally can be viewed at any desired angle. The navigation buttons 112 are, from the right side of the main window sequentially, move to right, move up, move down, move to left, rotate right, move back, move forward, rotate left, tilt up, tilt down, and reset horizontal.

When the entry room is displayed, if the user moves the arrow pointer by operating the mouse 49b for example onto the three-dimensional icon 111-1 of the circus2 world for example, the shape of the pointer changes to a hand having a balloon in which "URL" is displayed. Further, in the bottom of the display entry room, a character string "Circus Park 2 (is the entry to a multiuser world)" is scrolled from right to left in the screen as an explanation text of the world of the three-dimensional icon 111-1.

Figure 29:
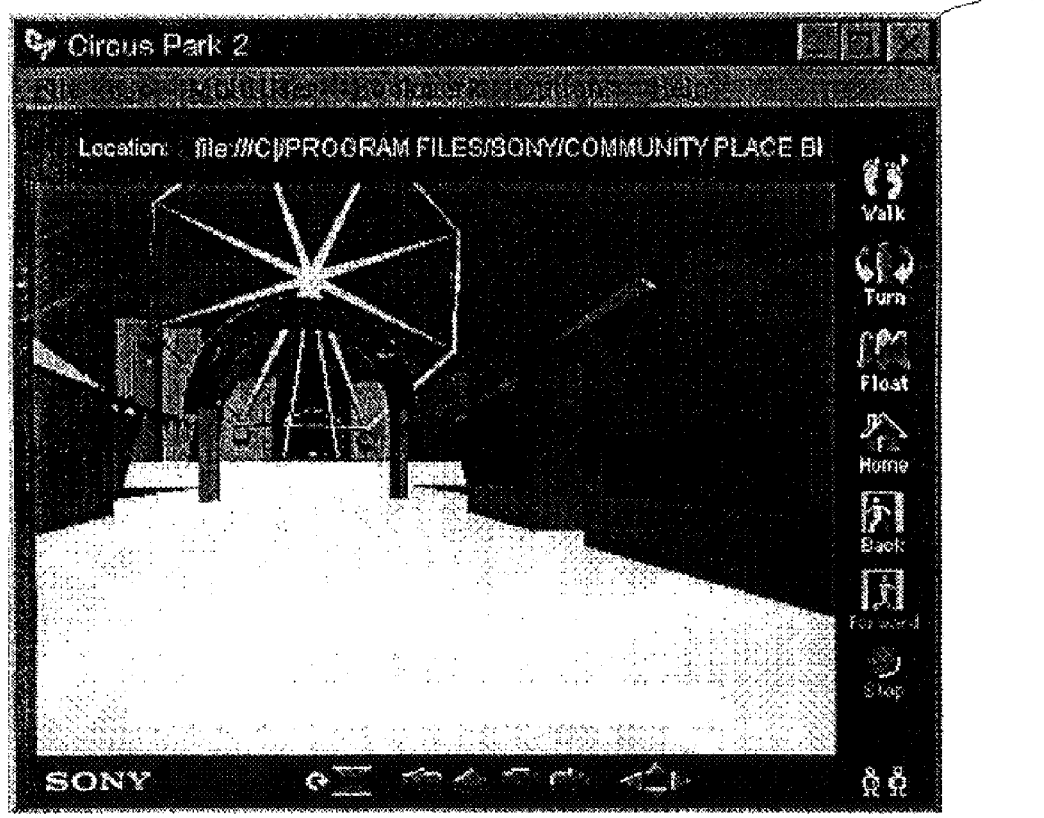
FIG. 29 is a photograph illustrating a display example of a three-dimensional virtual reality space.

In the state of FIG. 28, if the user clicks a button such as the mouse 49b for completing the input, the browser reads a VRML file circus2/main.wrl shown in FIG. 32 described with the world corresponding to the three-dimensional icon 111-1 and displays the world in the main window 110 as shown in FIG. 29.

Namely, the VRML file entry.wrl of the three-dimensional icons 111-0 through 111-6 describes the information of link to the VRML file main.wrl of the corresponding worlds. When any of the three-dimensional icons 111-0 through 111-6 is clicked, the browser reads the VRML file main.wrl of the world linked to the VRML file entry.wrl of the clicked icon and displays the world described in that VRML file main.wrl in the main window 110 instead of the entry room.

Thus, the integrated GUI can be implemented in which a desired world is selected while freely navigating in the entry room, which is a three-dimensional virtual reality space with the three-dimensional icons 111-0 through 111-6 displayed. If the complicated operation such as searching the directories as with the conventional selection method shown in FIG. 39 is not performed, the user can operate the mouse while looking at the entry room automatically displayed at the starting of the browser, thereby selecting the desired world easily and instantly.

Figure 34:
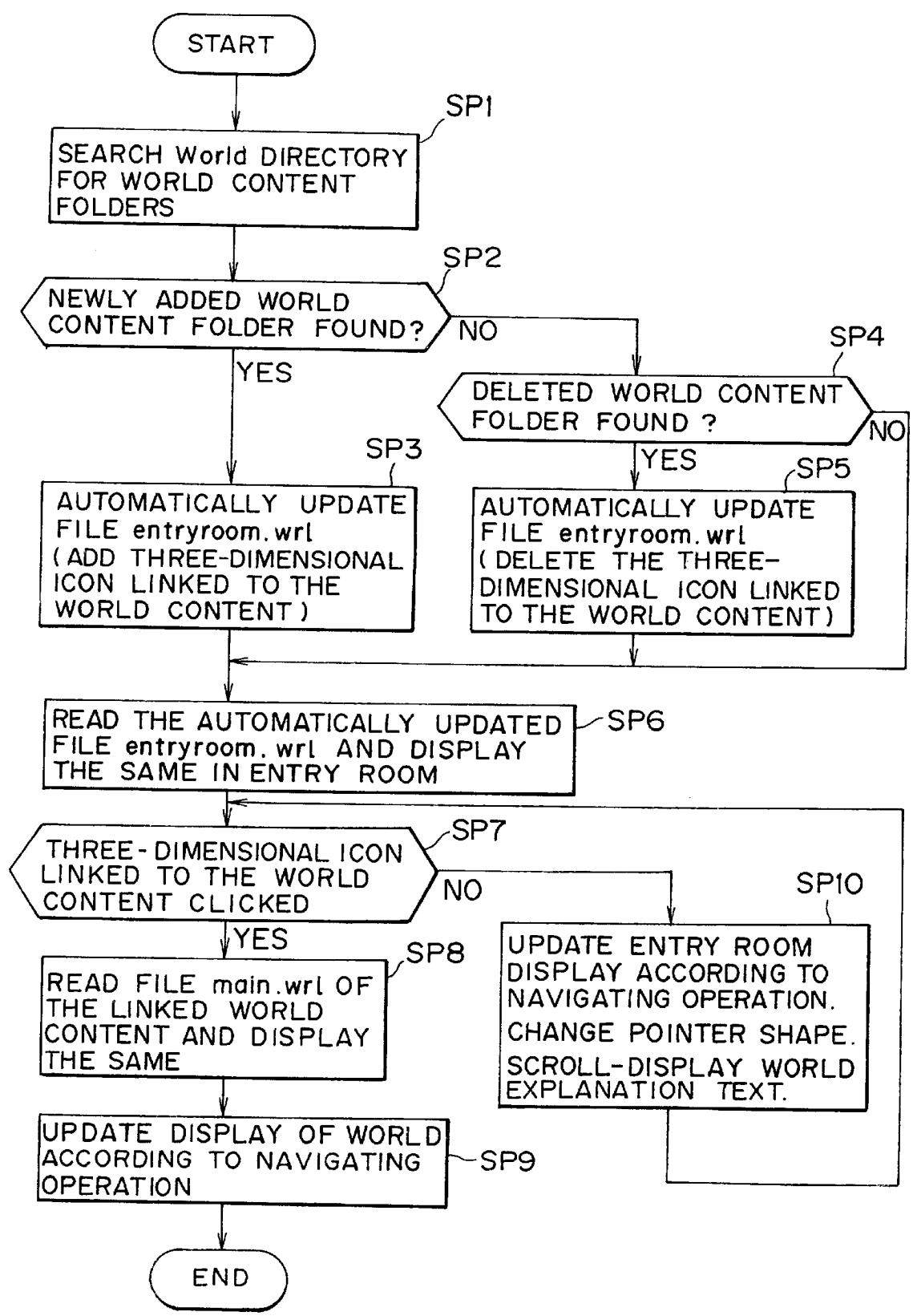
FIG. 34 is a flowchart describing processes including entry room automatically generating processing by a browser.

The following describes the processing processes including the automatic generation of an entry room by the above-mentioned browser with reference to a flowchart shown in FIG. 34.

When the browser is started, the world directory is searched for world content folders in step SP1. If, in step SP2, a newly added world content folder is found, then, in step SP3, the VRML file entryroom.wrl including the information associated with the three-dimensional array of three-dimensional icons and the information associated with the user viewpoint position in the initial state for displaying the entry room is automatically updated. This automatically updating processing adds a new three-dimensional icon corresponding to the directory that includes a newly added VRML file entry.wrl.

On the other hand, if, in step SP4, a deleted world content folder is found, then, in step SP5, the VRML file entryroom.wrl is automatically updated reflecting the directory that includes the deleted world content folder.

Then, in step SP6, the automatically updated VRML file entryroom.wrl is read to display the entry room.

In step SP7, it is determined whether any three-dimensional icon linked to the world content displayed in the entry room has been clicked by the mouse 49b. If the icon is found clicked, then, in step SP8, the VRML file main.wrl with the linked world content described is read for display. Then, in step SP9, the display of the three-dimensional virtual reality space is updated according to the navigating operation by use of the mouse 49a and any of the navigation buttons 112. This allows the user to freely move (navigate) in a desired three-dimensional virtual reality space.

On the other hand, if, in step SP7, none of the icons displayed in the entry room is found not clicked by the mouse, then, in step SP10, the display of the three-dimensional virtual reality space is updated according to the navigating operation by the user and, at the same time, pointer shape change processing to be executed when the pointer moves onto a three-dimensional icon and scroll display processing for an explanation text to be displayed at the bottom of the entry room are executed.

The following describes differences from a home page described in the conventional HTML. FIG. 35 is a table listing the relationship between a home page described in the conventional HTML and an entry room into a virtual world described in the above-mentioned VRML according to the invention.

As shown in FIG. 35, in the home page described in the conventional HTML, a text and a button arranged on given lines on a page may only be linked as anchor objects to other pages. On the other hand, according to the entry room described in the VRML herein, three-dimensional icons arranged at given coordinate positions in a three-dimensional space can be linked as anchor objects to three-dimensional virtual reality spaces described in other VRMLs, thereby providing an integrated GUI environment that allows the user to select desired three-dimensional virtual reality spaces.

In FIGS. 27 and 28, the three-dimensional icons are arranged two-dimensionally. It will be apparent that these icons can be arranged three-dimensionally (in depth direction) as shown in FIG. 36. In the three-dimensional display, a three-dimensional icon for most recently installed content may be placed toward the user while a three-dimensional icon for least recently installed content may be placed away from the user farther into the depth of the display, by way of example.

Referring to FIG. 36, nine three-dimensional icons are displayed toward the user while five three-dimensional icons are displayed farther in the depth. Because the entry room is a three-dimensional virtual reality space as described before, navigation can be made in the depth direction. A state in which navigation has been made in the depth direction from the state of FIG. 36 is shown in FIG. 37.

As described, in arrangement of three-dimensional icons three-dimensionally, many three-dimensional icons can be presented to the user at a time.

Also, in the above-mentioned case, the directory is searched at the starting of the browser and the three-dimensional icons are arranged in the entry room, so that, if a new content is installed, the three-dimensional icon for this newly installed content is not arranged in the entry room until the browser is started. However, the three-dimensional icon for the newly installed content can be arranged (to be specific, the file entry.wrl in the new content is reflected onto the file entryroom.wrl) instantly by installing the new content by the dedicated installer for example.

In this case, however, the browser does not always read the file entryroom.wrl, so that the three-dimensional icon for the newly installed content is not instantly displayed in the displayed entry room. Namely, the three-dimensional icon for the newly installed content is displayed in the entry room when the browser is started again or the browser reads the file entryroom.wrl.

It should be noted that instant display of the three-dimensional icon for the newly installed content can be implemented by making the browser regularly read the file entryroom.wrl for example when the entry room is displayed.

The invention has been described about an example in which the Internet is used as the network 15 and WWW is used. It will be apparent that the present invention can also be implemented by use of a broadband communication network other than the Internet or a system other than WWW.

As described and according to the three-dimensional virtual reality space display processing apparatus described in the claims, three-dimensional graphics data is automatically generated in which an entry room three-dimensionally arranged with three-dimensional icons corresponding to three-dimensional graphics data stored in a storage means on a file basis is described. A three-dimensional virtual reality space image corresponding to this automatically generated entry room is displayed. This novel constitution allows the user who wants to use three-dimensional virtual reality spaces to select a desired three-dimensional virtual reality space directly and easily in an integrated three-dimensional GUI environment.

While the preferred embodiments of the present invention have been described using specific terms, such description is for illustrative purposes only, and it is to be understood that changes and variations may be made without departing from the spirit or scope of the appended claims.

What is claimed is:

1. A three-dimensional virtual reality space display processing apparatus via which a user traverses worlds of a three-dimensional virtual reality space, comprising:

storage means for storing world content data describing different worlds making up the three-dimensional virtual reality space; and means for automatically generating entry room graphics data upon entry by the user into an entry room, the entry room graphics data including data of three-dimensional graphics icons arranged in a three-dimensional array, wherein automatic generation of the entry room graphics data includes retrieving and using the world content data stored on the storage means, and the entry room configured as a three-dimensional directory of said icons.

2. The display processing apparatus of claim 1, wherein said entry room graphics generating means includes means for determining that content data relating to a particular world is present and, in response to the determination, generates the entry room graphics data with a three-dimensional icon corresponding to the particular world.

3. The display processing apparatus of claim 2, wherein:
the entry room graphics generating means includes means for maintaining tracking data when world content is added and deleted, and wherein a reordering of display of three dimensional graphics icons for the worlds of the universe is at least partially in response to the tracking data.

4. The display processing apparatus of claim 3, wherein:
the automatic generation is such that a viewpoint position of an initial state of the entry room depends on the reordering of the display of the three dimensional graphics icons.

5. The display processing apparatus of claim 4, wherein the automatic generation is such that at least some of the three dimensional graphics icons have a shape or a surface pattern simulating the world to which the icons correspond based on the content data for the world.

6. The display processing apparatus of claim 5, wherein the entry room graphics data is described in a virtual reality modeling language.

7. The display processing apparatus of claim 1, wherein said entry room graphics generating means includes means for determining that content data relating to a particular world is not present and, in response to the determination, generates the entry room graphics data without a three-dimensional icon corresponding to the particular world.

8. The display processing apparatus of claim 1, wherein:
the content data for the worlds is organized on a file basis;
the entry room graphics generating means includes means for searching the storage means to determine for which worlds files are present; and
the automatic generation is based on the determination made by the storage means.

9. The display processing apparatus of claim 1, and further comprising:
selecting means for selecting any of the icons displayed in the entry room;
reading means for reading, based on link information that relates the icon to the content data, the content data for the world to which the icon corresponds.

10. The display processing apparatus of claim 9, wherein said selecting means selects a particular icon by moving and establishing the position of a pointer displayed in the entry room, the display processing apparatus further comprising:
explanation display means for displaying in an overlay manner of an icon, text explaining the world to which the icon corresponds.

11. A three-dimensional virtual reality space display processing method by which a user traverses worlds of a three-dimensional virtual reality space, comprising:

storing world content data describing different worlds making up the three-dimensional virtual reality space; and automatically generating entry room graphics data upon entry by the user into an entry room, the entry room graphics data including data of three-dimensional graphics icons arranged in a three-dimensional array, wherein the step of automatically generating the entry room graphics data includes retrieving and using the world content data stored during the storing step, and the entry room configured as a three-dimensional directory of said icons.

12. The method of claim 11 wherein said step of generating said entry room graphics includes the step of determining that content data relating to a particular world is present and, in response to the determination, generating the entry room graphics data with a three-dimensional icon corresponding to the particular world.

13. The method of claim 12 wherein said step of generating said entry room graphics includes the step of maintaining tracking data when world content is added and deleted, and wherein a reordering of display of three dimensional graphics icons for the worlds of the universe is at least partially in response to the tracking data.

14. The method of claim 13 wherein the automatic generation at said step of generating said entry room graphics is such that a viewpoint position of an initial state of the entry room depends on the reordering of the display of the three dimensional graphics icons.

15. The method of claim 14 wherein the automatic generation at said step of generating said entry room graphics is such that at least some of the three dimensional graphics icons have a shape or a surface pattern simulating the world to which the icons correspond based on the content data for the world.

16. The method of claim 15 wherein the entry room graphics data is described in a virtual reality modeling language.

17. The method of claim 11 wherein step of generating said entry room graphics includes the step of determining that content data relating to a particular world is not present and, in response to the determination, generating the entry room graphics data without a three-dimensional icon corresponding to the particular world.

18. The method of claim 11 wherein:
the content data for the worlds is organized on a file basis;
the step of generating said entry room graphics includes the step of searching said stored content data to determine for which worlds files are present; and
the automatic generation is based on the determination made by the storing step.

19. The method of claim 11 and further comprising the steps of:
selecting any of the icons displayed in the entry room;
reading, based on link information that relates the icon to the content data, the content data for the world to which the icon corresponds.

20. The method of claim 19 wherein said step of selecting selects a particular icon by moving and establishing the position of a pointer displayed in the entry room, the method further comprising the step of displaying in an overlay manner of an icon, text explaining the world to which the icon corresponds.

21. An information providing medium for providing a computer program for displaying a three-dimensional virtual reality space in which a user traverses worlds of a three-dimensional virtual reality space, the computer program comprising the steps of:

storing world content data describing different worlds making up the three-dimensional virtual reality space; and automatically generating entry room graphics data upon entry by the user into an entry room, the entry room graphics data including data of three-dimensional graphics icons arranged in a three-dimensional array, wherein the step of automatically generating the entry room graphics data includes retrieving and using the world content data stored during the storing step, and the entry room configured as a three-dimensional directory of said icons.

22. The medium of claim 21 wherein said step of generating said entry room graphics of said computer program includes the step of determining that content data relating to a particular world is present and, in response to the determination, generating the entry room graphics data with a three-dimensional icon corresponding to the particular world.

23. The medium of claim 22 wherein said step of generating said entry room graphics of said computer program includes the step of maintaining tracking data when world content is added and deleted, and wherein a reordering of display of three dimensional graphics icons for the worlds of the universe is at least partially in response to the tracking data.

24. The medium of claim 23 wherein the automatic generation at said step of generating said entry room graphics of said computer program is such that a viewpoint position of an initial state of the entry room depends on the reordering of the display of the three dimensional graphics icons.

25. The medium of claim 24 wherein the automatic generation at said step of generating said entry room graphics of said computer program is such that at least some of the three dimensional graphics icons have a shape or a surface pattern simulating the world to which the icons correspond based on the content data for the world.

26. The medium of claim 25 wherein the entry room graphics data is described in a virtual reality modeling language.

27. The medium of claim 21 wherein step of generating said entry room graphics of said computer program includes the step of determining that content data relating to a particular world is not present and, in response to the determination, generating the entry room graphics data without a three-dimensional icon corresponding to the particular world.

28. The medium of claim 21 wherein:

the content data for the worlds is organized on a file basis;

the step of generating said entry room graphics of said computer program includes the step of searching said stored content data to determine for which worlds files are present; and the automatic generation is based on the determination made by the storing step.

29. The medium of claim 21, wherein said computer program further includes the steps of:

selecting any of the icons displayed in the entry room;

reading, based on link information that relates the icon to the content data, the content data for the world to which the icon corresponds.

30. The medium of claim 29 wherein said step of selecting of said computer program selects a particular icon by moving and establishing the position of a pointer displayed in the entry room, the computer program further including the step of displaying in an overlay manner of an icon, text explaining the world to which the icon corresponds.

31. A three-dimensional virtual reality space display processing apparatus via which a user traverses worlds of a three-dimensional virtual reality space, comprising:

a storage unit configured to store world content data describing different worlds making up the three-dimensional virtual reality space; and a controller configured to automatically generate entry room graphics data upon entry by the user into an entry room, the entry room graphics data including data of three-dimensional graphics icons arranged in a three-dimensional array, wherein automatic generation of the entry room graphics data includes retrieving and using the world content data stored on the storage unit, and the entry room configured as a three-dimensional directory of said icons.

32. The apparatus of claim 31 wherein said controller is further configured to determine that content data relating to a particular world is present and, in response to the determination, generates the entry room graphics data with a three-dimensional icon corresponding to the particular world.

33. The apparatus of claim 32 wherein the controller is further configured to maintain tracking data when world content is added and deleted, and wherein a reordering of display of three dimensional graphics icons for the worlds of the universe is at least partially in response to the tracking data.

34. The apparatus of claim 33, wherein:

the automatic generation is such that a viewpoint position of an initial state of the entry room depends on the reordering of the display of the three dimensional graphics icons.

35. The apparatus of claim 34, wherein the automatic generation is such that at least some of the three dimensional graphics icons have a shape or a surface pattern simulating the world to which the icons correspond based on the content data for the world.

36. The apparatus of claim 35, wherein the entry room graphics data is described in a virtual reality modeling language.

37. The apparatus of claim 31 wherein said controller is further configured to determine that content data relating to a particular world is not present and, in response to the determination, generates the entry room graphics data without a three-dimensional icon corresponding to the particular world.

38. The apparatus of claim 31, wherein:

the content data for the worlds is organized on a file basis;

the controller is further configured to search the storage unit to determine for which worlds files are present; and the automatic generation is based on the determination made by the storage unit.

39. The apparatus of claim 31, further comprising a selection unit for selecting any of the icons displayed in the entry room;

wherein said controller is further configured to read, based on link information that relates the icon to the content data, the content data for the world to which the icon corresponds.

40. The apparatus of claim 39, wherein said selection unit selects a particular icon by moving and establishing the position of a pointer displayed in the entry room, and further, wherein said controller is further configured to display, in an overlay manner of an icon, text explaining the world to which the icon corresponds.

41. The apparatus of claim 31 wherein said storage unit includes a memory.

* * * * *